Feb. 27, 1962 C. G. EILERS ET AL 3,023,270

COMPUTER AND A METHOD OF COMPUTING

Filed July 23, 1959 16 Sheets-Sheet 1

INVENTORS
Carl G. Eilers
Melvin C. Hendrickson
Richard C. Herrmann
BY James E. Tracy
ATTORNEY

- - - - - - - - - - INDICATES ACTIONS WHEN PULSE APPLIED TO $B_4$ COMMON
—— - —— - —— INDICATES ACTIONS WHEN PULSE APPLIED TO $B_5$ COMMON
— — — — — — INDICATES FREE COUNT ACTIONS FROM LINE-DRIVE PULSES APPLIED TO $B_1$ COMMON
———————— INDICATES GATED RESET ACTIONS FROM PULSES APPLIED TO $B_1$, $B_2$, $B_3$ AND $B_4$

INVENTORS
Carl G. Eilers
Melvin C. Hendrickson
Richard C. Herrmann
BY James E. Tracy
ATTORNEY INVENTORS
Carl G. Eilers
Melvin C. Hendrickson
Richard C. Herrmann
BY James E. Tracy
ATTORNEY INVENTORS
Carl G. Eilers
Melvin C. Hendrickson
Richard C. Herrmann
BY James E. Tracy
ATTORNEY Feb. 27, 1962 C. G. EILERS ET AL 3,023,270

COMPUTER AND A METHOD OF COMPUTING

Filed July 23, 1959 16 Sheets-Sheet 6

COMPUTER AND A METHOD OF COMPUTING

Filed July 23, 1959 16 Sheets-Sheet 7

INVENTORS
Carl G. Eilers
Melvin C. Hendrickson
Richard C. Herrmann
BY James E. Tracy
ATTORNEY INVENTORS
Carl G. Eilers
Melvin C. Hendrickson
Richard C. Herrmann
BY James E. Tracy
ATTORNEY Feb. 27, 1962 C. G. EILERS ET AL 3,023,270

COMPUTER AND A METHOD OF COMPUTING

Filed July 23, 1959 16 Sheets-Sheet 14

INVENTORS
Carl G. Eilers
Melvin C. Hendrickson
Richard C Herrmann
BY James E. Tracy
ATTORNEY Feb. 27, 1962 C. G. EILERS ET AL 3,023,270

COMPUTER AND A METHOD OF COMPUTING

Filed July 23, 1959 16 Sheets-Sheet 15

INVENTORS
Carl G. Eilers
Melvin C. Hendrickson
Richard C. Herrmann

BY James E. Tracy
ATTORNEY

INVENTORS
Carl G. Eilers
Melvin C. Hendrickson
Richard C. Herrmann
BY James E. Tracy
ATTORNEY 3,023,270
Patented Feb. 27, 1962

3,023,270

COMPUTER AND A METHOD OF COMPUTING

Carl G. Eilers, Fairbury, Melvin C. Hendrickson, Elmhurst, and Richard C. Herrmann, Chicago, Ill., assignors to Zenith Radio Corporation, a corporation of Delaware

Filed July 23, 1959, Ser. No. 829,107
9 Claims. (Cl. 178—5.1)

This invention relates in general to a novel computer and method of computing which finds utility in a variety of different fields. More particularly, in accordance with one aspect, the invention relates to a method of producing control effects calculated to change the operating state of a system from its instantaneous state to a selected one of several operating states.

The invention is to be described in connection with a pathfinding problem in the field of secrecy communication, but before that field is considered it is expedient to discuss in general terms the logic surrounding the computer of the present invention.

There are many physical systems which are characterized by the fact that they possess several equilibrium or stationary states; in the absence of extended forces or other external stimuli, they will remain in any of these states indefinitely, or at least for relatively long periods of time. By the application of suitable stimuli, transitions from one to another of these stationary states may be induced. In many such systems it is possible for the system, acted upon by suitable stimuli, to make transitions from any particular stationary state to certain other, but not all other stationary states. Generally, the transition induced by a specific stimulus will depend on the nature of the stimulus and upon the state of the system to which the stimulus is applied.

Consider then such a system in a stationary state $r$. It is desired to bring the system into another of its stationary states $s$ and the direct transition $r \rightarrow s$ is not allowed. Under these conditions it may be possible to bring the system from state $r$ to state $s$ by causing it to pass through a succession of other stationary states between which there do exist allowed transitions.

Thus it becomes of interest to determine whether there exists a path from $r$ to $s$ made up of allowed transitions, and in particular whether such a path exists subject to some specified limitation on the number of allowed transitions which may be used in constructing the path. Furthermore, if a path exists under the specified limitation, it is desired that the path be specified, first in terms of the allowed transitions which make it up and their order, and, second, in terms of a set of stimuli and their order of application. If more than one path exists meeting the required conditions a selection among such paths is required, and if the system may be caused to follow a selected path by the application of more than one set of stimuli a selection between such alternate sets of stimuli is necessary. If no path exists under the specified conditions, an indication to this effect is likewise required.

A typical problem is the following. A system is specified by enumerating its stationary states and all allowed transitions between pairs of such states and for each such transition the stimuli capable of inducing it. Let the stationary states be:

$$S_1 \quad S_2 \quad — \quad S_r \quad — \quad S_N$$

a total of N stationary states in all.

Let the allowed transitions be tabulated by indicating for each state 1 all states $p$ to which transitions are allowed. Further, for each allowed transition $A_{1p}$, let the stimuli capable of producing it be designated.

For a system so specified the pathfinder of the present invention solves this problem:

For any pair of states $r$ and $s$ does there exist a path made up of not more than $n$ transitions, starting at state $r$ and ending at state $s$? If a unique path exists, it is specified. If more than one path exists, a selection, preferably at random, is made between alternate paths, and if the selected path may be induced by more than one set of stimuli, a selection, preferably at random, is made among such sets of stimuli and the selected set specified.

Consider N independent binary devices, which are represented by circles, and numbered from 1 to N. The $p$th of these binaries which is in state 1, the others being in state zero, may represent the $p$th state of the system. It is assumed that each binary is provided with resets to both its states 0 and 1, and with a flipping or common input.

A second set of such binary devices may be used to represent the state or possible states of the system at some other moment, say after the first of the $n$ steps referred to above

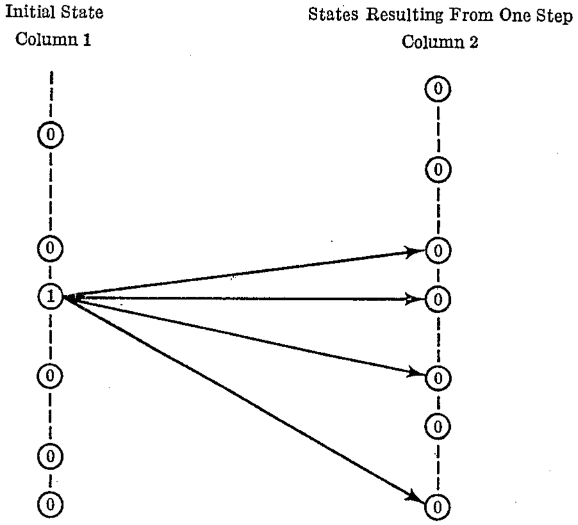

In the above illustration the left-hand column (column 1 - -) of circles represents N binaries, of which the $r$th is in state 1. Lines drawn to circles in the right-hand column (column 2) from the $r$th circle in the left-hand column represent the effect upon the system in state $r$ of the various stimuli which are effective upon the system in state $r$. Consider that each such line is replaced by a connection so made that when the binary in the first column representing state $r$ is reset to state 0 a pulse will be transmitted to the binaries at the other ends of the lines causing these binaries to assume state 1. So by resetting binary $r$ in the first column, transferred to state 1 in the second column are those binaries which represent states reachable in one step from state $r$. In like manner each of the remaining N—1 binaries in column 1 may be appropriately connected to binaries in column 2, representing states reachable in one step from the state represented by each binary of column 1.

If now the binaries of column 2 are similarly connected to N binaries of a 3rd column, a representation may be achieved in the 3rd column of all states attainable after two steps starting from any specified state. This can obviously be extended to columns of binaries in addition to the first, and the $n+1$st column will show what states may be reached from a specified initial state after $n$ steps.

In the interest of economy, the same column of N binaries may be used to represent successively the $n+1$ columns mentioned above. It is merely necessary to delay the transmission of pulses along the lines representing possible transitions and to terminate these lines at binaries of the 1st column corresponding to those upon which they are shown terminated in the 2nd column. After $n$ stages of operation, this one column will display the same information as would the $n+1$st column mentioned above.

This solves in principle the problem of determining those states which may be reached from a specified initial state after 1, 2 . . . $n$ steps. In particular, it determines whether there is a path from state $r$ to state $s$, but it does not explicitly point out the path or paths.

In order to see how this may be accomplished, consider an analogous column of binaries (for reasons soon to become clear, this will be called the backward stepping column to distinguish from that described earlier, the forward stepping column) which will be set up initially to represent the desired final state $s$. Evidently binary $s$ may be caused to pulse those binaries representing states which, in one step, may make transitions to state $s$. Pulsing this column 1, 2 . . . n times will cause it to display successively all states which after 1, 2 . . . $n$ steps may make transitions to state $s$.

Let the forward column be pulsed $q$ times, the backward column $n-q$ times. Since the forward column displays all states reachable from $r$ in $q$ steps, and the backward column all states from which $s$ may be reached after $n-q$ steps, it is necessary to look for states now represented in both columns, for these are the states reachable from $r$, and from which it is possible to reach $s$.

A coincidence device may be used to find these states. All paths from $r$ to $s$ evidently go through them. If there is a unique path from $r$ to $s$, there will be a single coincidence for each $q$ from 1 to $n-1$ and the path is uniquely determined. In case alternative paths are presented, a choice may be made in either of two slightly different ways.

The forward column is pulsed once, the backward column $n-1$ times. If only one coincidence appears, the path is unique to this stage and the forward column must be pulsed again, the backward column pulsed $n-2$ times and the process continued until 2 or more coincidences appear. Suppose that happens first on comparing the results of $t$ forward and $n-t$ backward steps when it is found that possible paths go by way of states $u$, $v$, $w$. A selection is made among these. Let the state selected be $v$. From this point the process proceeds as a problem of finding the path from $v$ to $s$ in $n-t$ steps.

If the choice between paths is made by random means a slightly different weighting of alternative paths will result if, at the stage $t$ of the previous paragraph, no immediate choice is made, but all paths from $u$, $v$, $w$ to $s$ are explored until the maximum number of coincidences is found, the choice being made at this stage. For example, there may be unique paths from $v$, $w$, to $s$, but two paths from $u$. If a choice is simply made between $u$, $v$, $w$ without further information, the paths going by $u$ may be given less weight than given those via $v$ and $w$.

If the choice is made at the stage of maximum number of coincidences, subsequent to this choice it is necessary to solve the problem of $r$ to $z$ in $t_1$ stages and $z$ to $s$ in $n-t_1$ stages. This will considerably complicate the driving mechanisms.

It should be pointed out that the solvability of a specified problem by means of the above logic is in no way affected by failure to include in the table of stationary states all such states for a given system, or by failure to include certain transitions or stimuli. The problem solved will apply subject to the condition that the states, transitions, and stimuli omitted are not to be employed. If there are included states together with transitions into such states but none out of them, the logic will still provide correct answers, albeit of little practical interest. It is to be noted that inclusion in the table of stimuli capable of producing transitions between any included and any excluded states may lead to answers not corresponding to the problem posed.

If among the allowed transitions there are included for all N states the transition to the same state, $A_{rr}$, the logic will provide correct solutions to the problem of finding paths of $n$ steps or fewer, if the step $S_r \rightarrow S_r$ is considered a null step.

Furthermore the logic above will continue to apply if there are included in the table of transitions certain compound transitions, i.e., $S_x \rightarrow S_z$ in which the transition is brought about by $S_x \rightarrow S_w \rightarrow S_z$ provided only that there are correctly included proper stimuli capable of inducing such compound transitions.

In accordance with another aspect, the invention pretains to a code generator for producing a coded signal for a secrecy communication system to establish the system in a selected one of several possible operating states as determined by the code pattern of the coded signal. The invention has particular application to a distortion problem which may be encountered in a subscription television system and for that reason will be described in such an environment.

The term "encoding" is used herein in its generic sense to encompass either coding at the transmitter or decoding at the receiver, since the coded signal may be utilized in either the coding apparatus in the transmitter or the decoding apparatus in the receiver.

Secrecy communication systems have been proposed in which an intelligence signal, for example an audio signal, is coded by altering some characteristic thereof, such as phase, at spaced time intervals determined by a coding schedule made known only to authorized receivers. Most such systems do effect adequate coding or scrambling of the intelligence signal but the signal, as coded, may have a D.C. component in addition to an A.C. component, resulting from the fact that the phase inversions occur at different points in the signal cycles. Most transmitters of conventional design are not capable of transmitting a D.C. component so that only the A.C. portion of the coded intelligence signal is radiated. When the A.C. component alone is applied to the decoding apparatus of each receiver and the output therefrom is utilized to operate a sound reproducer, distortion results. Such distortion is inevitable unless the decoder operates upon the same signal as that produced by the coder at the transmitter, and the necessary identity of signals is not obtainable when the transmitter radiates less than all components of the coded intelligence signal. This identity may also be destroyed in the receiver if the coupling networks do not translate the low-frequency components of the received signal.

Of course, it is theoretically possible to employ a perfect, carefully designed, D.C. modulator in a transmitter, such as in a frequency modualted audio transmitter, that has a high degree of stability. Moreover, a perfect frequency detector may be used at the receiver to reproduce the D.C. component. If the circuits employd are not absolutely stable in operation, however, objectionable frequency drift results. As a consequence, it is impractical to transmit and reproduce a D.C. component of a coded intelligence signal in this matter.

One arrangement for overcoming this problem is disclosed and claimed in Patent 2,872,507, issued February 3, 1959, in the name of Walter S. Druz and assigned to the present assignee. There a system is suggested for transmitting and reproducing the D.C. component as well as the A.C. component of an audio signal which has been coded by inverting its phase from time to time in accordance with a code schedule. The Druz arrangement avoids the distortion otherwise introduced during the decoding process when the D.C. component is not conveyed. Briefly, the D.C. component is amplitude modulated on a sub-carrier at the transmitter, preferably in a suppressed carrier modulator, and then both the A.C. component and the D.C. modulated sub-carrier are frequency modulated on a main carrier for transmission to a receiver. The main carrier wave is first demodulated at the receiver to recover the A.C. component and the D.C. modulated sub-carrier, and subsequently the D.C. component is derived by means of a second demodulator, such as a synchronous detector. The A.C. and D.C. components are then both employed in the decoding process to develop a signal which corresponds to the original uncoded audio signal.

While the Druz system, Patent 2,872,507, does eliminate the distortion otherwise present when the D.C. component of the coded intelligence is not reproduced in the receiver, such a system does exhibit the obvious disadvantage that certain circuitry is required at each receiver. Copending application Serial No. 829,103 filed concurrently herewith, in the name of Walter S. Druz, and assigned to the present assignee, teaches the basic concept of "programming" each portion of the code schedule prior to the transmission of a corresponding portion of audio information in such a manner that phase inversion of the audio signal occurs at times calculated to result in a D.C. component in the coded audio signal which is as small as possible and thus of negligible effect, so that it is not necessary to provide for the transmission of the D.C. component. That copending application explains in considerable detail that when an intelligence signal, such as an audio signal, is phase inverted at an instant or point in a cycle when the amplitude level is not close to or at a peak, distortion results. Such distortion gives rise to an objectionable "ping" in the reproduced audio and is attributable to the fact that a D.C. component, which is developed by the phase inverting coding process, of the coded audio has not been successfully translated and employed in the receiver decoder in reconstituting the intelligence in uncoded form. An arrangement is described in the concurrently filed Druz application which effectively determines the required phase of a control signal to achieve phase inversions of the audio when it is passing through its peaks, or at least very close to the peaks, in order that negligible ping distortion is generated. The desired phase condition may be considered an operating state selected from several possible operating states. The present application describes a code generator which may be used in conjunction with the Druz minimum-ping selector in order to develop a coded signal which represents the selected operating state.

Accordingly, it is an object of the present invention to provide a method for producing control effects for changing the operating state of a system.

It is another object of the invention to provide a novel computer for producing control effects for controlling the operating state in which a system is established.

It is a more specific object of the invention to provide a method for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval.

In accordance with one aspect of the invention, this method is practiced by (1) determining as a starting operating state that state in which the system is established during a first state-determining interval, (2) selecting one destination operating state in which the system is to be established during a subsequent, second state-determining interval, (3) developing a control effect representing a transition from the starting state to the one destination state, (4) determining all of the operating states impossible to reach from the one destination operating state during a subsequent, third state-determining interval, (5) selecting from those operating states which are accessible a second destination state, and (6) developing a control effect representing a transition from the one destination state to the second destination state.

The features of this invention which are believed to be new are set forth with particularity in the appended claims. The invention, together with further objects and advantages thereof, may best be understood, however, by reference to the following description in conjunction with the accompanying drawings, in which:

Figure 5:
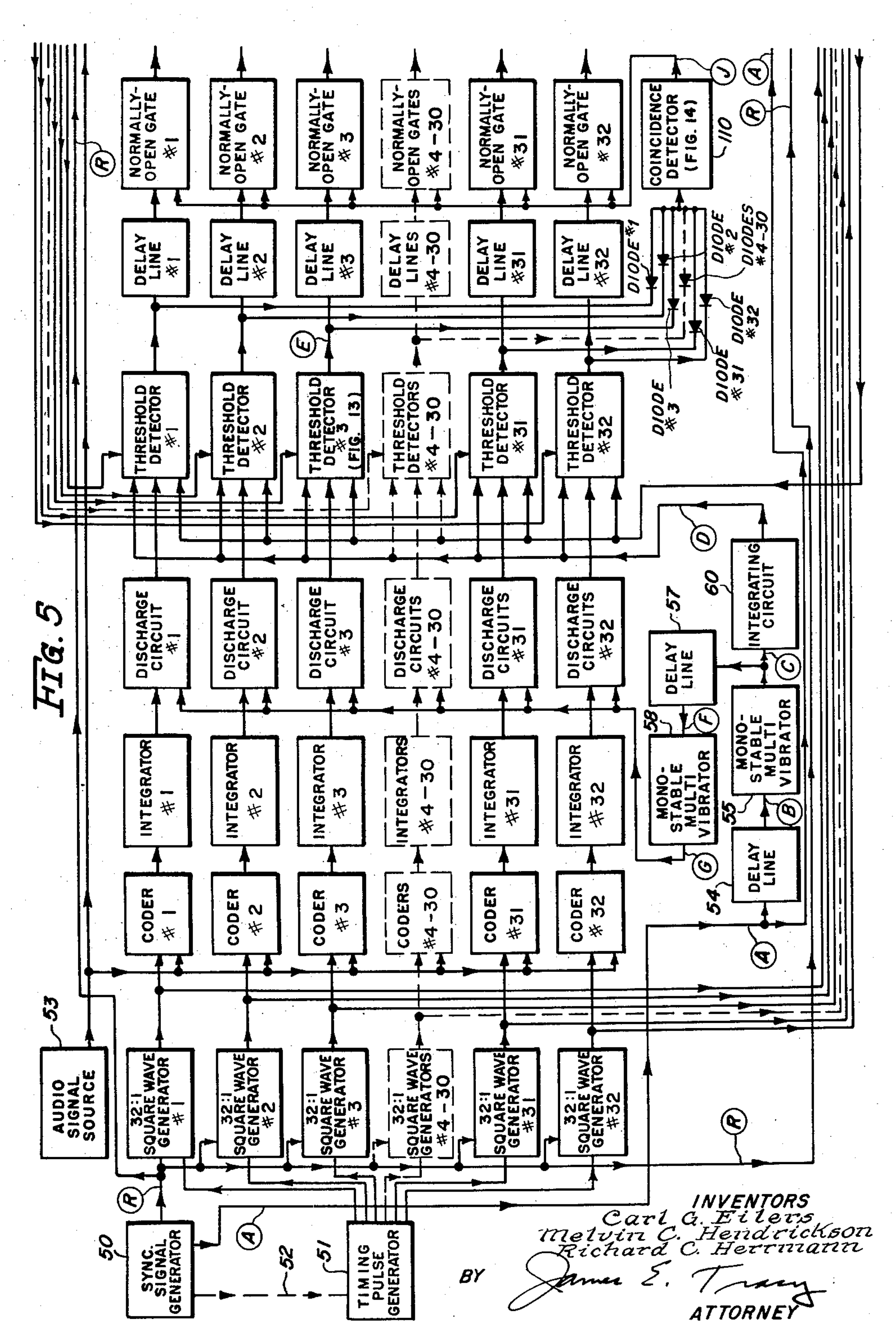
Figure 6:
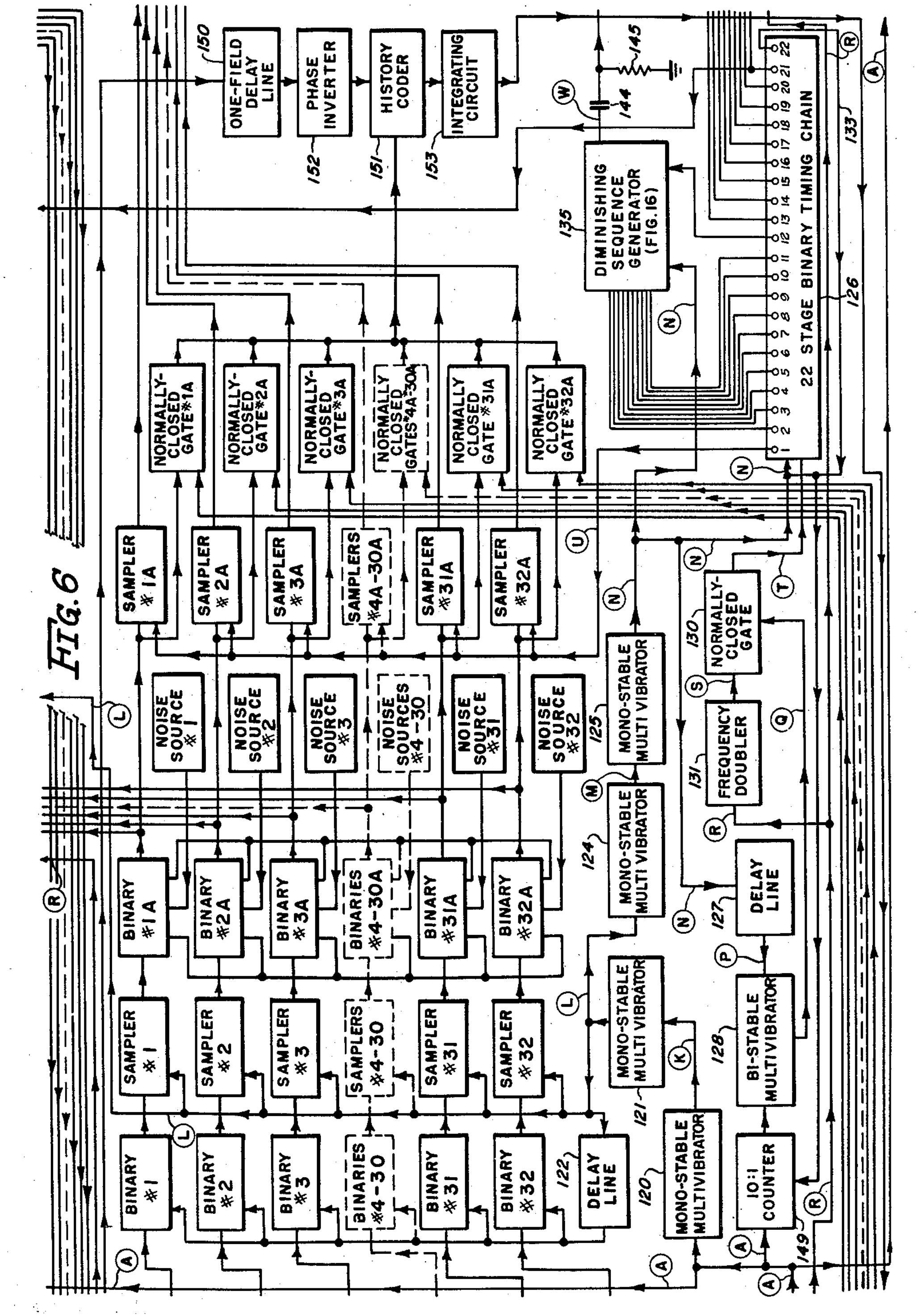
Figure 7:
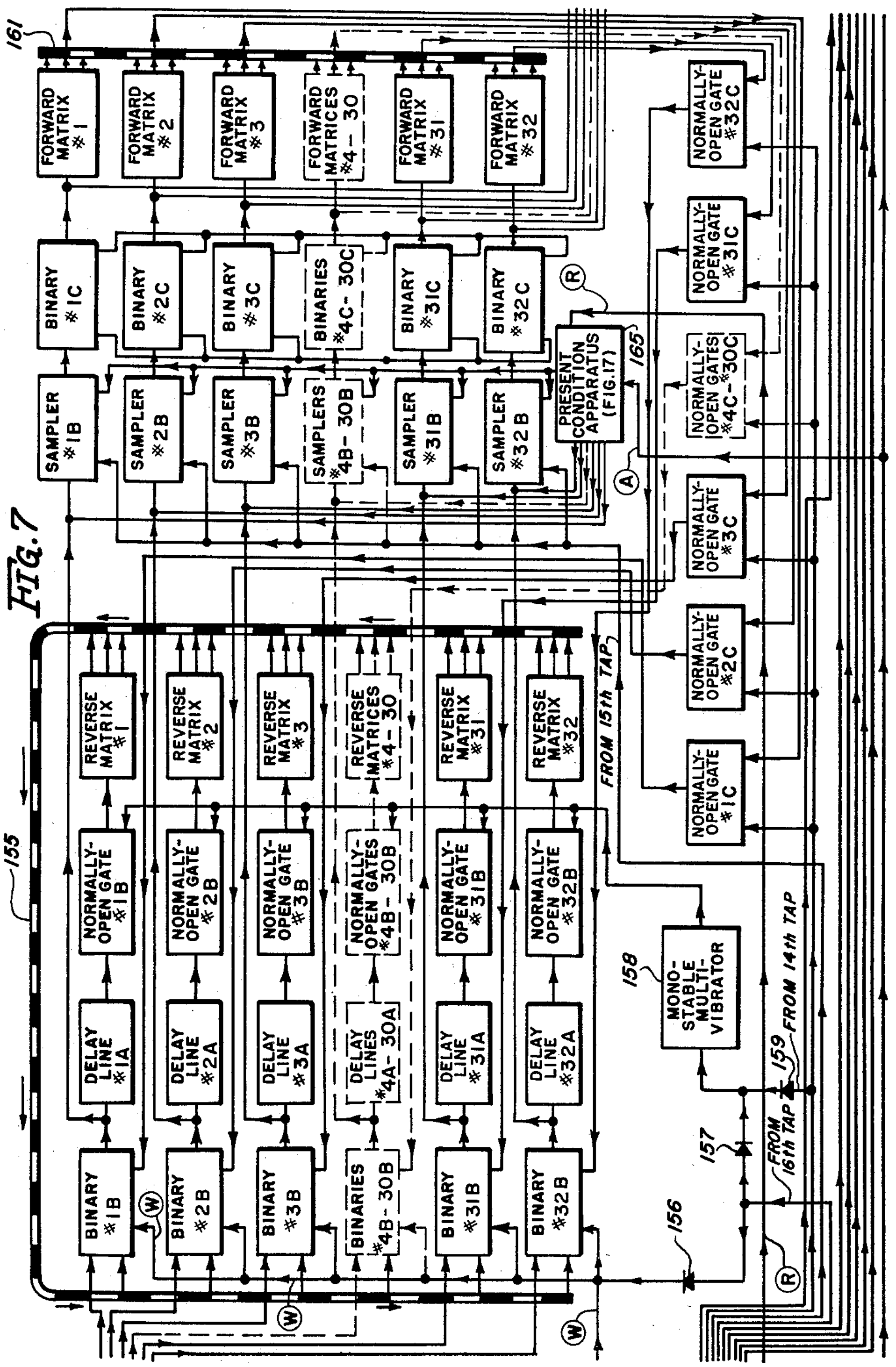
Figure 8:
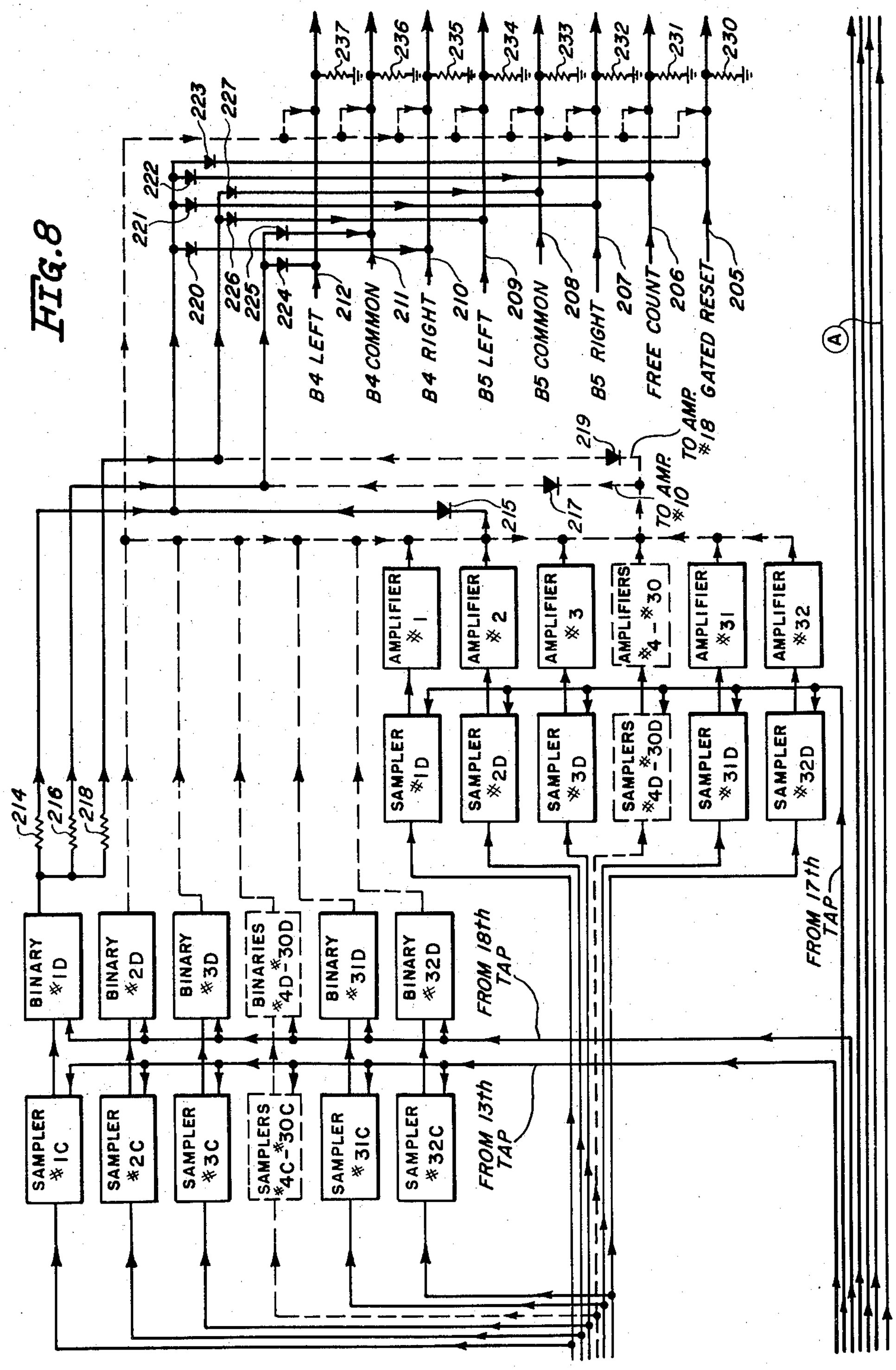
Figure 10:
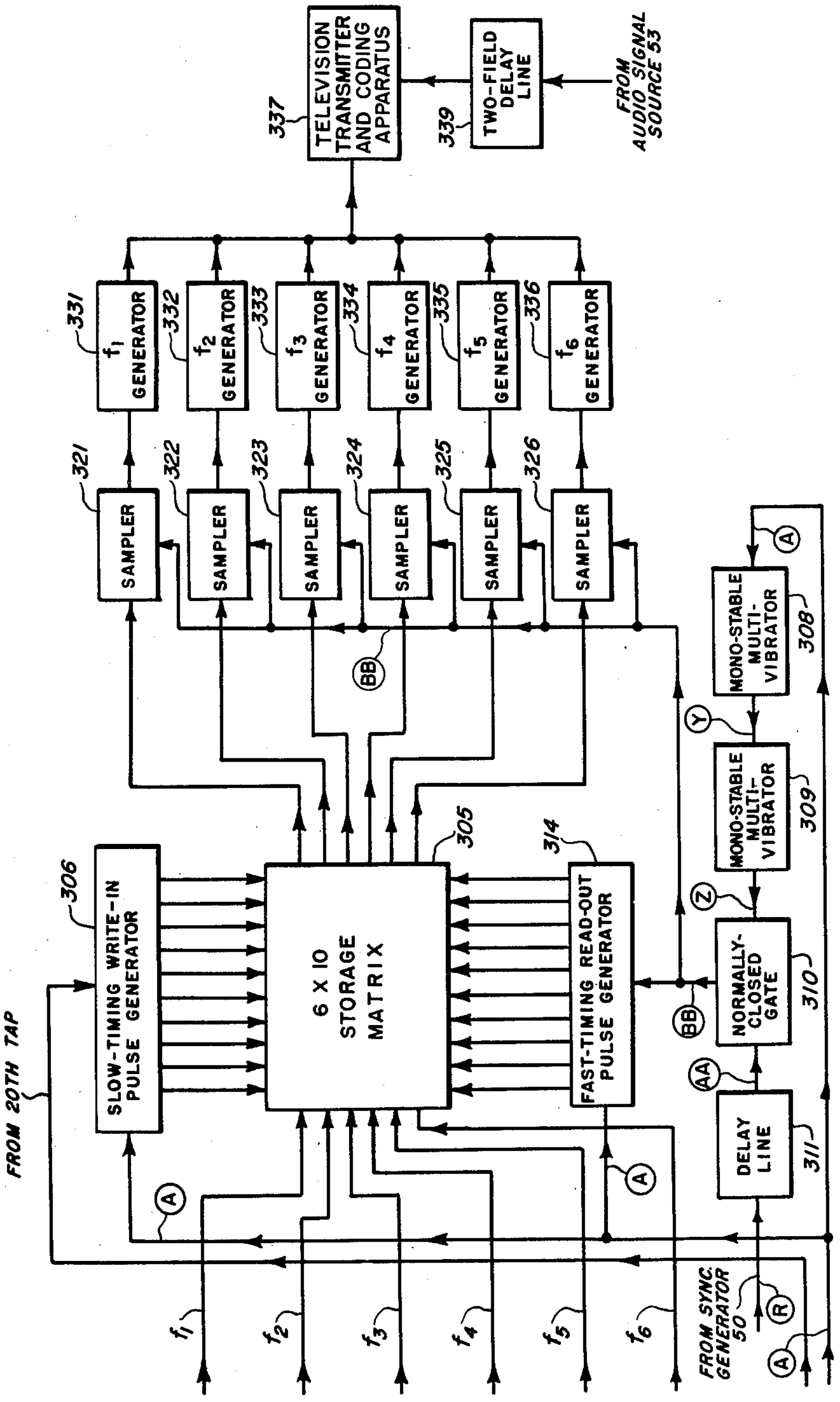
Figure 11:
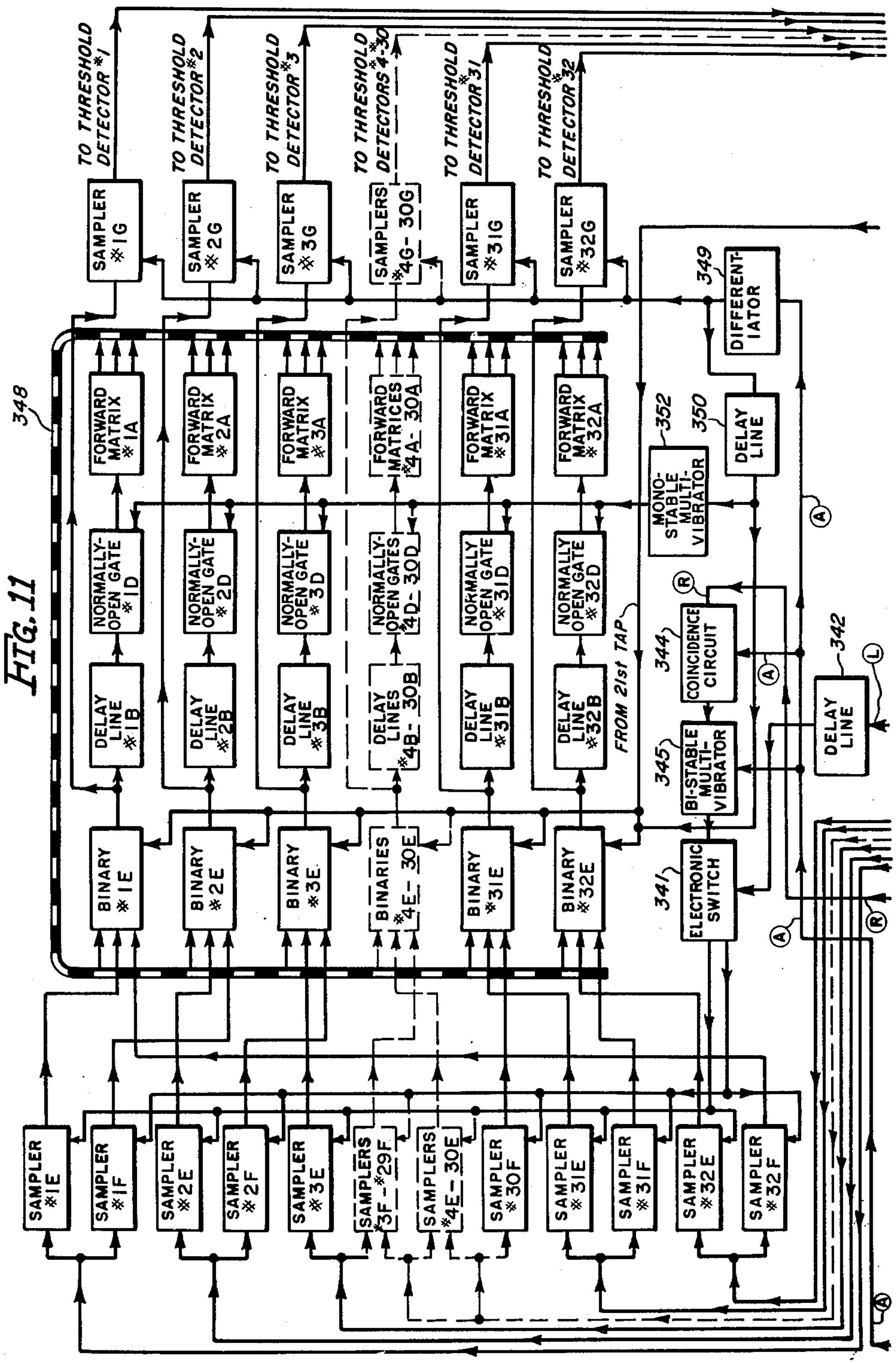
Figure 12:
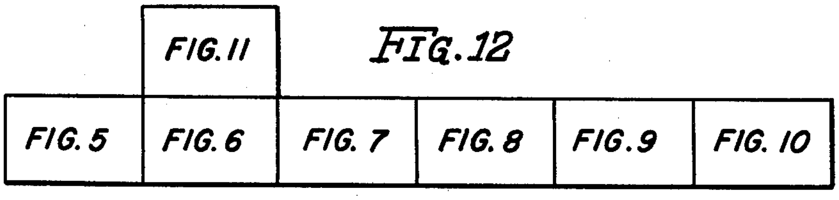
Figures 13, 14:
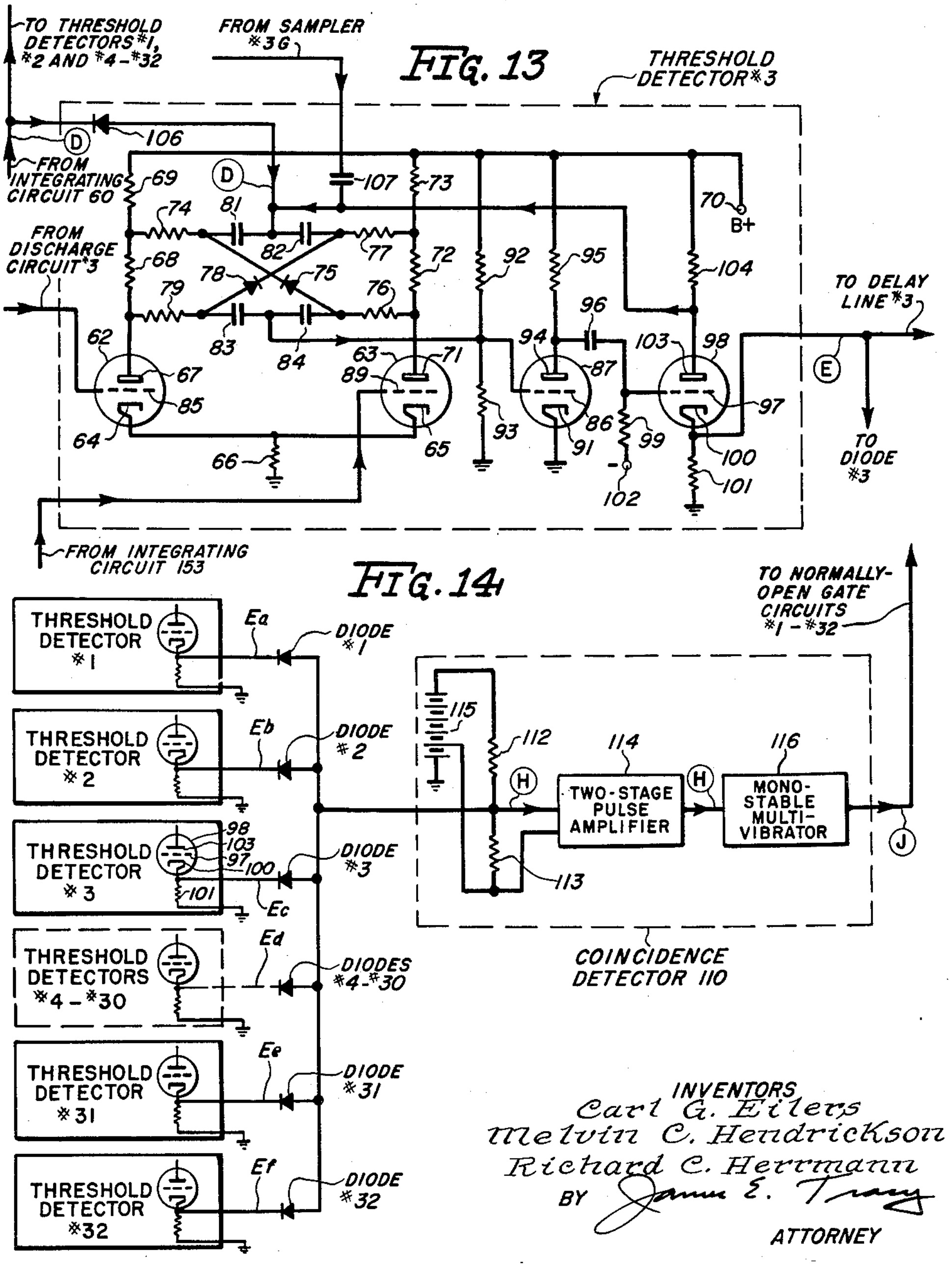
Figure 15:
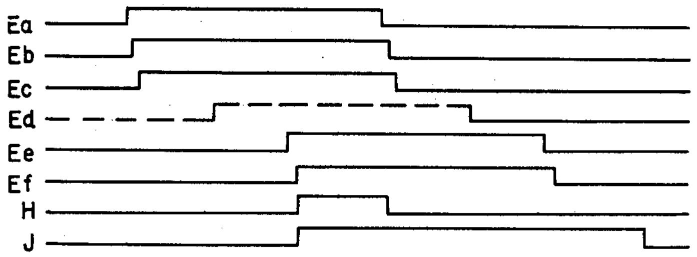
Figure 16:
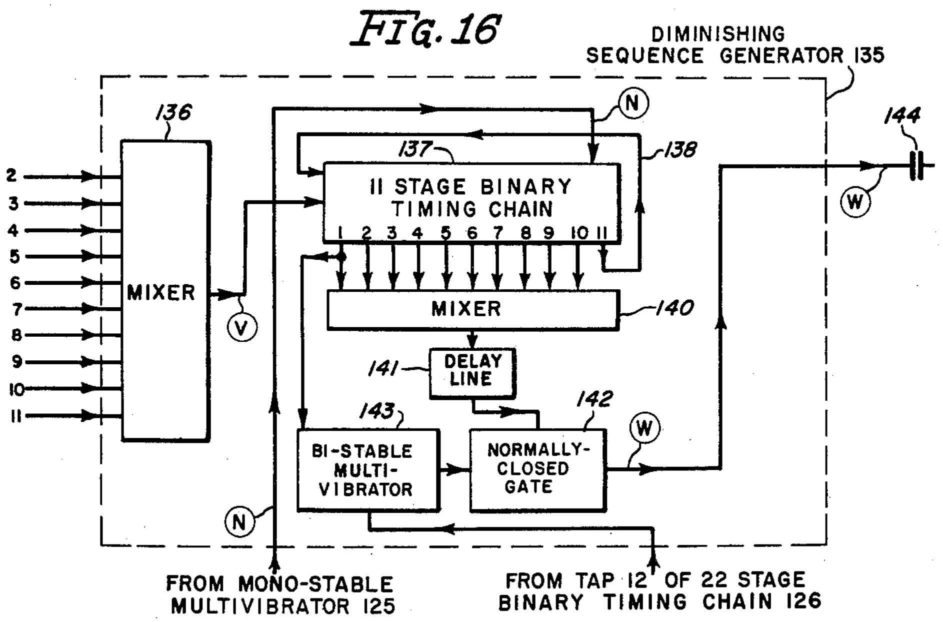
Figure 18:
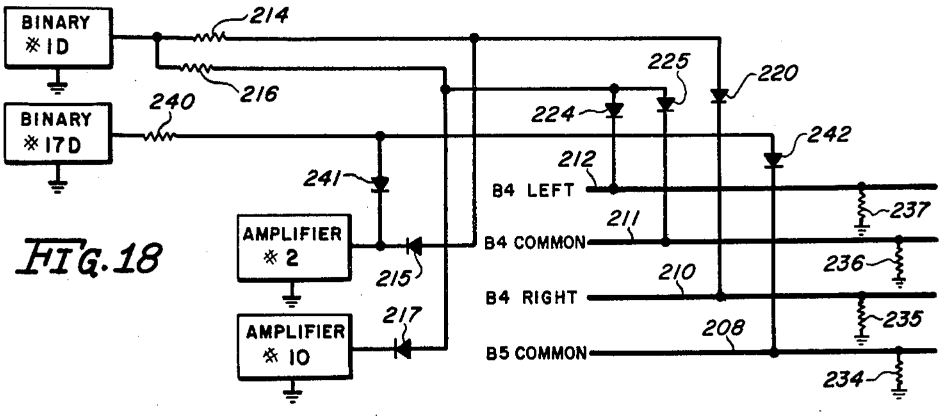
Figure 17:
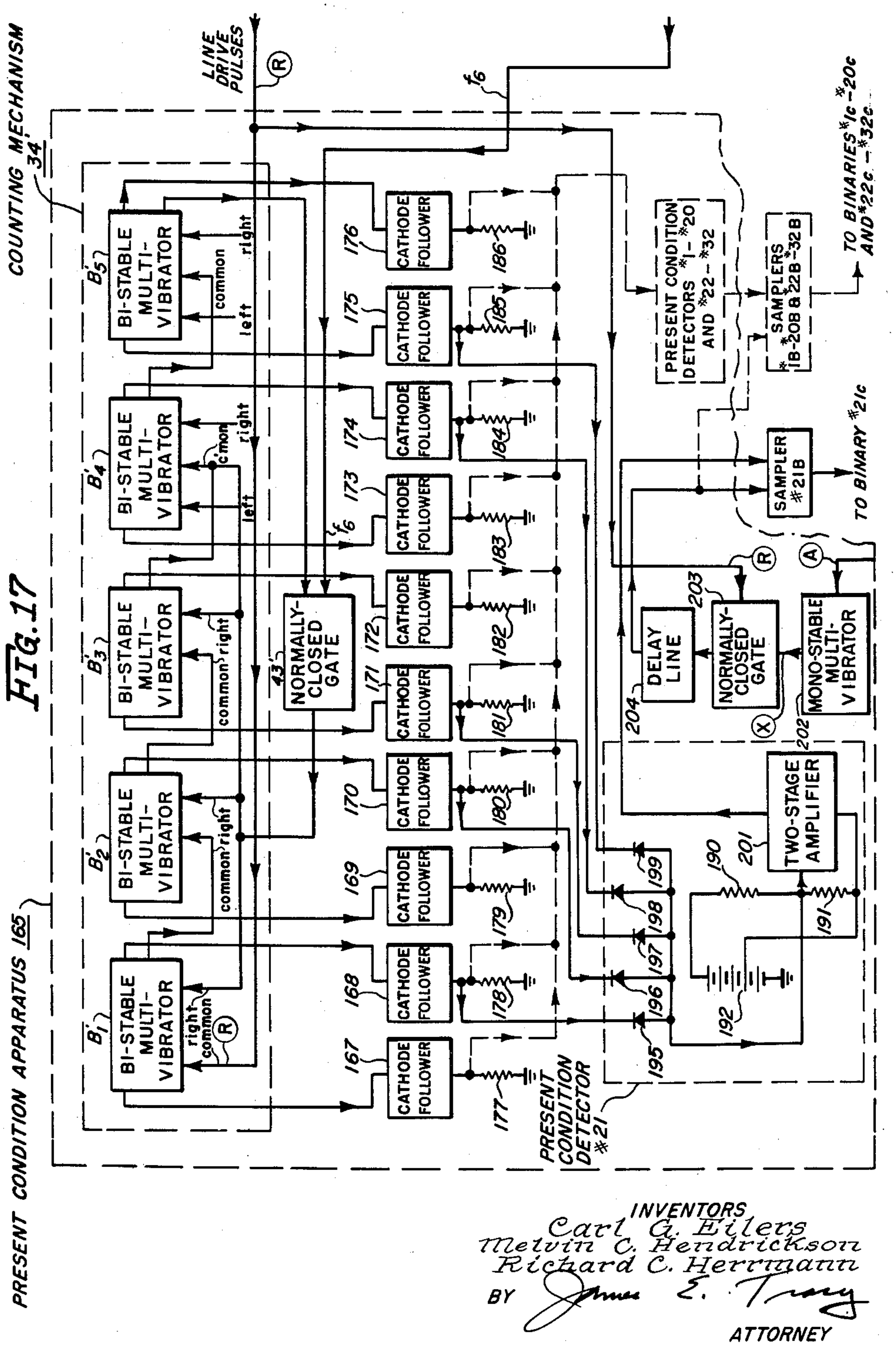
Figure 19:
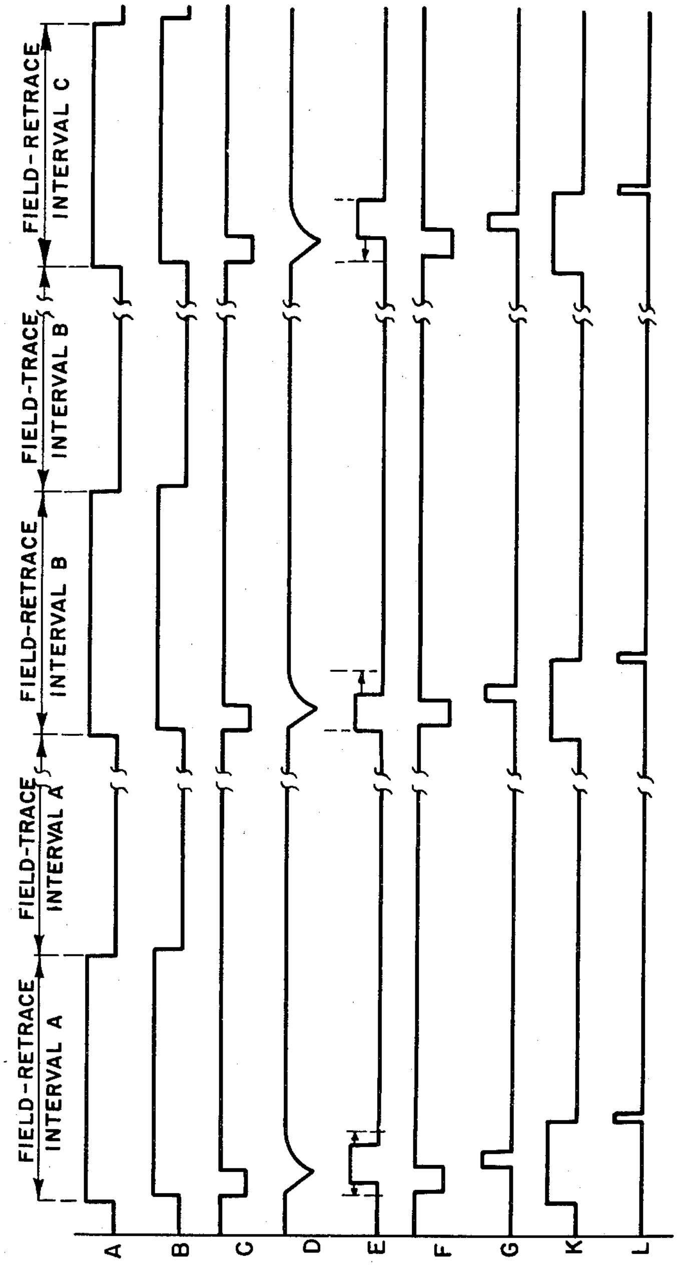
Figure 20:
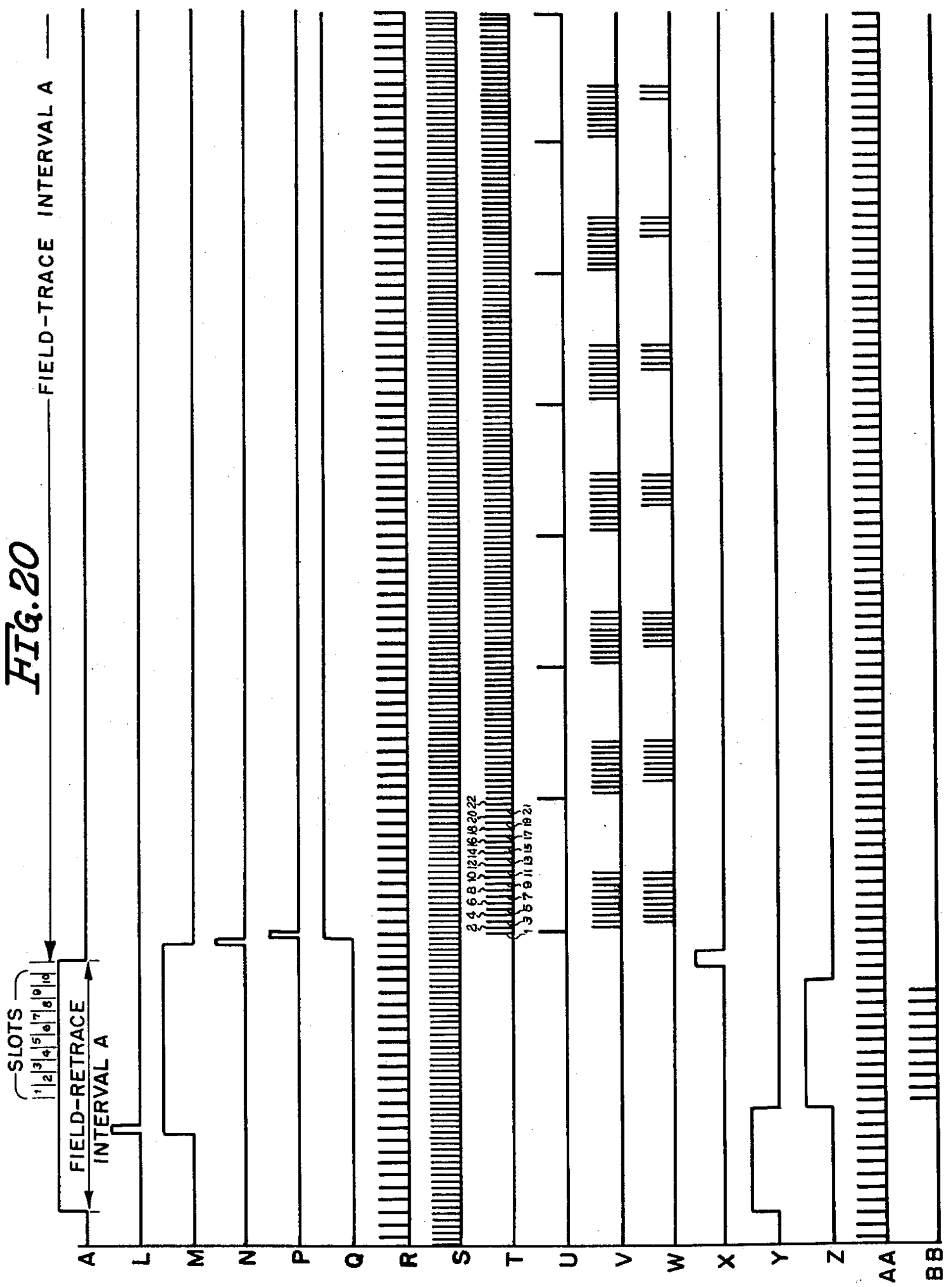
Figure 21:
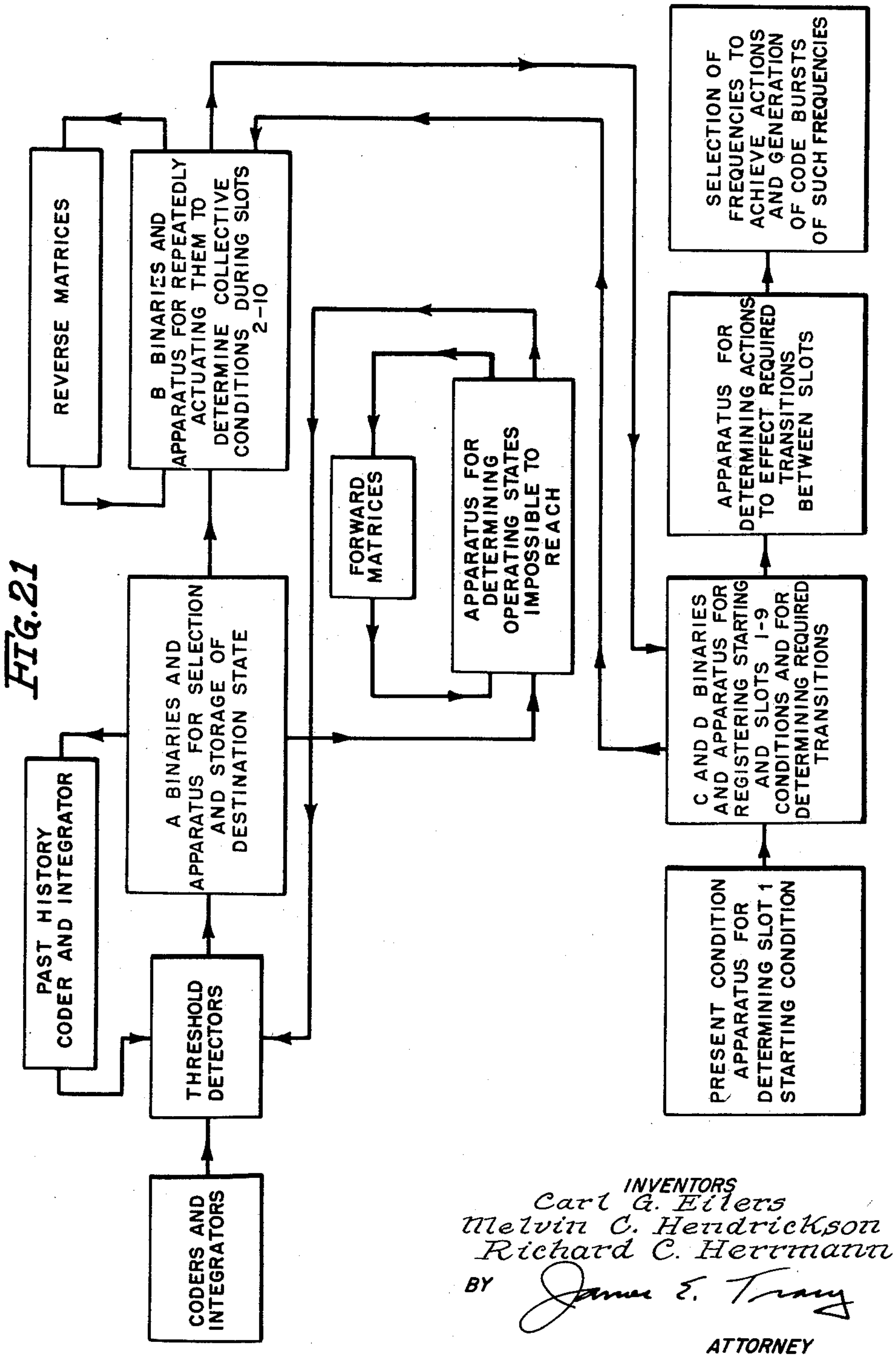

FIGURES 5–11 considered collectively illustrate a code generator constructed in accordance with the invention;

FIGURE 12 is a layout diagram illustrating the manner in which FIGURES 5–11 should be physically arranged to display the entire generator;

FIGURES 13 and 14 are more detailed schematic representations of portions of FIGURE 5;

FIGURE 15 is a series of wave forms helpful in explaining the operation of the arrangement of FIGURE 14;

FIGURE 16 is a detailed illustration of a portion of FIGURE 6;

FIGURE 17 shows a more detailed schematic representation of a portion of FIGURE 7;

FIGURE 18 includes only a portion of FIGURE 8 for convenience of explanation;

FIGURES 19 and 20 show various signal wave forms useful in discussing the operation of the code generator; and, FIGURE 21 is a simplified combination structural and functional block diagram representation of the entire generator.

Before considering the structural and operational details of the illustrated embodiment of the invention, it is imperative to present certain background material which is an absolutely essential prerequisite to an understanding of the description of the code generator itself. For this reason, the subscription television system of FIGURE 1, which may be incorporated in either a transmitter or receiver, has been included. It, of course, constitutes no part of the present inventive concept, and in fact is disclosed in slightly different form in considerably more detail and claimed in copending application Serial No. 479,170, filed December 31, 1954, in the name of Erwin M. Roschke, and assigned to the present assignee. Consequently, a brief description only is included here. In short, the arrangement of FIGURE 1 develops a square wave shaped control signal phase modulated about a mean frequency and may be used to invert the phase of an audio signal each time its amplitude changes. Phase modulation of the periodically recurring square wave is achieved by interrupting or disrupting the periodic pattern from time to time during spaced state-determining intervals in accordance with a code schedule so that the phase of the control signal is changed from one to the other of the intervening time intervals as between several possible operating states or phase conditions.

More particularly, this is accomplished by employing a control or cyclic counting mechanism 34 comprising five cascade connected bi-stable multivibrators, designated $B_1$–$B_5$, which is actuated in response to line-drive pulses (derived from the sync generator of a transmitter and from the line-sweep system of a receiver) to develop a square wave control signal having amplitude changes after each series of sixteen line-trace intervals. Each one of the bi-stable multivibrators may be conventional in construction and may consist of two cross-coupled triodes rendered conductive in alternation as the multivibrator is triggered between its two stable operating conditions. Each one of multivibrators $B_1$–$B_5$ also has two input circuits designated "Common" and "Rights," pulses of negative polarity applied over the Common input triggering the multivibrator from its instantaneous condition, whatever one that may be, to its opposite condition, and negative pulses applied over the Right input actuating the multivibrator to a predetermined one only of its two operating conditions, if it is not already there. Additionally, each of multivibrators $B_4$ and $B_5$ has another input circuit labeled "Left" and negative pulses applied over that input actuate the associated multivibrator to the other of its two operating conditions, if it is not already there.

In order that multivibrators $B_1$–$B_5$ collectively serve as a 32:1 counting mechanism, the Common input of multivibrator $B_1$ should be connected to the source of line-drive pulses and the output of that multivibrator and also the output of multivibrators $B_2$–$B_4$ should individually be connected to the Common input of the succeeding multivibrator. In this way, the multivibrators of mechanism 34 together exhibit thirty-two different operating conditions and are stepped from one condition to the next in a predetermined sequence and in thirty-two steps in completing a cycle of operation. For convenience of illustration, the two stable operating conditions of each multivibrator may be designated 0 and 1.

In order to establish a convention at this time, it will be assumed that when the left hand triode (not shown) in each multivibrator is conducting the multivibrator may be said to be in its condition 0, whereas when the right hand triode (not shown) is that which is conducting, the multivibrator may be considered to be established in condition 1. Assume further that when all the left hand triodes are conducting, and thus when each multivibrator is in its 0 condition, the entire counting mechanism may be considered to be in its first collective operating condition. In response to the negative polarity line-drive pulse applied to bi-stable multivibrator $B_1$, that multivibrator only triggers to its condition 1 but all of the others remain at 0. In response to the next line-drive pulse, multivibrator $B_1$ triggers back to its 0 condition and in so doing supplies a pulse to multivibrator $B_2$ to establish it in condition 1. The bi-stable multivibrators of mechanism 34 respond in similar fashion to additional incoming line-drive pulses as shown by the following table (designated Table I) which illustrates the condition of each multivibrator in each collective operating condition:

TABLE I

| Collective conditions | $B_1$ | $B_2$ | $B_3$ | $B_4$ | $B_5$ | Collective conditions | $B_1$ | $B_2$ | $B_3$ | $B_4$ | $B_5$ |
|---|---|---|---|---|---|---|---|---|---|---|---|
| 1 | 0 | 0 | 0 | 0 | 0 | 17 | 0 | 0 | 0 | 0 | 1 |
| 2 | 1 | 0 | 0 | 0 | 0 | 18 | 1 | 0 | 0 | 0 | 1 |
| 3 | 0 | 1 | 0 | 0 | 0 | 19 | 0 | 1 | 0 | 0 | 1 |
| 4 | 1 | 1 | 0 | 0 | 0 | 20 | 1 | 1 | 0 | 0 | 1 |
| 5 | 0 | 0 | 1 | 0 | 0 | 21 | 0 | 0 | 1 | 0 | 1 |
| 6 | 1 | 0 | 1 | 0 | 0 | 22 | 1 | 0 | 1 | 0 | 1 |
| 7 | 0 | 1 | 1 | 0 | 0 | 23 | 0 | 1 | 1 | 0 | 1 |
| 8 | 1 | 1 | 1 | 0 | 0 | 24 | 1 | 1 | 1 | 0 | 1 |
| 9 | 0 | 0 | 0 | 1 | 0 | 25 | 0 | 0 | 0 | 1 | 1 |
| 10 | 1 | 0 | 0 | 1 | 0 | 26 | 1 | 0 | 0 | 1 | 1 |
| 11 | 0 | 1 | 0 | 1 | 0 | 27 | 0 | 1 | 0 | 1 | 1 |
| 12 | 1 | 1 | 0 | 1 | 0 | 28 | 1 | 1 | 0 | 1 | 1 |
| 13 | 0 | 0 | 1 | 1 | 0 | 29 | 0 | 0 | 1 | 1 | 1 |
| 14 | 1 | 0 | 1 | 1 | 0 | 30 | 1 | 0 | 1 | 1 | 1 |
| 15 | 0 | 1 | 1 | 1 | 0 | 31 | 0 | 1 | 1 | 1 | 1 |
| 16 | 1 | 1 | 1 | 1 | 0 | 32 | 1 | 1 | 1 | 1 | 1 |

For example, when multivibrators $B_1$–$B_5$ are collectively established in their 22nd operating condition, multivibrators $B_1$, $B_3$ and $B_5$ are in condition 1 and multivibrators $B_2$ and $B_4$ are in condition 0.

The amplitude changes of the output signal of multivibrator $B_5$ may be utilized for actuating a phase inverting encoding device 33 between two different conditions of operation, each of which establishes the system in a different operating mode. In other words, in one condition an applied audio signal may be phase inverted, whereas in the other condition it is not Counting mechanism 34 and encoding device 33 together constitute encoding apparatus for varying the operating mode of the system.

Of course, a periodically varying square wave without interruption or phase change has very little security and thus in the aforementioned Roschke application the three input circuits of each of multivibrators $B_4$ and $B_5$ are connected to various output circuits of a switching mechanism 35, the input circuits of which are connected through a family of normally-closed gate circuits 36–40 to the output circuits of a series of filter and rectifier units shown for convenience as a single block 42. Each of the gate circuits is also supplied with line-drive pulses from either the sync generator in a transmitter environment or a line-sweep system in a receiver.

With this arrangement, during a portion of each field-retrace interval, which may be called a "state-determining interval," a combination of randomly sequenced code signal bursts or components, individually having a predetermined one of five different identifying frequencies (designated frequency $f_1$, $f_2$, $f_3$, $f_4$, or $f_5$), is developed and supplied to filter and rectifier units 42. There the bursts are segregated from one another with respect to frequency and are utilized to gate in selected line-drive pulses with negative polarity over the input circuits labeled $f_1$–$f_5$ to switching mechanism 35 wherein they are routed or channeled in accordance with any one of a multiplicity of different permutation patterns as established by switching mechanism 35 (a sample pattern being shown by the dashed construction lines) to the input circuits of each of multivibrators $B_4$ and $B_5$. One output circuit of switching mechanism 35 is grounded so that some of the signal bursts may be "thrown away." Of course, it is contemplated that the adjustment of switching mechanism 35 may be changed for each program interval, the particular adjustment being made known only to authorized subscribers.

A "gated reset" feature is also disclosed, as in the case of the aforementioned Roschke application, in that a translating means in the form of a normally-closed gate circuit 43 has its input circuit connected directly to another normally-closed gate 44 which in turn is connected to one of the filter and rectifier units in block 42. Gate 44 is also connected to the source of line-drive pulses. Translating means 43 has another input circuit connected to the output of multivibrator $B_5$ and its output circuit is connected to the Right input circuits of multivibrators $B_1$, $B_2$, and $B_3$ and also to the Common input of multivibrator $B_4$. Code signal bursts having a frequency designated $f_6$ are also transmitted during the "state-determining intervals" and are employed to gate in selected line-drive pulses through gate 44 to gate 43, from which they are supplied if gate 43 is open, to each of multivibrators $B_1$, $B_2$ and $B_3$ to reset them to their respective 0 conditions. Assuming that the output signal supplied from multivibrator $B_5$ to gate 43 is derived from the anode of the left triode (not shown) to which is connected the left input circuit, gate 43 is open when multivibrator $B_5$ is established in its condition 1. Translating means 43 thus has two translating conditions in that it is effective to pass pulses during certain intervals and ineffective during others.

With this Roschke arrangement, the code signal bursts or components selectively trigger multivibrators $B_1$–$B_5$ in a prescribed random or irregular sequence imposed by the particular order or distribution of the code bursts to disrupt or interrupt the normal cyclic actuation of counting mechanism 34 during the state-determining or field-retrace intervals in accordance with a secret code schedule in order to rephase the square wave control signal developed at the output of multivibrator $B_5$ to a selected one of several, specifically thirty-two, possible operating states or phase conditions. Consequently, the control signal produced by counting mechanism 34 exhibits periodic amplitude variations during the field-trace intervals, due to the cyclic operation of the counting mechanism, and random variations during the state-determining or field-retrace intervals, due to the effect of the code bursts. It should be emphasized and kept in mind that the pulses applied to the multivibrators are line-drive pulses and that there is always a concurrently applied pulse to $B_1$ Common. Since the code generator to be described is capable of developing ten code bursts or components during a field-retrace interval, it may be said that the operating state of control mechanism 34 is changed in a series of ten steps.

Figure 1:
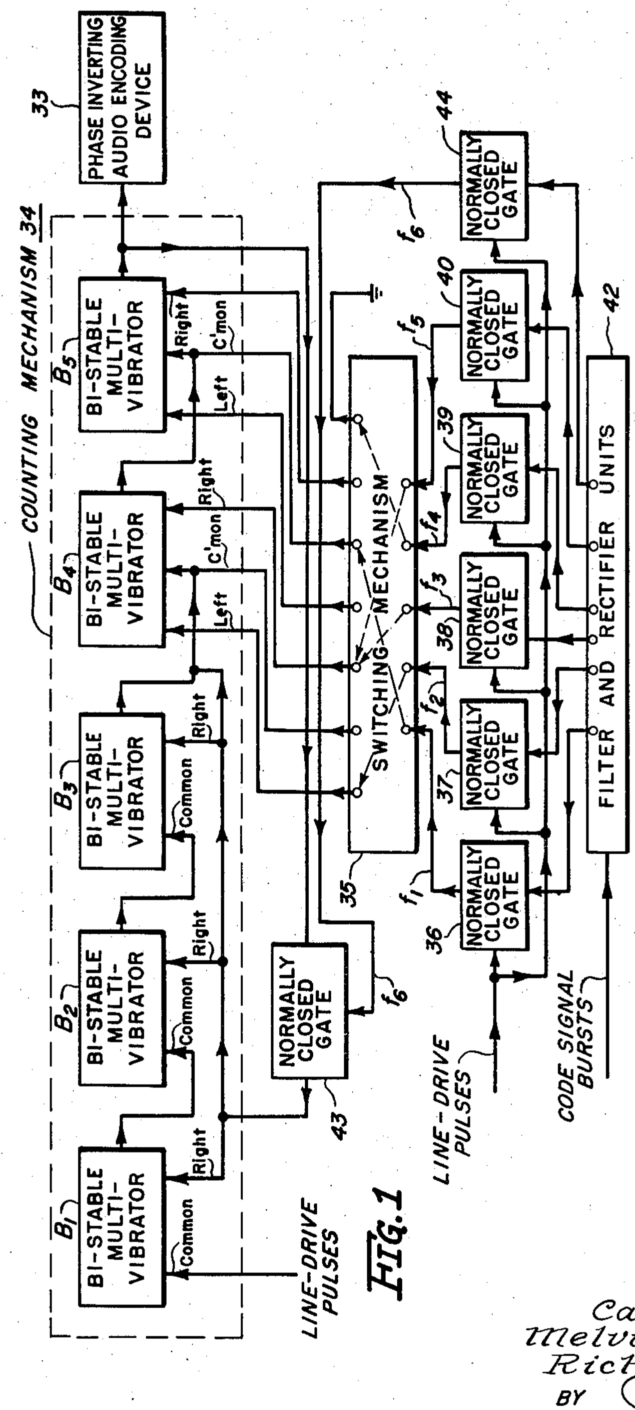
FIGURE 1 illustrates the specific subscription television system for which a coded signal is produced by the generator of the present application.

Since the first three multivibrators $B_1$–$B_3$ actually may collectively be considered as a single 8:1 counter and since the Right input connected to gate 43 effects reset of each one of the multivibrators, they may be replaced by a single 8:1 blocking oscillator. In the aforementioned Roschke application, the counting mechanism has a counting ratio of 20:1 achieved by two multivibrators, corresponding to $B_4$ and $B_5$, and a 5:1 blocking oscillator. Separate multivibrators have been used only for convenience of illustration in demonstrating the manner in which all five multivibrators $B_1$–$B_5$ effectively execute a sequence of thirty-two operating steps in completing one cycle. If multivibrators $B_1$–$B_3$ were replaced by an 8:1 blocking oscillator, there would be no need to connect the Common input of multivibrator $B_4$ to the output of gate 43 since each time the 8:1 blocking oscillator would be reset by means of a pulse translated through gate 43, multivibrator $B_4$ would automatically receive a pulse from the output of the blocking oscillator. When three multivibrators are employed as shown in FIGURE 1, there will be occasions when pulses are translated through gate 43 to the Right input circuits of multivibrators $B_1$–$B_3$ during intervals when multivibrator $B_3$ is already in its reset or reference condition 0, although either one of multivibrators $B_1$ and $B_2$ may not. Consequently, multivibrator $B_3$ would not supply a pulse to the Common input of multivibrator $B_4$ at such times. Thus, with the Common input of multivibrator $B_4$ connected to the output of gate 43, multivibrator $B_4$ will always receive a pulse when multivibrators $B_1$–$B_3$ are reset, as is the case when a blocking oscillator is utilized.

As mentioned previously, the apparatus in FIGURE 1 may be utilized in either a subscription television receiver or transmitter, the output of multivibrator $B_5$ being utilized to effect either coding or decoding since the operations are complementary. The phase modulated square wave developed in multivibrator $B_5$ may be used to vary the time relationship between the video and synchronizing components in response to each amplitude variation in a video encoder (not shown) to effect video scrambling, as is shown in the Roschke application. It may also be employed to effect phase inversion of the audio since the frequency relationship between the square wave and the line-scanning frequency is such that the phase inversions would occur at approximately 1,000 times per second, there being two phase inversions per cycle. This achieves very effective sound coding in that intelligibility is substantially completely destroyed. However, as stated before, it has also been found that when a signal of square wave form having a frequency in the audio spectrum is employed to determine the times of phase inversion without correlating such times with the audio signal peaks, the coded audio signal exhibits a D.C. component. The illustrated embodiment of the present application is calculated to supply coding signal bursts to the encoding apparatus of FIGURE 1 in order that the square wave signal developed in multivibrator $B_5$ undergoes amplitude excursions at instants which will result in a minimum D.C. component.

The code signal bursts applied to the filter and rectifier units 42 are, of course, originally developed in the transmitter, and in order to supply the identical code bursts to the receivers, they are transmitted to subscriber receivers during the state-determining or field-retrace intervals along with the video signal. The wave form in FIGURE 2 designated ODD depicts the coded signal, in the form of ten code signal bursts 45 each exhibiting one of frequencies $f_1$–$f_6$, as combined with a composite television signal, that is developed by the generator of the present application during an odd field and utilized by the encoding apparatus of FIGURE 1. It will be observed that the composite television signal, with the exception of the code signal bursts 45, is conventional, including the usual serrated field-drive pulse interposed between two sets of equalizing pulses. The code components are preferably a downward or inward modulation of the vertical blanking pedestal and occupy substantially the same amplitude range of the carrier as the video components in order that there will be a minimum of interference with the receiver sweep circuits which could easily arise if the code bursts extended into the amplitude range reserved for the synchronizing pulses.

The ten code signal bursts 45 occur during intervals between the line-synchronizing pulses superimposed on the vertical blanking pedestal subsequent to the second series of equalizing pulses. In the present embodiment, it will be assumed that ten different code signal bursts are employed in establishing the phase or operating state of bi-stable multivibrators $B_1$–$B_5$ during a field retrace interval, although it will be appreciated that any number of bursts greater or smaller may be utilized. For example, in the aforementioned Roschke application, a maximum of only six bursts are transmitted during any one field-retrace interval. The encoding apparatus of FIGURE 1 responds to a maximum of ten bursts occurring during respective ones of ten successive line-trace intervals during the field-retrace interval, and thus those ten line traces have been designated "slots" numbered 1 through 10. It will prove convenient later on to refer to these slots in explaining the operation of the code generator in producing a proper combination of code bursts to establish the encoding apparatus of FIGURE 1 in an operating state which will result in a coded audio signal having a minimum D.C. component.

Figure 2:
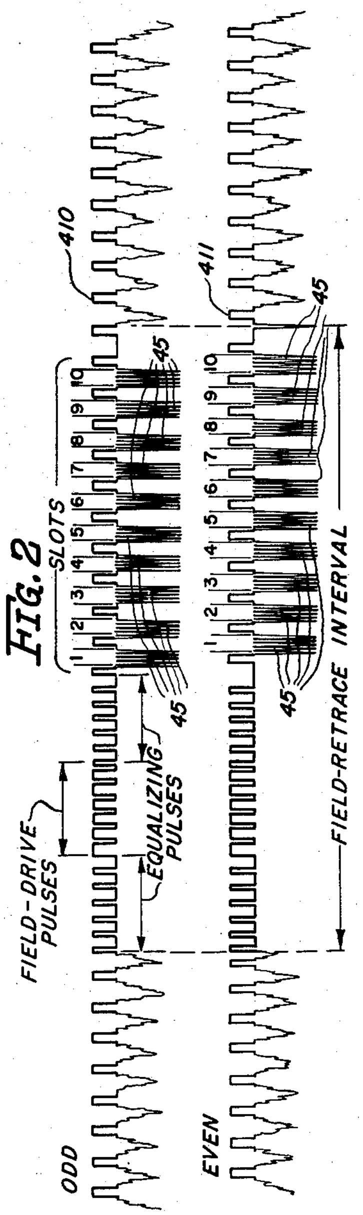
FIGURE 2 shows two wave forms illustrating the manner in which the coded signal is combined with a composite television signal.

The other wave form in FIGURE 2, designated EVEN, illustrates the wave form of the composite television signal during a so-called even field. It will be observed that the line-synchronizing pulses during the field-retrace interval in this waveform are shifted one-half line-trace interval with respect to the corresponding line-synchronizing pulses in the odd field. Consequently, there are only eleven line-synchronizing components during the field-retrace interval in an even field whereas there are twelve during the field-retrace interval in an odd field. The code signal bursts, also designated 45, are consequently shifted along with the line-synchronizing pulses in the even field. The wave forms of FIGURE 2 will be quite helpful hereinafter in discussing some of the features in the present invention.

As mentioned before, counting mechanism 34 may be considered as having thirty-two different operating conditions, since there are thirty-two operating steps in each cycle. It will be remembered that as multivibrators $B_1$–$B_5$ switch from one collective condition to the next, the individual condition of each multivibrator is that as illustrated in Table I. During each field-trace interval when the multivibrators are supplied with line-synchronizing pulses only, the regular periodically recurring pattern as illustrated in Table I ensues. However, during the state-determining or field-retrace intervals when the code signal bursts gate in negative line-drive pulses to the various input circuits of multivibrators $B_1$–$B_5$, this periodically recurring pattern is obviously arrested or disrupted.

Figure 3:
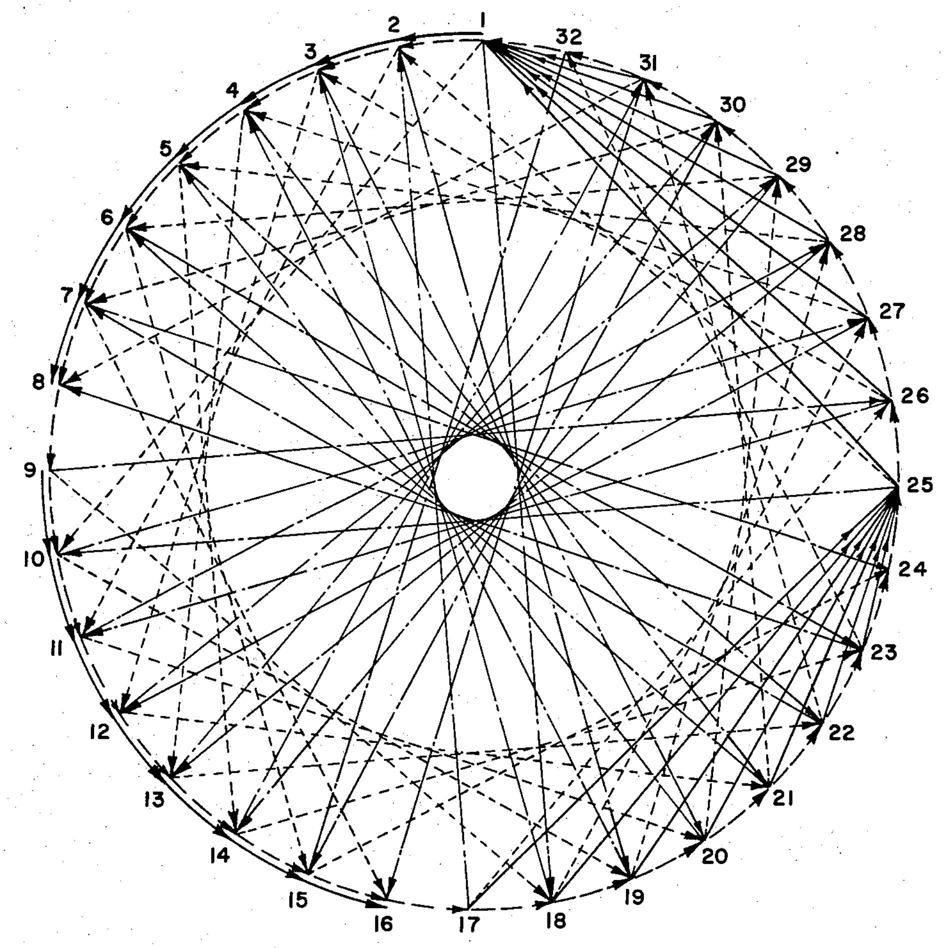
FIGURES 3 and 4 illustrate what may be called "circle diagrams" that indicate in shorthand fashion the operation of the coding apparatus of FIGURE 1.
Figure 4:
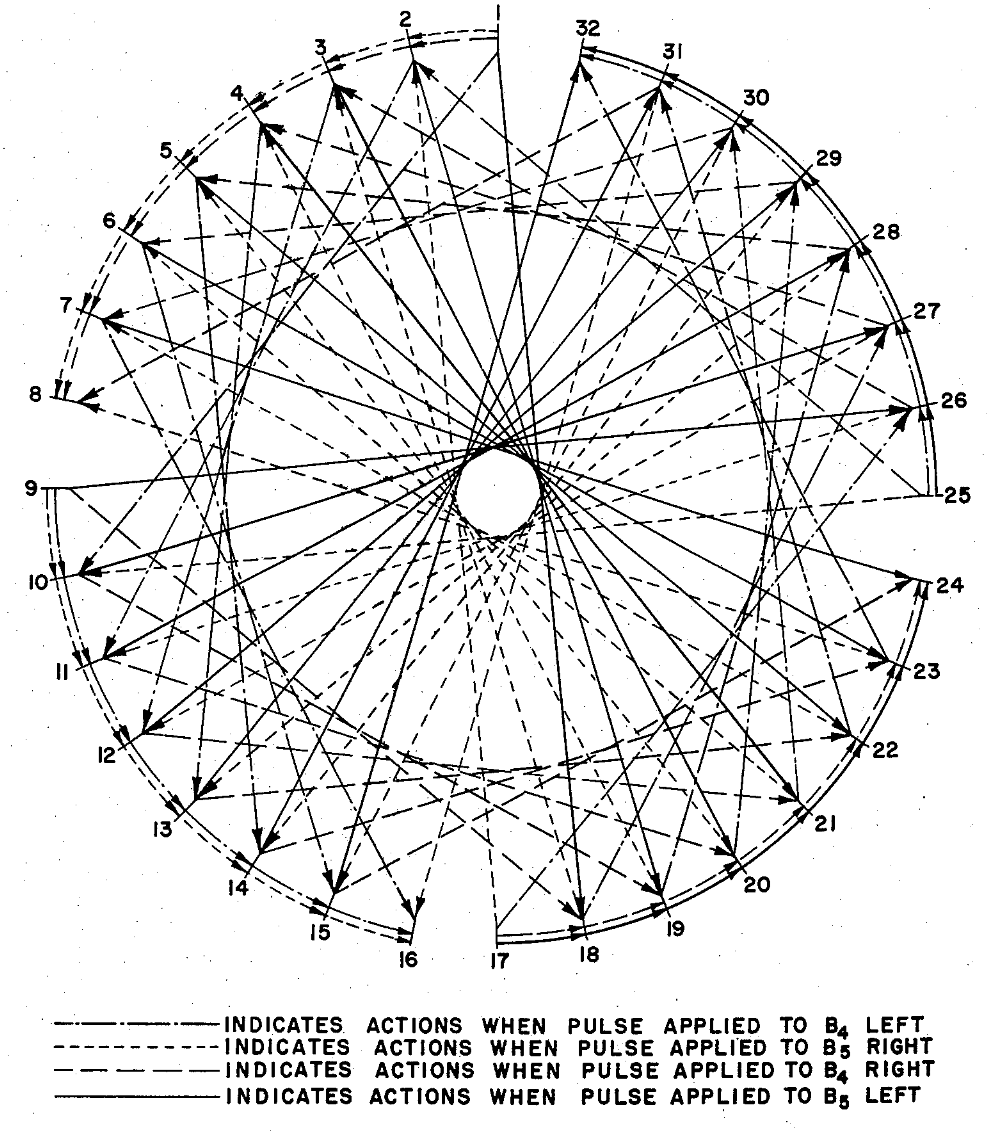

The circle diagrams in FIGURES 3 and 4, each of which has thirty-two points on its circumference corresponding to the thirty-two collective conditions of mechanism 34, conveniently illustrate the particular "actions" of counting mechanism 34 in response to pulses applied over the various input circuits. In other words, the circle diagrams summarize what occurs in each collective condition when pulses are applied to each input of the multivibrators. As stated in FIGURE 3, the lines comprising the relatively short dashes indicate, in the directions of the arrowheads, the actions when pulses are applied to the Common input of multivibrator $B_4$ (called $B_4$ Common for brevity); the lines comprising a combination of long and short dashes indicate, in the directions of the arrowheads, the actions when pulses are applied to the Common input of multivibrator $B_5$ (called $B_5$ Common); the lines consisting of the relatively long dashes represent the normal "free count" actions in response to the application of line-drive pulses to the Common input of multivibrator $B_1$ (called $B_1$ Common); and the continuous lines indicate the actions of the counting mechanism in response to gated reset pulses applied to the Right inputs of multivibrators $B_1$–$B_3$ and the Common input of multivibrator $B_4$. In FIGURE 4, the combination of long and short dashes represent, in the directions of the arrowheads, the actions when pulses are applied to the Left input of multivibrator $B_4$ (called $B_4$ Left); the lines of short dashes indicate the actions when pulses are applied to the Right input of multibrator $B_5$ (called $B_5$ Right); the lines comprising the relatively long dashes represent, in the directions of the arrowheads, the actions when pulses are applied to the Right input of multivibrator $B_4$ (called $B_4$ Right); and the continuous lines illustrate the actions when pulses are applied to the Left input of multivibrator $B_5$ (called $B_5$ Left for the sake of brevity).

The circle diagrams of FIGURES 3 and 4 should be considered together along with Table I in following the exact change in individual operating conditions of multivibrators $B_1$–$B_5$ as the collective condition of the multivibrators is changed. For example, assume that multivibrators $B_1$–$B_5$ are collectively established in their sixth operating condition or operating step. From Table I it is seen that multivibrators $B_1$–$B_5$ are in their 1, 0, 1, 0, 0, respective individual conditions. If a negative pulse is applied to the Common input of multivibrator $B_4$, the individual condition of that multivibrator would then change to condition 1. Since the pulses applied to all the inputs of the multivibrators are actually negative polarity line-drive pulses (being gated in by gates 46–40 and 44), at the same time a pulse is applied to the Common input of multivibrator $B_4$ a line-drive pulse is also supplied to multivibrator $B_1$ to change its condition to 0 and in so doing would apply a trigger pulse to multivibrator $B_2$ to change its individual condition to 1. Consequently, multivibrators $B_1$–$B_5$ would exhibit the following respective individual operating conditions: 0, 1, 1, 1, 0. With such a pattern or line-up, Table I indicates that counting mechanism 34 is established in its collective operating condition 15. A line comprising short dashes between point six on the circle diagram of FIGURE 3 to point fifteen on that figure bears out the illustrative example and in shorthand fashion indicates the fact that counting mechanism 34 may be switched from collective operating condition 5 to 15 by means of a pulse applied to $B_4$ Common. Every other line in both FIGURES 3 and 4 may be proven out in similar manner.

With the exception of the free count lines in FIGURE 3, the lines extending between successively numbered points indicate that pulses applied to certain inputs, when mechanism 34 is in certain conditions, have no effect. To explain, between points 26 and 27, for example, in FIGURE 4, there is a solid line indicating that when a negative pulse is applied to $B_5$ Left mechanism 34 merely changes from collective condition 26 to 27. This change results from the application of a line-drive pulse to $B_1$ Common; the $B_5$ Left input pulse has no effect since in collective condition 26 multivibrator $B_5$ is in condition 1 (see Table I) and a negative applied pulse can only trigger the multivibrator to the same condition. In this connection it should be emphasized that the normal free count plays a part in every action; each time a code burst effects the application of a line-drive pulse to mechanism 34, that very same line-drive pulse is concurrently applied to $B_1$ Common.

Perhaps it would be well to explain further the significance of the continuous lines representing the gated reset actions in FIGURE 3. As mentioned previously, even though normally-closed gate circuit 44 is actuated by an $f_6$ burst to cause the application of a negative polarity line-drive pulse to normally-closed gate 43, the latter gate only translates that negative pulse to multivibrators $B_1$–$B_4$ if it is opened by the output signal of multivibrator $B_5$; this occurs only when that multivibrator is in condition 1. Thus, noting Table I, when counting mechanism 34 is established in any one of collective conditions 1–16, gated reset pulses effect no change whatsoever. The mechanism merely responds to the periodically recurring line-drive pulses. On the other hand, in collective operating conditions 17–32, translating means or normally-closed gate 43 is established in its open condition permitting the translation of gated reset pulses to multivibrators $B_1$–$B_4$; thus, there are continuous lines emanating from each one of those points on the circle diagram.

The following table (designated Table II) represents essentially the same information as found in FIGURES 3 and 4 in that it also shows the manner in which counting mechanism 34 is actuated in response to pulses applied to its various input circuits.

TABLE II

*Forward Actions*

| Collective conditions | $B_4$ left | $B_4$ common | $B_4$ right | $B_5$ left | $B_5$ common | $B_5$ right | Free count | Gated reset (to gate 43) |
|---|---|---|---|---|---|---|---|---|
| 1 | 10 | 10 | 2 | 18 | 18 | 2 | 2 | 2 |
| 2 | 11 | 11 | 3 | 19 | 19 | 3 | 3 | 3 |
| 3 | 12 | 12 | 4 | 20 | 20 | 4 | 4 | 4 |
| 4 | 13 | 13 | 5 | 21 | 21 | 5 | 5 | 5 |
| 5 | 14 | 14 | 6 | 22 | 22 | 6 | 6 | 6 |
| 6 | 15 | 15 | 7 | 23 | 23 | 7 | 7 | 7 |
| 7 | 16 | 16 | 8 | 24 | 24 | 8 | 8 | 8 |
| 8 | ------ | ------ | ------ | ------ | ------ | ------ | 9 | ------ |
| 9 | 10 | 18 | 18 | 26 | 26 | 10 | 10 | 10 |
| 10 | 11 | 19 | 19 | 27 | 27 | 11 | 11 | 11 |
| 11 | 12 | 20 | 20 | 28 | 28 | 12 | 12 | 12 |
| 12 | 13 | 21 | 21 | 29 | 29 | 13 | 13 | 13 |
| 13 | 14 | 22 | 22 | 30 | 30 | 14 | 14 | 14 |
| 14 | 15 | 23 | 23 | 31 | 31 | 15 | 15 | 15 |
| 15 | 16 | 24 | 24 | 32 | 32 | 16 | 16 | 16 |
| 16 | ------ | ------ | ------ | ------ | ------ | ------ | 17 | ------ |
| 17 | 26 | 26 | 18 | 18 | 2 | 2 | 18 | 25 |
| 18 | 27 | 27 | 19 | 19 | 3 | 3 | 19 | 25 |
| 19 | 28 | 28 | 20 | 20 | 4 | 4 | 20 | 25 |
| 20 | 29 | 29 | 21 | 21 | 5 | 5 | 21 | 25 |
| 21 | 30 | 30 | 22 | 22 | 6 | 6 | 22 | 25 |
| 22 | 31 | 31 | 23 | 23 | 7 | 7 | 23 | 25 |
| 23 | 32 | 32 | 24 | 24 | 8 | 8 | 24 | 25 |
| 24 | ------ | ------ | ------ | ------ | ------ | ------ | 25 | ------ |
| 25 | 26 | 2 | 2 | 26 | 10 | 10 | 26 | 1 |
| 26 | 27 | 3 | 3 | 27 | 11 | 11 | 27 | 1 |
| 27 | 28 | 4 | 4 | 28 | 12 | 12 | 28 | 1 |
| 28 | 29 | 5 | 5 | 29 | 13 | 13 | 29 | 1 |
| 29 | 30 | 6 | 6 | 30 | 14 | 14 | 30 | 1 |
| 30 | 31 | 7 | 7 | 31 | 15 | 15 | 31 | 1 |
| 31 | 32 | 8 | 8 | 32 | 16 | 16 | 32 | 1 |
| 32 | ------ | ------ | ------ | ------ | ------ | ------ | 1 | ------ |

Comparing Table II and the circle diagrams of FIGURES 3 and 4 and considering what takes place when counting mechanism 34 is established in its, for example, 26th collective operating condition, it will be observed from the circle diagrams that control mechanism 34 is switched to its 27th operating condition in response to the normal free count action due to an incoming line-drive pulse to multivibrator $B_1$, pulses applied to inputs $B_4$ Left and $B_5$ Left actually having no effect since multivibrators $B_4$ and $B_5$ are already established in their respective conditions 1, as noted in Table I. The circle diagrams also indicate that pulses applied to input $B_4$ Right or $B_4$ Common effect actuation of the counting mechanism, along with a line-drive pulse simultaneously applied to multivibrator $B_1$, to collective condition 3. Additionally, pulses applied to input $B_5$ Common or $B_5$ Right trigger the counting mechanism, along with the usual free count, to condition 11. Finally, the circle diagrams indicate that when counting mechanism 34 is established in its 26th operating condition and a gated reset pulse is applied to each of multivibrators $B_1$–$B_4$ by way of gate 43, it will be changed to its 1st collective operating condition. Referring to Table II, it will be found that the described actions from illustrative condition 26 are summarized. Thus, Table II is merely an additional aid in following the precise actions of the counting mechanism.

The present code generator, which has been designed specifically to produce a combination of code bursts to fill slots 1–10 in the wave forms of FIGURE 2 in order to control counting mechanism 34 and thus to program the code schedule so that the transmitted audio signal contains a minimum D.C. or ping component, will now be described.

Turning now to the structural description of FIGURES 5–11 (remembering that the drawings should be physically laid out in accordance with FIGURE 12), the transmitter embodying the invention comprises a conventional synchronizing-signal generator 50 (FIGURE 5) which has a pair of output terminals connected to each one of thirty-two 32:1 square wave generators #1–#32 to provide line-drive pulses thereto. It will be noted from FIGURE 5 that only generators #1–#3, #31 and #32 are shown by individual blocks in solid line construction. The remaining square wave generators #4–#30 have been collectively represented by a single block in dashed construction. Of course, this has been done for the obvious reason of making the drawing considerably less cumbersome. It will be seen that this expedient of grouping several circuits into dashed blocks will be employed throughout the drawings for the sake of simplicity.

Each of square wave generators #1–#32 may take any one of several different forms of construction in order to provide a square wave at the output having amplitude changes in response to each series of sixteen line-drive pulses, there being two amplitude variations for each cycle of the square wave. (For example, each of generators #1–#32 may comprise a series of five binary counters or bi-stable multivibrators connected in cascade as shown in FIGURE 1, or may consist of an 8:1 blocking oscillator plus two bi-stable multivibrators.

A timing pulse generator 51 is controlled by synchronizing-signal generator 50 as indicated by the dashed construction line 52 and has a series of thirty-two output circuits each of which is connected to an assigned one of generators #1–#32. Timing pulse generator 51 may include a well known ring counter which has a multiplicity of stable operating conditions and may be advanced from one condition to the next in response to successively applied pulses. Specifically, generator 51 has thirty-two stages and thus thirty-two stable operating conditions. Each of the thirty-two output circuits of generator 51 is connected to an assigned one of the thirty-two stages in the ring counter to receive a pulse when the assigned state is triggered. A similar timing pulse generator and a series of similar square wave generators are also shown in the copending Druz application, filed concurrently herewith, in order to produce a series of square wave control signals each of which is phased differently. In that application, the manner in which the timing pulse generator is controlled by the synchronizing-signal generator is described in detail and thus is only shown by the dashed construction line 52 in this application.

Briefly, the concurrently filed Druz application teaches that the timing pulse generator supplies pulses to the various square wave generators during different line-retrace intervals in order that the generators may produce several differently phased square wave shaped control signals having the same common frequency and each having periodically recurring amplitude variations representing a unique phase condition with respect to the amplitude variations of the other control signals so that the corresponding amplitude variations of all the control signals occur at different instants. In the disclosed embodiment in the aforementioned Druz application, filed herewith, only sixteen different square wave generators are employed but the same technique may obviously be utilized in the present application to produce thirty-two different square wave control signals.

The output terminals of generators #1–#32 are connected to respective ones of a series of coders #1–#32, each of these coders having another input circuit connected to an audio signal source 53 which may comprise a microphone and audio amplifier in order to pick up and amplify the sound information accompanying the video information of a telecast. Each of coders #1–#32 may be similar to that which is disclosed in the Druz patent, 2,872,507, and may comprise a phase splitter and an electronic selector switch. The phase splitter supplies an audio signal from source 53 to the electronic selector switch in push-pull relationship, namely, with two different phases 180° apart, and a square wave control signal is applied to the selector, as explained hereinafter, to select certain portions of each of the two signals from the phase splitter. With this arrangement, the phase of the audio signal is effectively inverted each time the selector is actuated, and this occurs each time there is an amplitude variation of the control signal.

The output circuits of coders #1–#32 are connected to respective ones of a series of integrators #1–#32 each of which may, for example, include merely a series-connected resistor and a shunt-connected condenser. The output terminals of integrators #1–#32 are connected through respective ones of a series of discharge circuits #1–#32 to one pair of input terminals of a series of threshold detectors #1–#32, respectively.

A delay line 54, which is constructed to introduce a delay to an applied signal of approximately one-half of a line-trace interval, has its input terminals connected to synchronizing-signal generator 50 to receive field- or vertical-blanking pulses therefrom and has its output circuit connected to the input terminals of a mono-stable multivibrator 55. The output terminals of multivibrator 55 are connected through a delay line 57, which adds a time delay of approximately one-half of a line-trace interval to an applied signal, to the input terminals of a mono-stable multivibrator 58, the output terminals of which are connected in common to separate input circuits of each of discharge circuits #1–#32. The output circuit of multivibrator 55 is also connected to the input of a triangular wave generator in the form of an integrating circuit 60 and the output terminals of this circuit are connected in common to separate input circuits of each of threshold detectors #1–#32.

Each of threshold detectors #1–#32, respective ones of which are connected to the inputs of respective ones of a series of delay lines #1–#32, is constructed in similar manner and thus only one is shown in detail, for example threshold detector #3, in FIGURE 13. Referring to that figure, a pair of triodes 62, 63 are effectively interconnected to form a Class A operated push-pull amplifier. Specifically, cathode 64 of tube 62 and cathode 65 of triode 63 are connected together and through a cathode resistor 66 to a plane of reference potential, such as ground. Anode 67 is connected through a pair of series-connected resistors 68 and 69 to a source of B+ operating voltage 70, and anode 71 of tube 63 is also connected via a pair of series-connected resistors 72 and 73 to source 70.

The junction between resistors 68 and 69 is connected to anode 71 through a series connection comprising a resistor 74, a unidirectional device, such as a diode 75, and a resistor 76, the cathode of diode 75 being connected to resistor 74 and the anode to resistor 76. Similarly, the junction between resistors 72 and 73 is connected to anode 67 by means of a series circuit consisting of a resistor 77, a unidirectional device or diode 78 and a resistor 79, the cathode of diode 78 being connected to resistor 77 and the anode to resistor 79. The junction between resistor 74 and diode 75 is connected to the junction between resistor 77 and diode 78 by means of a pair of series-connected condensers 81, 82. In like manner, the junction between resistor 79 and diode 78 is coupled to the junction between diode 75 and resistor 76 via series-connected condensers 83 and 84. Since tubes 62 and 63 are operated as class A amplifiers, the resistance of resistors 68 and 72 is adjusted so that a voltage is normally impressed across each of diodes 78 and 75 sufficient to render them ordinarily cut off. Control grid 85 of triode 62 is connected to the output of integrator #3 through discharge circuit #3, and the junction between condensers 83 and 84 is connected to the control grid 86 of a triode 87 which serves as a pulse amplifier. The connection to grid 89 of triode 63 will be described later.

Cathode 91 of tube 87 is grounded and grid 86 is provided with a fixed positive bias with respect to cathode 91 by virtue of a voltage dividing arrangement comprising a pair of series-connected resistors 92 and 93 connected between source 70 of B+ operating voltage and ground, grid 86 being connected to the junction between the two resistors. The fixed bias is of such a magnitude to render tube 87 normally saturated. Anode 94 of triode 87 is connected to source 70 through a load resistor 95 and is also connected through a series-connected condenser 96 to the control grid 97 of a triode 98 which serves as a combination amplifier and phase inverter. Grid 97 is also connected to a source of negative bias potential 102 through a grid-leak return resistor 99 and cathode 100 is connected to ground through a resistor 101. Source 102 establishes grid 97 at a negative potential with respect to cathode 100 in order to render tube 98 normally cut off or non-conductive. Anode 103 of triode 98 is connected through a load resistor 104 to source 70 and cathode 100, which produces the output signal of the threshold detector, is connected to the input of delay line #3; the other circuit to which cathode 100 is connected will be described shortly.

The common output from integrating circuit 60 (FIGURE 5) is connected to the junction between condensers 81 and 82 by way of a diode 106, and anode 103 of triode 98 is directly connected to the junction between condensers 81 and 82. The additional connection to that junction via a condenser 107 will be described hereinafter.

Returning now to the schematic of FIGURE 5, each of delay lines #1–#32, which individually introduce a very slight time delay to an applied signal of the order of 1/16 of a line-trace interval, is connected to a respective one of a series of normally-open gate circuits #1–#32. The outputs of threshold detectors #1–#32 are also connected through a series of normally-conductive diodes #1–#32, respectively, to a common input circuit of a single coincidence detector 110, the common output of which is connected to separate input circuits of normally-open gates #1–#32.

Coincidence detector 110 is shown in detail in FIGURE 14 along with diodes #1–#32 and portions of each of threshold detectors #1–#32. Cathode 100 of triode 98 of threshold detector #3 and the cathodes of the corresponding triodes 98 in all of the other threshold detectors, namely, #1, #2 and #4–#32, are connected through the corresponding numbered diodes to the junction between a pair of series-connected resistors 112, 113 and also to one of two input terminals of a two stage pulse amplifier 114. Amplifier 114 includes a bias source (not shown) to provide a fixed bias in order to render it normally cut off. A unidirectional voltage source 115 is provided and its negative terminal is connected to ground and its most positive terminal is connected to the upper end of resistor 112, namely the end opposite to that which is connected to resistor 113. A point along voltage source 115, which provides a voltage positive with respect to ground but negative with respect to the voltage impressed on the top of resistor 112, is connected to the bottom of resistor 113, that is the end opposite to that which is joined to resistor 112. The bottom of resistor 113 is also connected to the other input terminal of amplifier 114. The output circuit of amplifier 114 is connected to a mono-stable multivibrator 116 which in turn is connected to the separate inputs of normally-open gate circuits #1–#32.

The outputs of normally-open gates #1–#32 (FIGURE 5) are connected to a series of binaries or bi-stable multivibrators #1–#32, respectively (FIGURE 6), which in turn are connected to respective ones of a series of samplers #1–#32. Each of these binaries may be of conventional construction in that it has two stable operating conditions, designated for convenience as a reset condition and an offset condition, and is triggered to its offset condition only in response to pulses applied thereto from its associated one of gates #1–#32. A mono-stable multivibrator 120 is connected to synchronizing-signal generator 50 to receive vertical-blanking pulses therefrom and has its output circuit connected to the input of a mono-stable multivibrator 121. Unit 121 is connected through a delay line 122, which introduces a time delay of approximately one-half a line trace to an applied signal, to separate input circuits of each of binaries #1–#32 for resetting purposes. The output of multivibrator 121 is also connected to separate input circuits of samplers #1–#32 to serve as a sampling signal therefor.

The outputs of samplers #1–#32 are connected to the input circuits of respective ones of a series of binary circuits #1A–#32A (sometimes hereinafter referred to as the "A binaries" in the interest of brevity) which are connected together to form a conventional open ring, or selector arrangement such that only one of the binaries is actuated at a time from its instantaneous operating condition to its other condition. In this way, if pulses are applied to two or more of the binaries simultaneously, only one of them will be triggered to its opposite condition. As is the case with binaries #1–#32, the two conditions of each of binaries #1A–#32A may be called "reset" and "offset" for convenience. Moreover, it will be assumed that each time one of binaries #1A–#32A receives a pulse from its assigned one of samplers #1–#32, the binary is triggered to its offset condition. Thus, at any one given time only one of binaries #1A–#32A is conditioned or positioned in its offset condition.

Each of binaries #1A–#32A has supplied to it a different random or noise signal from an assigned one of a series of separate noise sources #1–#32, respectively, to effect a random selection. This introduces additional secrecy into the system since assuming that pulses are applied to two or more of binaries #1A–#32A simultaneously, the various noise signals are effective to cause a randomly selected one of the binaries in question to trigger. The output circuits of binaries #1A–#32A are connected to the inputs of respective ones of a series of samplers #1A–#32A.

A mono-stable multivibrator 124 is connected to the output of multivibrator 121 and to the input of a mono-stable multivibrator 125, the output terminals of which are connected to one input of a twenty-two stage binary timing chain 126. Multivibrator 125 is also connected through a delay line 127, which is designed so that it introduces a time delay of approximately one-half of a line-trace interval to an applied signal, to one pair of input terminals of a bi-stable multivibrator 128, the output terminals being connected to a normally-closed gate circuit 130 to serve as a gating signal therefor. Gate 130 also has an input circuit connected to the output of a frequency doubler 131 which is supplied with line-drive pulses by virtue of a connection to synchronizing-signal generator 50. The output circuit of gate 130 is connected to another input of binary timing chain 126.

Unit 126 may be conventional in construction in that it may comprise a series of twenty-two cascade-connected binary stages with the last stage being connected to the first to effectively form a well known ring counter. The timing chain has twenty-two output taps numbered 1–22 and each of these taps is connected to the output of an assigned one of the twenty-two stages in order to develop a timing pulse responsive to the actuation of its assigned binary. Feedback loop 133 is included to schematically illustrate the manner in which the last or twenty-second stage is cross-coupled to the first stage.

The first tap of timing chain 126 is connected to a separate input circuit of each of samplers #1A–#32A and taps 2–12 of timing chain 126 are connected to a diminishing sequence generator 135. This generator is also connected to mono-stable multivibrator 125 and has its output terminals connected across a series connection of a condenser 144 and a resistor 145. Digressing for the moment to FIGURE 16, the detailed construction of diminishing sequence generator 135 will now be described. The connections from taps 2–11 of the timing chain are applied to separate input circuits of a mixer 136. These connections have been numbered in FIGURE 16 in accordance with the individual taps to which they are assigned. A single common output of mixer 136 is connected to an eleven stage binary timing chain 137 which may be constructed in similar fashion as timing chain 126. It may have eleven binary stages each of which is provided with a corresponding output tap numbered 1–11, respectively. The output of the eleventh stage is coupled back to the first as shown by feedback connection 138 to form a ring circuit. The output of mono-stable multivibrator 125 is connected to the eleventh stage in order to trigger timing chain 137 to that stage in response to pulses from multivibrator 125.

Taps 1–10 of timing chain 137 are connected to separate input circuits of a mixer 140 which has a common output circuit connected through a delay line 141 to a normally-closed gate circuit 142. The delay line is designed so that it introduces a very slight delay to an applied signal, of the order of one-fifth of a line-trace interval. Tap 1 of timing chain 137 is also connected to an input circuit of a bi-stable multivibrator 143, another input circuit of which is connected to the 12th tap of timing chain 126. The output of multivibrator 143 is connected to another pair of input terminals of normally-closed gate 142, the output circuit being connected to condenser 144.

A 10:1 counter 149 (back to FIGURE 6) has one input circuit connected to synchronizing-signal generator 50 to receive vertical-blanking pulses therefrom and another input circuit connected to the twenty-second tap (by way of feedback loop 133) of timing chain 126. The output of counter 149 is connected to another input of multivibrator 128 for resetting purposes.

The output circuits of binaries #1A–#32A are also connected to a series of normally-closed gate circuits #1A–#32A, the output circuits of the gates being connected in common and to an input of a history coder 151. This coder may take the same form of construction as that of coders #1–#32 in FIGURE 5. Each of gates #1A–#32A is also connected to the output of a respective one of square wave generators #1–#32 (FIGURE 5). History coder 151 has another input circuit connected through a phase inverter 152 and a delay line 150, which introduces a time delay of one full field trace to an applied signal, to the output of audio signal source 53 (FIGURE 5). The output circuit of coder 151 is connected through an integrating circuit 153 to separate input circuits of each of threshold detectors #1–#32. Returning briefly to FIGURE 13, it will be seen that the output of integrating circuit 153 is connected to grid 89 of triode 63 in each one of the threshold detectors.

The output terminals of samplers #1A–#32A are connected to input circuits (FIGURE 7) of a series of binaries #1B–#32B (sometimes called the "B binaries"), respectively, the output terminals of these binaries being connected through respective ones of a series of delay lines #1A–#32A, each of which is constructed to introduce a time delay of approximately one-fourth of a line-trace interval to an applied signal, to the input circuits of a series of normally-open gates #1B–#32B, respectively. The B binaries may collectively be considered a storage apparatus and individually constitute storage units, as will be made apparent subsequently. The output terminals of gates #1B–#32B are connected respectively to a series of reverse matrix units #1–#32. Each of the gate circuits corresponds to an assigned one of the thirty-two collective operating conditions of counting mechanism <u>34</u> (FIGURE 1) and the associated reverse matrix has a series of connections extending through a cable 155 back to binaries #1B–#32B in accordance with the actions illustrated in the circle diagrams of FIGURES 3 and 4. The particular connections from each reverse matrix to the binaries is determined by the lines in the circle diagrams in a direction opposite to that indicated by the arrows.

For example, the circle diagrams for collective operating condition three show lines with their arrows directed to point three from operating condition two, twenty-six, and eighteen; thus, reverse matrix #3 would have individual circuits connected to binaries #2B, #26B, and #18B through cable 155. Similarly, reverse matrix #31, as another example, would be connected by way of cable 155 to binary #30B, #22B and #14B. The following table (designated Table III) represents the same information as shown in the circle diagrams and indicates the reverse actions of counting mechanism <u>34</u>.

TABLE III

*Reverse Actions*

| Col. cond. | $B_4$ left | $B_4$ com. | $B_4$ right | $B_5$ left | $B_5$ com. | $B_5$ right | Free count | Gated reset |
|---|---|---|---|---|---|---|---|---|
| 1 | ------ | ------ | ------ | ------ | ------ | ------ | 32 | 25, 26, 27, 28, 29, 30, 31 |
| 2 | ------ | 25 | 1, 25 | ------ | 17 | 1, 17 | 1 | 1 |
| 3 | ------ | 26 | 2, 26 | ------ | 18 | 2, 18 | 2 | 2 |
| 4 | ------ | 27 | 3, 27 | ------ | 19 | 3, 19 | 3 | 3 |
| 5 | ------ | 28 | 4, 28 | ------ | 20 | 4, 20 | 4 | 4 |
| 6 | ------ | 29 | 5, 29 | ------ | 21 | 5, 21 | 5 | 5 |
| 7 | ------ | 30 | 6, 30 | ------ | 22 | 6, 22 | 6 | 6 |
| 8 | ------ | 31 | 7, 31 | ------ | 23 | 7, 23 | 7 | 7 |
| 9 | ------ | ------ | ------ | ------ | ------ | ------ | 8 | ------ |
| 10 | 1, 9 | 1 | ------ | ------ | 25 | 9, 25 | 9 | 9 |
| 11 | 2, 10 | 2 | ------ | ------ | 26 | 10, 26 | 10 | 10 |
| 12 | 3, 11 | 3 | ------ | ------ | 27 | 11, 27 | 11 | 11 |
| 13 | 4, 12 | 4 | ------ | ------ | 28 | 12, 28 | 12 | 12 |
| 14 | 5, 13 | 5 | ------ | ------ | 29 | 13, 29 | 13 | 13 |
| 15 | 6, 14 | 6 | ------ | ------ | 30 | 14, 30 | 14 | 14 |
| 16 | 7, 15 | 7 | ------ | ------ | 31 | 15, 31 | 15 | 15 |
| 17 | ------ | ------ | ------ | ------ | ------ | ------ | 16 | ------ |
| 18 | ------ | 9 | 9, 17 | 1, 17 | 1 | ------ | 17 | ------ |
| 19 | ------ | 10 | 10, 18 | 2, 18 | 2 | ------ | 18 | ------ |
| 20 | ------ | 11 | 11, 19 | 3, 19 | 3 | ------ | 19 | ------ |
| 21 | ------ | 12 | 12, 20 | 4, 20 | 4 | ------ | 20 | ------ |
| 22 | ------ | 13 | 13, 21 | 5, 21 | 5 | ------ | 21 | ------ |
| 23 | ------ | 14 | 14, 22 | 6, 22 | 6 | ------ | 22 | ------ |
| 24 | ------ | 15 | 15, 23 | 7, 23 | 7 | ------ | 23 | ------ |
| 25 | ------ | ------ | ------ | ------ | ------ | ------ | 24 | 17, 18, 19, 20, 21, 22, 23 |
| 26 | 17, 25 | 17 | ------ | 9, 25 | 9 | ------ | 25 | ------ |
| 27 | 18, 26 | 18 | ------ | 10, 26 | 10 | ------ | 26 | ------ |
| 28 | 19, 27 | 19 | ------ | 11, 27 | 11 | ------ | 27 | ------ |
| 29 | 20, 28 | 20 | ------ | 12, 28 | 12 | ------ | 28 | ------ |
| 30 | 21, 29 | 21 | ------ | 13, 29 | 13 | ------ | 29 | ------ |
| 31 | 22, 30 | 22 | ------ | 14, 30 | 14 | ------ | 30 | ------ |
| 32 | 23, 31 | 23 | ------ | 15, 31 | 15 | ------ | 31 | ------ |

This table also indicates the manner in which reverse matrices #1–#32 are connected back to binaries #1B–#32B and also illustrates in shorthand abbreviated form the manner in which counting mechanism 34 may be changed to the condition shown in the extreme left hand column by means of pulses applied to its various input circuits. By way of example, Table III, as well as the circle diagrams, illustrates that in order to actuate counting mechanism 34 to its thirteenth collective operating condition a pulse may be applied to either the $B_4$ Left input or the $B_4$ Common input (in addition to a concurrently applied free count pulse to $B_1$ Common) when the counting mechanism is already established in its fourth condition. Moreover, a pulse may be applied to either the $B_4$ Left input or the $B_5$ Right input when counting mechanism 34 is established in its twelfth operating condition; such a pulse would, of course, have no real effect since the action from the twelfth to the thirteenth condition would result from the normal free count caused by the application of a line-drive pulse to $B_1$ Common. Finally, Table II and the circle diagrams indicate that when the counting mechanism is in its twenty-eight operating condition, pulses may be supplied to the $B_5$ Common input or the $B_5$ Right input in order to trigger it to its thirteenth operating condition.

The junction between condenser 144 and resistor 145 (FIGURE 6) is connected to separate input circuits of each of binaries #1B–#32B. The input circuit of a mono-stable multivibrator 158 is connected to the sixteenth tap of timing chain 126 by way of a diode 157, and is connected to the fourteenth tap of timing chain 126 via a diode 159. The sixteenth tap is also connected via a diode 156 to the same input circuits of the B binaries to which the junction of condenser 144 and resistor 145 is connected. The output terminals of multivibrator 158 are connected to separate input circuits of each of gates #1B–#32B.

The output terminals of binaries #1B–#32B are also connected through respective ones of a series of samplers #1B–#32B, each of which also has an input circuit connected to the fifteenth tap of binary timing chain 126, to a series of binaries #1C–#32C, respectively. These binaries, which may be called the "C binaries," are connected together in the same fashion as binaries #1A–#32A (FIGURE 6) to form an open ring or selector in order that only one of them is established in its offset condition at any given instant, the others being established in their respective reset conditions. The outputs of binaries #1C–#32C are connected to a series of forward matrix units #1–#32, respectively, each of which has individual connections through a cable 161 to predetermined ones of a series of normally-open gates #1C–#32C. Each matrix device connects its assigned one of binaries #1C–#32C to selected ones of gates #1C–#32C in the same manner as achieved by reverse matrices #1–#32 except here the connections are made in a forward sense. In other words, each one of the C binaries, which is assigned to a correspondingly numbered one of the thirty-two collective operating conditions of control or counting mechanism 34, is connected to the gates in accordance with the circle diagrams, as is also illustrated in Table II.

For example, the circle diagrams of FIGURES 3 and 4 as well as Table II indicate that when the counting mechanism is established in its second operating condition, it will be changed to its third condition if a pulse is applied over either the $B_4$ Right input, the $B_5$ Right input, to gate 43, or left alone to its normal free count from the line-drive pulse concurrently applied to $B_1$ Common. Also the circle diagrams and Table II indidition. Finally, a pulse applied over $B_5$ left or $B_5$ Comtrigger the counting mechanism, along with the usual free count, from its second condition to its eleventh condition. Finally, a pulse applied over $B_5$ Left or $B_5$ Common trips counting mechanism 34 from its second to its nineteenth collective condition, as shown by Table II and the circle diagrams. Thus, forward matrix #2 is connected through cable 161 to normally-open gates 3C, 11C and 19C. Gates #1C–#32C also have separate input circuits connected to the fourteenth tap of timing chain 126, and the output terminals of the gates are respectively connected to separate input circuits of binaries #1B–#32B.

Samplers #1B–#32B also have separate input circuits connected to respective output circuits of a present condition apparatus 165 which is shown in detail in FIGURE 17. Apparatus 165 also has another output circuit that is connected in common to a separate input of each of the samplers. Turning to FIGURE 17 at this time, the apparatus comprises a counting mechanism 34′ and a normally-closed gate 43′ which are identical in construction to counting mechanism 34 and gate 43 in FIGURE 1 as shown by the primed letter designations. Control or counting mechanism 34′ is also operated in response to line-drive pulses and is supplied with pulses to its various other input circuits as determined by the entire code generator of the subject application. In other words, mechanism 34′ is operated in exact synchronism with corresponding counting mechanism 34, employed to actually code the telecast itself in the transmitter, and with corresponding mechanism 34 utilized to decode or unscramble the coded telecast at each receiver.

Each of bi-stable multivibrators $B_1'$–$B_5'$ may also comprise two triodes as mentioned hereinbefore in connection with bi-stable multivibrators $B_1$–$B_5$. A series of cathode followers 167–176 are provided and are individually connected to the anode of an associated triode. Specifically, cathode followers 167 and 168 are connected respectively to the anodes of the left and right triodes included in multivibrator $B_1'$, cathode followers 169 and 170 are connected to the anodes of the left and right triodes respectively of multivibrator $B_2'$, units 171 and 172 are connected to the anodes of the triodes in multivibrator $B_3'$, elements 173 and 174 are connected to the anodes of the two triodes in multvibrator $B_4'$ and cathode followers 175 and 176 are connected to the anodes of the left and right triodes respectively included in multivibrator $B_5'$. Each of cathode followers 167–176 has an assigned load resistor 177–186 respectively. These resistors effectively provide a pattern of positive potential levels which collectively indicate the instantaneous condition of mechanism 34′, and consequently the instantaneous condition of the counting mechanism used at the transmitter for coding and at each receiver for decoding.

The present condition apparatus includes thirty-two individual present condition detectors #1–#32 corresponding to the thirty-two conditions of mechanism 34′, each of these detectors being connected to resistors 177–186 in a unique manner to produce a positive pulse when the system is instantaneously established in its assigned operating condition. For illustrative purposes and for the sake of obvious simplicity, only present condition detector #21, by way of example, has been shown in detail, the others merely being represented in dashed line construction.

Present condition detector #21 includes a pair of series-connector resistors 190, 191 which are connected across a portion of a source of unidirectional potential 192, the end of resistor 190 opposite to that which is connected to resistor 191 being connected to the most positive point of source 192, while the end of resistor 191 not connected to resistor 190 is connected to a point along source 192 that is negative with respect to that applied to resistor 190 but yet positive with respect to ground, as shown by the ground connection of the negative terminal of source 192. The ungrounded terminals of resistors 178, 180, 181, 184 and 185 are connected respectively through a series of diodes 195–199 to the junction of resistors 190 and 191. It will be remembered that in accordance with the convention established previously, when each of bi-stable multivibrators $B_1$–$B_5$ in counting mechanism 34, and consequently each of multivibrators $B_1'$–$B_5'$, is established in its condition 0, the left triode is conducting whereas the right triode it cut off; thus, the potential developed at the anode of the left triode is negative with respect to that developed at the anode of the right triode. Similarly, when each of the multivibrators is established in its condition 1, the left triode is cut off and the right triode is conducting so that the anode of the right triode is negative with respect to that of the left triode.

Turning now to Table I, it will be seen that when control mechanism 34' is established in its twenty-first collective operating condition, multivibrators $B_1'$–$B_5'$ will exhibit the following respective individual operating conditions: 0, 0, 1, 0, 1. It is because of this line-up or pattern of individual operating conditions that resistors 178, 180, 181, 184 and 185 are connected through diodes 195–199 to the junction between resistors 190 and 191. To further explain, in order for detector #21 to detect only the instants when the system is in its twenty-first operating condition, each of diodes 195–199 must be cut off and this obtains only when resistors 178, 180, 181, 184 and 185 develop positive potentials which in turn only occurs when multivibrators $B_1'$–$B_5'$ are in their respective conditions 0, 0, 1, 0, 1. Considering resistor 178 more specifically, for example, when multivibrator $B_1'$ is in its condition 0 the right hand triode is non-conductive and thus impresses a relatively positive potential on cathode follower 168, with respect to that impressed on cathode follower 167, which in turn produces a positive pulse across resistor 178. Of course, every other present condition detector is differently connected to the cathode followers in accordance with a unique pattern.

The two terminals of resistor 191 are connected to a normally-cutoff two-stage amplifier 201 whose output is connected to sampler #21B. The other present condition detectors #1–#20 and #22–#32, as illustrated by a single block in dashed construction, are connected to respective ones of samplers #1B–#20B and #22B–#32B, also represented by a single dashed block. A monostable multivibrator 202 is connected to synchronizing-signal generator 50 to receive vertical-blanking pulses therefrom and has its output circuit connected to one pair of input terminals of a normally-closed gate 203 having another input circuit connected to sync generator 50 to derive line-drive pulses therefrom. The output of gate 203 is connected through a delay line 204, which introduces a time delay of the order of 1/16 of a line-trace interval to an applied signal, to each of samplers #1B–#32B.

The output terminals of binaries #1C–#32C are also connected respectively to a series of samples #1C–#32C (FIGURE 8) and also to respective ones of a series of samplers #1D–#32D, samplers #1C–#32C also individually being connected to the thirteenth tap of timing chain 126 and samplers #1D–#32D being individually connected to the seventeenth tap of unit 126. The output terminals of samplers #1C–#32C are connected to respective ones of a series of binaries #1D–#32D (sometimes called "D binaries"), each of which is connected to the eighteenth tap of timing chain 126. The outputs of samplers #1D–#32D are connected to a series of amplifiers #1–#32, respectively, which in turn are interconnected with binaries #1D–#32D in accordance with the circle diagrams. Each of the amplifiers is constructed to have a low output impedance for reasons which will be explained.

More specifically, it will be demonstrated later that binaries #1D–#32D provide information representing a given or starting operating condition of control mechanism 34 and amplifiers #1–#32 provide information with respect to a desired destination collective operating condition. The D binaries and the amplifiers are interconnected in a manner indicating the particular possible transitions from the given to the destination operation conditions. Moreover, these interconnections are coupled to a series of bus bars 205–212 assigned respectively to actions involving gated reset, free count, $B_5$ Right, $B_5$ Common, $B_5$ Left, $B_4$ Right, $B_4$ Common, and $B_4$ Left inputs. For the sake of simplicity only a few interconnections have been shown, the remaining couplings being generally indicated by dashed lines. Referring to the circle diagrams and also to Table II, it will be noted that it is possible to go from collective operating condition one, for example, to either one of conditions two, ten or eighteen. Consequently, binary #1D is connected to amplifier #2 over a series circuit comprising a resistor 214 and a diode 215, to amplifier #10 via a series circuit comprising a resistor 216 and a diode 217, and to amplifier #18 by means of a resistor 218 and a diode 219 connected in series.

Since a transition from collective operating condition one to condition two is achieved if a pulse is applied to either input $B_4$ Right, $B_5$ Right, or to gate 43, or left alone to the normal free count, the junction between resistor 214 and diode 215 is connected to bus bars 210, 207, 206, and 205, through a series of diodes 220–223, respectively. Similarly, since counting mechanism 34 is changed from collective operating condition one to ten when a pulse is applied to either the $B_4$ Left input or the $B_4$ Common input, the junction between resistor 216 and diode 217 is connected to bus bars 212 and 211 through diodes 224 and 225, respectively. Also, since counting mechanism 34 may be triggered from its first collective condition to its eighteenth condition when a pulse is applied to either $B_5$ Left or $B_5$ Common, the junction between resistor 218 and diode 219 is connected to bus bars 209 and 208 by way of diodes 226 and 227, respectively. Each of bus bars 205–212 has a shunt connected load resistor 230–237, respectively.

A portion of FIGURE 8 is shown in FIGURE 18 in more detail, including some of the circuitry shown in dashed construction in FIGURE 8, in order to further illustrate the manner of operation. In addition to the elements of FIGURE 8 repeated in FIGURE 18, binary #17D is connected to amplifier #2 by means of a series connection including a resistor 240 and a diode 241, the junction between these two elements being connected to bus bar 208 through a diode 242. This circuitry is provided since counting mechanism 34 is changed from its seventeenth collective operating condition to its second operating condition by means of a pulse applied to $B_5$ Common. The circuitry shown in FIGURE 18 will be helpful hereinafter in explaining the detailed operation of portions of FIGURE 8.

Bus bars 205 and 206 are connected to the input circuits of respective ones of two binaries 250, 251 (FIGURE 9) and bus bars 207–212 are connected through respective ones of a series of off-on toggle switches 260–265 to respective ones of a series of binaries 252–257. Binaries 250–257 are intercoupled in conventional manner to form an open ring or selector such that when actuated by the simultaneous application of two or more pulses over bus bars 205–212, only one of the binaries will be tripped to its offset condition, the others remaining in their respective reset conditions. Each of binaries 250–257 has also connected to itself an assigned one of a series of independent noise signal sources 270–277, respectively, which control the actuation of the binaries in random manner so that when there is a simultaneous application of pulses from the bus bars the particular binary triggered to its offset condition will be determined in random fashion under the influence of a noise signal.

The output terminals of binaries 251–257 are connected to respective ones of a series of input circuits of a switching mechanism 280, this mechanism having five output circuits connected to respective ones of a series of samplers 282–286; each of these samplers is connected to the nineteenth tap of timing chain 126. Binary 251 is also coupled to a sampler 287 which has another input connected to the nineteenth tap. Switching mechanism 280 is adjusted, preferably before each program interval, to effectively set up the manner in which switching mechanism 35 (FIGURE 1), and all of the other corresponding switching mechanisms in the various subscriber receivers, must be adjusted in order to realize decoding for the ensuing telecast. As mentioned hereinbefore, information with respect to the adjustment of mechanism 35, and consequently mechanism 280, is conveyed only to authorized subscribers, for which a certain charge or assessment may be made. The output of binary 250 is connected directly to a sampler 281 which has another input connected to tap 19 of chain 126. Since the input circuits to switching mechanism 280 are assigned to the various input circuits of counting mechanism 34 and since the output circuits of the switching mechanism plus the input circuit to sampler 281 represent the six frequencies $f_1$–$f_6$ employed, all the conductors are appropriately labeled.

Samplers 281–287 are connected to respective ones of a series of binaries 291–297, binaries 292–297 being joined together to form an open ring or selector and binary 291 having another input circuit connected to the twenty-first tap of timing chain 126. Binaries 291–296 are connected to respective input circuits of a plurality of samples 298–303, each of which also has an input circuit connected to the twentieth tap of timing chain 126. The output circuits of samplers 298–303 are connected to one series of input circuits of a 6 x 10 storage matrix 305 (FIGURE 10). The general construction of storage matrix 305 is illustrated and described in detail in copending application Serial No. 463,702, filed October 21, 1954, and issued August 2, 1960 as 2,947,804 in the name of Carl G. Eilers et al., and assigned to the present assignee. Actually, in that application only a 6 x 6 matrix is disclosed but the identical operational concept may be applied in constructing the present 6 x 10 matrix. A slow-timing write-in pulse generator 306 is provided with a single input connected to the twentieth tap of timing chain 126 and a series of ten output circuits, corresponding to the ten slots as will be made apparent later, are connected to storage matrix 305. Generator 306 may take the form of a ring counter in that it may have a multiplicity, specifically ten, of stages to exhibit ten stable operating conditions through which generator 306 is advanced in sequence in response to each applied pulse from the twentieth tap of timing chain 126. Each of the ten output conductors of generator 306 is connected to an assigned one of the ten stages. Generator 306 is also coupled to sync signal generator 50 for synchronization purposes.

A mono-stable multivibrator 308 is also connected to synchronizing-signal generator 50 to derive vertical-blanking pulses therefrom and the output circuit of this multivibrator is connected to a mono-stable multivibrator 309. A normally-closed gate circuit 310 has one input circuit connected to synchronizing-signal generator 50 through a delay line 311 to derive line-drive pulses therefrom. Delay line 311 is constructed to introduce a very slight time delay to an applied signal, of the order of one-twentieth of a line-trace interval. Gate 310 has another input circuit connected to the output terminals of mono-stable multivibrator 309, and an output circuit connected to a fast-timing read-out pulse generator 314, which may also comprise a ten-stage ring counter in the manner of generator 306. Generator 314 similarly has a series of ten output circuits, corresponding to slots 1–10, connected to storage matrix 305. Generator 314 is also coupled to generator 50 for synchronizing purposes.

Storage matrix 305 has a series of output circuits connected respectively to input circuits of a series of samplers 321–326, these samplers also having input circuits parallel-connected to the output circuit of normally-closed gate circuit 310. The output terminals of samplers 321–326 are connected to respective ones of a plurality of signal generators 331–336, each of these generators producing a signal having a predetermined one of the distinctive frequency characteristics $f_1$–$f_6$, respectively. The output circuits of generators 331–336 are connected in common to the input terminals of a unit 337 that includes conventional television transmitter equipment along with suitable coding apparatus including circuitry identical to that shown in FIGURE 1. Audio signal source 53 (FIGURE 5) is connected to unit 337 through a delay line 339 which is constructed to introduce a relatively long time delay, specifically two entire field-trace intervals.

Considering now the constructional details of FIGURE 11, the output circuits of binaries #1A–#32A (FIGURE 6) are connected to respective ones of a series of samplers #1E–#32E and also of a series of samplers #1F–#32F. The output circuits of samplers #1E–#32E (sometimes called "E samplers") are connected respectively to the input circuits of a series of binaries #1E–#32E and the output terminals of samplers #1F–#32F (sometimes referred to as "F samplers") are connected to binaries #2E–#32E, #1E in that order. An electronic selector switch 341, which has two operating conditions, is connected to the output of mono-stable multivibrator 121 (FIGURE 6) through a delay line 342 which introduces a time delay of approximately one-half line-trace interval to an applied signal. Switch 341 has two output circuits, one being parallel connected to each of samplers #1E–#32E and the other being connected to each of samplers #1F–#32F. A coincidence circuit 344 has two input circuits connected to different output terminals of sync generator 50 to derive both vertical-blanking pulses and line-drive pulses therefrom and the output terminals of coincidence circuit 344 are connected to a bi-stable multivibrator 345 which has another input circuit connected to synchronizing-signal generator 50 to derive vertical-blanking pulses. The output circuit of multivibrator 345 is connected to another pair of input terminals of electronic switch 341.

The output terminals of binaries #1E–#32E are connected through respective ones of a plurality of delay lines #1B–#32B (each of which is designed to introduce a time delay of approximately one-fourth line-trace interval) to a series of normally-open gate circuits #1D–#32D, respectively. The output terminals of gates #1D–#32D are connected to a series of forward matrix units #1A–#32A, respectively, which are in turn connected back to certain ones of binaries #1E–#32E through a cable 348 in the same manner as matrices #1–#32 are connected to gates #1C–#32C in FIGURE 7. Specifically, each of gates #1D–#32D represents an assigned one of the thirty-two collective operating conditions of control mechanism 34 and is connected by way of its assigned forward matrix and cable 348 to the inputs of selected ones of binaries #1E–#32E in accordance with the circle diagrams of FIGURES 3 and 4 and also Table II.

A differentiator 349 is connected to synchronizing-signal generator 50 to receive vertical-blanking pulses and its output terminals are connected through a delay line 350, which is designed to introduce a delay of approximately one line-trace interval to an applied signal, to separate input circuits of each of binaries #1E–#32E. The twenty-first tap of timing chain 126 is also connected to each one of these binaries. The output of delay line 350 is also connected to the input of a mono-stable multivibrator 352, the output circuit of which is connected to separate input circuits of each of gates #1D–#32D. The outputs of binaries #1E–#32E are also connected through respective ones of a series of samplers #1G–#32G, each of which is also connected to a common output circuit of differentiator 349, to respective ones of threshold detectors #1–#32.

Directing attention to the specifically shown threshold detector in FIGURE 13, it will be noted that the output of sampler #3G is connected to the junction between condensers 81 and 82 through condenser 107. Of course, all of the other samplers #1G–#2G and #4G–#32G are connected to corresponding points in their associated threshold detectors.

Consideration will now be given to an explanation of the operation of the invention with reference to various idealized signal wave forms of FIGURES 19 and 20. These curves appear at certain points in the code generator as indicated by the encircled letter designations which are correspondingly identified by the same letters in FIGURES 19 and 20.

Square wave generators #1–#32 each respond to line-drive pulses from synchronizing-signal generator 50 to produce thirty-two different square wave control signals individually having the identical frequency, namely 1/32 of the line recurrence frequency of 15,750 (according to United States standards) or approximately 500 cycles per second. Meanwhile, timing pulse generator 51, which as mentioned previously comprises a ring counter having thirty-two different stages, operates in response to line-drive pulses from generator 50 in essentially the same manner as disclosed in the concurrently filed Druz application to develop at each one of its thirty-two output circuits a single selected line-drive pulse. More specifically, the ring counter in timing pulse generator 51 is advanced from each one of its stable operating conditions to the next in response to the successively applied line-drive pulses from generator 50, and since the output circuits of generator 51 are individually connected to assigned ones of the thirty-two operating stages, a pulse is developed at each output circuit as the assigned stage is triggered in the sequence. In other words, each output of generator 51 effectively selects every thirty-second line-drive pulse, and successive outputs select successive line-drive pulses.

Since each of square wave generators #1–#32 is reset by a different output from generator 51, the square wave signals thereby developed, while having the same frequency, will vary in phase from one generator to the next; the phase variation effectively amounts to a time delay of one line-trace interval. The system thus far described has developed a series of thirty-two square wave control signals each of which has amplitude excursions occurring after every sixteen line-trace intervals but with a varying phase relationship of the amplitude excursions from one control signal to the next. Since the thirty-two control signals are differently phased, it may be said that there are thirty-two different phase conditions represented by the control signals developed in generators #1–#32. For a more detailed discussion of the manner in which the variously phased control signals may be developed, attention is directed once again to the concurrently filed Druz application.

It will be recalled that the reason undesirable ping distortion is introduced is attributable to inverting the audio signal at times when the audio signal is close to or at a zero cross-over point. It will be appreciated that in a system where the square wave shaped control signal utilized for timing the audio phase inversions may have any one of thirty-two different phase conditions, it would be most advantageous to actually select the phase condition which would give rise to a coded audio signal with the least D.C. component or ping distortion. In other words, phase inverting a given portion of the audio in accordance with a particular selected one of the thirty-two available square wave signals results in less ping distortion because in this manner the phase inversions may be made to occur primarily at instants when the audio signal is at or close to either a positive or negative amplitude peak.

Inasmuch as it is possible in the illustrated example to use any one of the thirty-two different control signals from square wave generators #1–#32 for coding purposes, since each control signal has a unique phase relationship with respect to the others, it may be said that the system has thirty-two possible operating states corresponding to the thirty-two phase conditions of the control signals. It will be shown that during each field-retrace interval or state-determining interval a determination is made as to the particular one of the thirty-two possible operating states that gives rise to minimum or negligible ping distortion in the audio occurring during the immediately preceding field-trace interval, and steps are then taken to develop a somewhat complicated but very secure code, namely a coded-encoding signal, during the succeeding field-retrace interval in order to place or establish the transmitter and all the various receivers in that operating state for the next succeeding field-trace interval. Since the transmitter and receivers are actually not established in the selected operating state until two full field-trace intervals subsequent to the occurrence of the audio from which the determination is made, a corresponding time delay of two field-trace intervals is introduced before the audio is coded in the transmitter. In this way, the system effectively anticipates the particular operating state rendering least ping distortion.

The manner in which a determination is made as to which one of the thirty-two control signals from generators #1–#32 will produce a coded audio signal of least or negligible ping distortion will now be explained. The sound intelligence accompanying a television program is picked up and amplified in audio signal source 53 and is applied to each one of coders #1–#32. Meanwhile, each coder is supplied with a different one of the thirty-two square wave control signals. Since each of the control signals represents an assigned one of the thirty-two operating states of the system (each of the operating states being assigned a number from one to thirty-two corresponding to that of the square wave generator in which it is developed), the phase inversions of the audio signal take place at different instants in each one of the coders. This results in the production of several, specifically thirty-two, differently coded intelligence or audio signals at the outputs of coders #1–#32. Each of the coded intelligence signals is coded in accordance with a respective one of the several operating states, namely in accordance with the amplitude excursions of an assigned one of the thirty-two differently phased square waves. Moreover, inasmuch as the phase inversions occur at different times in each of coders #1–#32 and therefore at different points in the audio signal cycles, each one of the coded audio signals contains a common signal component, such as a D.C. component, which has a different predetermined magnitude of a predetermined polarity. Of course, each of the control signals from generators #1–#32 will have a 180° counterpart; thus, at times two of coders #1–#32 may produce coded audio signals having a D.C. component of the same magnitude or amplitude but they will be of opposite polarity.

The several differently coded audio signals from coders #1–#32 are applied to respective ones of integrators #1–#32, each of which develops a control potential which corresponds or is proportional to the D.C. component of the coded audio signal which it receives. The various control potentials are applied, unaltered, through discharge circuits #1–#32, respectively, to threshold detectors #1–#32. It will now be shown that the threshold detectors determine which of the several coded audio signals contains the common signal component, namely the D.C. component, having a magnitude sufficiently close to a predetermined reference magnitude, but of opposite polarity with respect thereto, to result in negligible ping distortion. It should be pointed out that during each field-trace interval the coded audio signal exhibiting a D.C. component of least amplitude does not necessarily indicate the most desired operating state in which all of the receivers should be established in decoding the same portion of audio information. This follows because the immediately preceding coded audio portion, which has been coded in accordance with a previous determination, may have exhibited a certain D.C. component, be it ever so small, which would have charged up the coupling networks at the receivers, providing a residual or "past history" charge. The next determination should then take this previous D.C. component into account and the coded audio selected should be that which contains a D.C. component which, when combined with the previous D.C. component, results in a minimum or negligible D.C.

A computation is made during each field-retrace interval on the basis of the amplitude level and polarity of the D.C. included in the audio signal, occurring during the preceding field-trace interval, after it has been coded in accordance with each one of the thirty-two operating states (namely, in accordance with each of the thirty-two square waves) for the entire preceding field-trace interval. Once the computation is made, the following field-trace interval is devoted to the development of the code which is employed during the subsequent field-retrace interval to change the transmitter and receivers to the desired selected operating state, wherein they remain for the entire duration of the next succeeding field-trace interval. Thus, there is a two-field delay from the actual occurrence of each audio portion until the transmitter and receivers are placed in the operating state calculated to result in negligible ping distortion in the same portion. For this reason, and as mentioned hereinbefore, before the audio signal from source 53 is actually coded in accordance with the selected operating state and transmitted to the receivers, it is delayed for two entire field-trace intervals.

In order to understand the manner in which the coded audio signal exhibiting the desired D.C. component is actually determined by threshold detectors #1–#32, attention is directed to FIGURE 13 which shows the details of threshold detector #3 and is of identical construction as the remaining threshold detectors. For purposes of illustration it will be assumed initially that no previous charge has been built up in the receivers (namely, no past history) and that during a given field-trace interval the audio signal has such frequency and amplitude characteristics that the coded audio signal developed in coder #3 exhibits a D.C. component of negligible amplitude. Consequently, it would be desirable to code that portion of the audio signal in accordance with operating state three.

Turning now to FIGURE 13, the control potential developed in integrator #3, which is proportional to the D.C. component of the coded audio from coder #3, is applied to control grid 85 of tube 62. Since triodes 62 and 63 are effectively cross-coupled by means of common cathode resistor 66 to form a push-pull amplifier, the control potential impressed on grid 85 is also applied to cathode 65 with the same polarity. This has the same effect as if the control potential were applied to grid 89 of tube 63 with opposite polarity. Thus, the D.C. component of the coded audio from coder #3 effectively is applied to tubes 62 and 63 in push-pull and the electron flow through load resistors 72 and 73 to source 70 is determined by the particular level of the control potential at any given instant, bearing in mind that past history is ignored at this time and thus no potential is applied to grid 89.

Referring to FIGURE 19, curve A depicts three successive field- or vertical-blanking pulses occurring respectively during field-retrace intervals designated A, B and C. Delay line 54 (digressing briefly to FIGURE 5) receives the vertical blanking pulses of curve A and delays them approixmately one-half of a line-trace interval (for reasons which will be explained in connection with the discussion of FIGURE 11) to produce the pulses of curve B which are employed to actuate mono-stable multivibrator 55, the multivibrator triggering from its normal to its abnormal condition in response to the leading edge of each pulse of curve B and then returning to its normal condition after a time interval of approixmately two complete line trace periods to produce the negative pulses of wave form C. Integrating circuit 60 serves as a triangular wave shape or saw tooth generator and integrates the pulses of curve C to produce the negative sloping saw tooth pulses of curve D which are applied to each one of threshold detectors #1–#32.

Returning to FIGURE 13, the negative sloping pulses of curve D are applied through diode 106 to the junction between condensers 81 and 82 in order to slowly decrease (as compared to an instantaneous decrease) the potential on the cathodes of diodes 78 and 75. It will be remembered that diodes 78 and 75 are normally non-conductive because of the voltage developed across resistors 68 and 72, the anodes of the two diodes being negative with respect to their respective cathodes. Assume now that the control potential from integrator #3 is of positive polarity and has a predetermined amplitude level. Since the potential appearing on the anodes of normally cut off diodes 78 and 75 is dependent on the control potential from discharge circuit #3 (and thus from integrator #3), neither one of the diodes will conduct in response to the decreasing negative potential of a D pulse unless the control potential is of sufficient magnitude that it results in the establishment of a positive potential on the anode of one of the diodes with respect to the potential impressed on its cathode by a pulse of curve D. Of course, if during the interval of a D pulse the cathode of neither diode 78 or 75 is sufficiently negative with respect to its associated anode, neither diode will conduct. The sloping leading edges of the pulses of curve D effectively provide a "sliding threshold." The circuit parameters of each threshold detector are adjusted so that the detector fires (namely, one of its two diodes conducts) only if the D.C. component or control potential represents more than negligible ping distortion. Of those that do fire, the sliding threshold causes the detector supplied with the least magnitude control potential to fire last.

To elucidate, when the potential impressed on grid 85 is positive, for example, the potential applied to cathode 65 will likewise be positive and thus tube 62 will have a greater flow of electrons than tube 63. The potential of anode 71 and thus that at the junction between resistors 72 and 73 will then be positive with respect to anode 67, and by the same token the potential at the junction between resistors 68 and 69 will be negative with respect to anode 71. Diode 78 is thus effectively biased to a further extent than is diode 75. However, assuming that the control potential represents more than negligible ping distortion, in response to a pulse of curve D the cathode of diode 75 reaches a potential level such that the diode conducts over the following path: condenser 81, diode 75, condenser 84, and resistor 93 to ground. This produces a negative pulse for application to grid 86. The point along the slope of the saw tooth D pulse at which one of the diodes conducts is determined by the particular magnitude of the control potential from discharge circuit #3.

If the control potential had been negative, diode 75 would be biased to a greater extent than diode 78 and thus diode 78 would conduct, over the following circuit: condenser 82, diode 78, condenser 83, and resistor 93 to ground. Thus, a negative pulse is produced across resistor 93 whether the control potential is positive or negative. It will be seen later, when past history is considered, that the polarity of the applied control potential has a very definite effect on the operation of each threshold detector.

The pulse amplifier comprising triode 87 is normally biased to saturation by the voltage dividing action of resistors 92 and 93, as mentioned before, but the negative pulse developed across resistor 93 is sufficient to cut the pulse amplifier off and thus to develop a sharply defined positive pulse at anode 94 of tube 87. This pulse is then applied to grid 97 of triode 98 which is biased normally beyond cut-off by means of negative bias potential source 102. A negative pulse is thus developed at anode 103 and is combined with the concurrently occurring negative saw tooth pulse of curve D in order to increase the current flow through the particular conducting diode (either 75 or 78), and thus to increase the magnitude of the negative pulse developed across resistor 93. This is merely well known regenerative action which results in the production of a sharply defined pulse the instant one of diodes 75, 78 conducts or fires. Each threshold detector may be designed so that the negative pulse developed at anode 103 is approximately twice the maximum amplitude of each saw tooth pulse of curve D.

The time constant of the coupling circuitry to triode 87 is adjusted to produce a pulse at cathode 100, once either diode 75 or 78 conducts, which is approximately three line-trace intervals in duration. Wave form E illustrates the duration and timing of typical pulses developed at cathode 100 of tube 98. During field-retrace interval A it has been assumed for illustrative purposes that the threshold detector shown in FIGURE 13 fires approximately mid-way on the slope of the D pulse occurring during that field-retrace interval. In field-retrace interval B, it has been assumed that the threshold detector fired at the very beginning of the saw tooth, and in field-retrace interval C it has been assumed that the detector fired at approximately the termination of the pulse of curve D occurring during that field-retrace interval. The arrows in curve E illustrate the manner in which the pulses may be shifted in time, the leading edge of each pulse indicating the exact instant that the threshold detector fired.

Of course, pulses like that shown in curve E are developed at the outputs of only those threshold detectors provided with a control potential representing a D.C. component which is above a predetermined minimum or threshold, the parameters of each detector being so adjusted as mentioned previously. Consequently, for any given portion of audio information, it is possible that all of the operating states or phase conditions will render a ping which is above the threshold and thus all of the detectors will fire. This indicates that no matter which operating state is selected, there will be ping distortion above the permissible limit. However, since the threshold detector representing the operating state rendering the geratest ping fires eraly in the slope of the particular one of the D saw tooth pulses, as in field-retrace interval B, and since the threshold detector representing the operating state which will render the least ping, even if it is above the minimum, fires towards the end of the saw tooth pulse, as in field-retrace interval C, it is possible to select the operating state resulting in the least D.C. This will be explained shortly.

As mentioned before, threshold detector #3 along with the other threshold detectors quite often, and in fact usually, do not determine which coded audio signal has a D.C. component of least amplitude, but rather selects the coded audio having a D.C. component closest to a predetermined reference magnitude but of opposite polarity with respect to it because of the past history charge present in each receiver. It will be appreciated, as also mentioned before, that while the coded audio is coded in accordance with the operating state which will result in negligible or least ping distortion, there may still be a D.C. component in the transmitted coded audio signal of some magnitude and of either positive or negative polarity, even though the objective is to have no D.C. whatever. If that D.C. component is successfully transmitted to all of the receivers, the various coupling networks in the receivers will charge up to its potential level. Since the condensers in the coupling networks are not discharged in the receivers after each field-trace interval, the charge remains. Consequently, it is desirable in making the determination by the threshold detectors to take into account or consideration the past history of the system, namely the charge to which the receiver coupling networks assumed in response to the immediately previous determination.

Assume for the moment that the threshold detectors like that shown in FIGURE 13 are actuated in response to the D pulse occurring during field-retrace interval C in order effectively to measure or examine the D.C. component of the coded audio for the preceding field-trace interval B. In order to consider the effect of past history, a potential must be provided which represents the D.C. component of the coded audio signal during the next preceding field-trace interval, namely field-trace interval A. Such a voltage is produced, in a manner which will be explained hereinafter, and is applied to grid 89 of tube 63 and to the grids of similar triodes in all of the other threshold detectors in order to provide a reference potential of a predetermined magnitude but of opposite polarity, for reasons which will become apparent.

To illustrate, assume that the past history D.C. component is positive two volts and assume further that the potential applied to grid 85 of one of the threshold detectors is a positive one volt and to another is minus two volts. The past history reference potential is applied to grid 89 of each of the two threshold detectors under consideration as a negative two volts and because of the push-pull coupling arrangement this negative two volts is subjected to a polarity reversal at each cathode 64 and is effectively subtracted in the threshold detector to which is applied negative two volts on grid 85 so that the potential between grid 85 and cathode 64 is reduced to zero; consequently, the threshold detector will not fire during the occurrence of the concurrently applied saw tooth pulse indicating that the assigned operating state will result in negligible ping. On the other hand, the past history voltage of positive two volts will not cancel the control potential in the threshold detector to which a positive one volt is applied to its grid 85 and thus there will be a net potential of a negative one volt on grid 85 and that threshold detector will fire, assuming that a D.C. component of one volt is above the permissible limit and thus objectionable.

Thus, an operating state will be selected which will provide a D.C. component of a negative two volts rather than a positive one volt because when the audio, coded in accordance with that selected operating state, is combined with the charge already present in the receivers, the charge on the receiver coupling networks will be reduced to zero. In short, threshold detectors #1–#32 effectively compare the reference potential (positive two volts) with each of the control potentials and determines which one has a magnitude closest to the reference magnitude of two volts but has a polarity opposite to that of the reference potential.

Neglecting for the moment the effect of coincidence detector 110, the pulses developed at the outputs of the threshold detectors that have fired during any given field-retrace interval are supplied through the associated ones of delay lines #1–#32 and normally-open gates #1–#32 to the inputs of the assigned ones of binaries #1–#32 (FIGURE 6) to trigger them from their normally reset conditions to their respective offset conditions. Later on the manner in which binaries #1–#32 are conditioned to their reset conditions before the application of pulses from the threshold detectors will be described. Assume, for example, that during a given field-trace interval the audio signal, when coded in accordance with operating states 3, 10, 14, 17, 21, 29 or 30, results in coded audio having a D.C. component below the lowest permissible threshold limit. Consequently, threshold detectors #3, #10, #14, #17, #21, #29 and #30 will not fire, whereas all the others will, resulting in the offsetting of all of binaries #1–#32 with the exception of #3, #10, #14, #17, #21, #29 and #30.

Inasmuch as a determination or computation is made once each field-retrace interval, based on the level of D.C. in each of the thirty-two differently coded audio signals for the preceding field-trace interval, it is desirable to discharge all of the storage condensers in integrators #1–#32 immediately subsequent to each determination so that the condensers will have no residual charge, and thus may charge up to the D.C. levels of the applied coded audio signals during the succeeding field-trace interval preparatory to the next determination one complete field trace later. Discharge circuits #1–#32 accomplish this function and they are operated in response to the pulses of curve G which are produced in mono-stable multivibrator 58 responsive to the trailing edges of the pulses of curve F, the latter pulses being identical to those of curve C but delayed with respect thereto by virtue of delay line 57 introducing a delay of approximately one-half line-trace interval. This delay is employed for the obvious reason that the discharge circuits must not be actuated until subsequent to the termination of the sloping portion of each saw tooth pulse of curve D.

As mentioned before, it is possible that many of the thirty-two operating states will result in a ping that is sufficiently negligible to have no perceptible effect, in which case, of course, the associated threshold detectors will not fire. On the other hand, there may be times when all thirty-two operating states result in a ping above the threshold or permissible limit. Consequently, it is advantageous to select an operating state resulting in the lowest possible D.C. level, even if it may still be outside the acceptable threshold limit.

To that end, coincidence detector 110 is provided to effectively determine which one, when all the detectors fire during the sloping portion of a D pulse, fires last. Consideration now will be given to the detailed representation of this coincidence detector in FIGURE 14 along with the partial representations of the threshold detectors included in that figure. If at least one of the threshold detectors does not fire during the occurrence of a pulse of curve D, indicating that the operating state to which that threshold detector is assigned will result in a ping within the minimum threshold limit, coincidence detector 110 has no effect whatsoever and is not required. In that case, resistor 113 in the coincidence detector is shunted by the cathode resistor 101 of the unfired threshold detector, diodes #1–#32 being normally conductive due to the positive potential at the junction between resistors 112 and 113. The parameters of the coincidence detector are so designed that when resistor 113 is shunted by at least one of the thirty-two resistors 101, the positive voltage at the junction between resistors 112 and 113 is not sufficient to render two-stage pulse amplifier 114 conductive as it is provided with a fixed bias to maintain it normally cut off.

However, if all of the threshold detectors fire, which means that all of the operating states result in ping above the minimum threshold limit, all of diodes #1–#32 will be cut off (since there will be a positive potential at each of the cathodes 100) and resistor 113 no longer will be shunted. This changes the voltage dividing arrangement between resistors 112 and 113, causing the potential at the junction between these two resistors to rise sufficiently to render two-stage pulse amplifier 114 conductive and thus to produce a positive pulse at its output.

Thus, coincidence detector 110 effectively produces a positive pulse when all of the threshold detectors fire but in addition to that it also effectively determines in a manner to be described which threshold detector fired last, indicating which operating state results in least ping even though it is above the desired limit. This may be explained with the help of the wave forms shown in FIGURE 15. For convenience, assume that all of the threshold detectors #1–#32 fire in the same sequence as their numbers and thus the pulse of curve $E_a$ (corresponding to a pulse of curve E except on a considerably extended time scale) is developed at the cathode 100 of the corresponding tube 98 in threshold detector #1 for application to the cathode of diode #1. Since threshold detectors #2–#32 fire in rapid succession, wave forms $E_b$–$E_f$ appear at their corresponding outputs. Of course, wave form $E_d$ is shown in dashed construction to illustrate collectively all of the other output wave forms of threshold detectors #4–#30. Each time a threshold detector fires it cuts off its assigned one of diodes #1–#32 but until the instant of firing of threshold detector #32, diode #32 is still conducting and thus providing resistor 113 with a shunt circuit. However, at the moment that threshold detector #32 triggers, diode #32 is rendered non-conductive, removing the last shunt across resistor 113, and a positive pulse as represented in curve H is applied to amplifier 114, the output of the amplifier being applied to mono-stable multivibrator 116 to provide the pulse of curve J. It will be noted that the trailing edge of the pulse of curve H occurs at the trailing edge of the pulse of the first detector fired, namely the pulse of wave form $E_a$, since upon termination of the $E_a$ pulse diode #1 returns to its normally conductive state. The parameters of multivibrator 116 are so chosen that once it is triggered to its abnormal operating condition it will remain there for a time duration equal to approximately four line-trace intervals.

The pulse of curve J closes each one of gates #1–#32 (returning to FIGURE 5) in order to prevent the translation of a pulse from the last threshold detector fired, namely #32 in the illustrative example, to its associated binary #32. Of course, the gating pulse of curve J will have no effect on gates #1–#31 because signals from their associated threshold detectors have already been translated to their associated ones of binaries #1–#32. However, because of the slight delay, approximately one-sixteenth of a line-trace interval, introduced by delay line #32, the pulse of curve J will effectively prevent the translation of the pulse of wave form $E_f$, after it has been delayed, to binary #32. Consequently, binary #32 will not be triggered from its reset to its offset condition and this represents that operating state 32 results in the least objectionable ping.

If desired, the operating state resulting in least ping may always be selected. The threshold limit may effectively be reduced to zero by making the amplitude of the D pulses sufficiently high that all threshold detectors fire. In this way, the coincidence detector will select the least ping operating state.

The individual conditions of each of binaries #1–#32 is conveyed to the associated samplers #1–#32, respectively, and in order to read out, examine or sample the conditions, mono-stable multivibrator 120 is operated in response to the vertical-blanking pulses of curve A to produce the pulses of curve K, the multivibrator being so constructed that the trailing edge of each of the K pulses occurs approximately one line trace subsequent to the latest possible instant at which an E pulse may terminate. Multivibrator 121 responds to the trailing edge of each pulse of curve K and is so designed that it returns to its normal condition after an interval of only about one-half a line trace interval to produce the sharply defined pulses of curve L which are employed for reading out the conditions of binaries #1–#32 to effectively register such information in binaries #1A–#32A.

As discussed previously, most of the time two or more operating states will result in a D.C. sufficiently low to be acceptable, and consequently two or more of binaries #1–#32 will usually be placed in their offset conditions. Binaries #1A–#32A will effectively make a selection in a random manner from the several operating states that are permissible. This obtains since the A binaries are intercoupled to form an open ring. Only one of the binaries will be tripped because of the characteristics of an open ring, and thus only one operating state will be selected. If pulses are supplied to two or more of binaries #1A–#32A, simultaneously, it does not make any difference which binary is triggered as in that event any one of two or more operating states represented by the applied pulses will provide negligible ping distortion. Noise sources #1–#32 insure that a selection will be made in random fashion since the noise signals are injected to influence the tripping of the binaries in well known manner.

Since the conditions of binaries #1–#32 are read out during the intervals defined by the pulses of curve L, those binaries may be reset or re-established to their reset or reference conditions subsequent to the occurrence of such read out pulses. To this end, the L pulses from multivibrator 121 are delayed for approximately one-half of a line-trace interval in delay line 122 and are then applied to each one of binaries #1–#32 for resetting purposes.

To summarize very briefly, during each field-retrace interval a determination is made as to those certain operating states of the thirty-two that are available which will produce negligible or the least ping when the audio occurring during the preceding field-trace interval is coded in accordance therewith, and a selection is made from those certain operating states and stored or registered in binaries #1A–#32A, the binary associated with the selected operating state being in its offset condition while all the others remain in their reset conditions. It may thus be said that the outputs of binaries #1A–#32A provide a control effect representing a selected one of the thirty-two possible operating states of the system.

Since binaries #1A–#32A collectively represent the operating state to which the transmitter and various receivers must be placed while coding and decoding respectively the audio signal portion from which the determination is made, the output of those binaries may be utilized to provide the past history potential for all of the threshold detectors. Assume for the moment that a determination is made during field-retrace interval A (referring to FIGURE 19) based on the audio occurring during the preceding field-trace interval and that operating state 17, for example, will give rise to the least ping distortion. It will be demonstrated later that almost one-half of the following field-trace interval A is required to actually set up a code or coded signal which is stored and then conveyed to the transmitter coder and various receivers during field-retrace interval B in order to establish the transmitter and receiver encoding equipment (namely, the circuitry of FIGURE 1) in the desired operating state 17. Consequently, the transmitter and receivers would be operated during field-trace interval B in accordance with the seventeenth operating state, and because of this delay between the actual occurrence of the audio and its coding and decoding, the audio is delayed for two entire field-trace intervals before it is coded at the transmitter and conveyed to the receiver, as discussed before. Thus, the audio occurring during the field-trace interval immediately preceding field-retrace interval A is actually not coded in the transmitter itself until during field-trace interval B. If that same audio portion is coded in accordance with operating state 17 before the occurrence of field-trace interval B, it will be possible to anticipate the resulting D.C. component and this represents the past history for the audio information actually occuring during field-trace interval A but not coded until the field-trace interval subsequent to field-retrace interval C.

This is achieved by delaying the audio signal from source 53 for one entire field in delay line 150 (FIGURE 6), phase inverting it in inverter 152 and applying it to history coder 151. Meanwhile, the single one of binaries #1A–#32A which is in its offset condition and which therefore represents the desired final state, impresses a gating potential on its assigned one of normally-closed gates #1A–#32A in order to gate in the coding square wave from the assigned one of generators #1–#32, representing that final operating state, to history coder 151 to code the audio accordingly. The D.C. component of the coded audio is developed in integrating circuit 153 and is applied back to the control grids 89 of all of the corresponding triodes 63 in the threshold detectors. As mentioned once before, the history potential must be applied in opposite phase to the threshold detectors and for that reason phase inverter 152 is employed.

With this arrangement, when a determination is made as to a desired operating state during field retrace A, for example, from the audio occurring during the preceding field-trace interval, that same portion of audio from which the determination is made (which is actually not coded in the transmitter and transmitted until field-trace interval B) is coded in accordance with the selected desired operating state during field-trace interval A in history coder 151 because of the one field delay introduced by delay line 150 so that during field-retrace interval B integrating circuit 153 provides a history potential representing the D.C. component of the audio occurring before field retrace A when it is coded in accordance with the desired selected state. This past history potential may then be employed during field retrace interval B to determine the proper operating state for the audio occurring during field-trace interval A, the past history potential representing the D.C. component of the audio occurring before field retrace A.

It is now necessary to develop a coded signal having a code pattern representing the operating state selected and stored in one of binaries #1A–#32A, in accordance with the present invention. It will be remembered that for increased security it is extremely beneficial to select the code pattern from a relatively large group of different code patterns all of which represent a transition or operational change from a given operating state to the selected operating state. In this connection, it should be pointed out that the given operating state from which the system must be changed may be the same, for example a reference state, each time a change is made, but is preferably different. When the given state is varied from one change to another, the identical code pattern of a coded signal may represent one transition from a given operating state to a selected state but another transition to a different operating state when the given state is different. This aspect of the invention will become apparent hereinafter.

Referring now to the wave forms of FIGURE 20, only the first A pulse of FIGURE 19 has been reproduced on the same time scale as in FIGURE 19, but considerably more of field-trace interval A has been represented, field-retrace intervals B and C and field-trace interval B not being shown. The first L pulse in FIGURE 19 has also been shown in FIGURE 20 and is applied from multivibrator 121 to mono-stable multivibrator 124 to produce the pulse of curve M. The circuit components of this multivibrator have been adjusted so that the trailing edge of the pulse of curve M occurs approximately two line-trace intervals subsequent to the termination of the vertical-blanking pulse of curve A in FIGURE 20 and consequently two line traces following the end of field-retrace interval A. Mono-stable multivibrator 125 responds to the trailing edge of the pulse of curve M and produces the sharply defined pulse of curve N for application to twenty-two stage binary timing chain 126 to condition that timing chain to its first operating condition. Meanwhile, the pulse of curve N is delayed for approximately one-half of a line-trace interval in delay line 127 to supply the pulse of curve P to bi-stable multivibrator 128. This multivibrator will be found in a predetermined one of its two operating conditions, which may be termed the reset condition, prior to the application of the pulse of curve P and thus the wave form of curve Q will be applied to normally-closed gate circuit 130. The resetting of multivibrator 128 will be considered hereinafter.

Meanwhile, line-drive pulses as shown in curve R are derived from synchronizing-signal generator 50 and applied to frequency doubler 131 to produce the pulses of curve S for application to gate 130. This gate is only open during the interval when wave form Q is established at its most positive amplitude level; thus, only the pulses shown in curve T will be applied to timing chain 126. The first twenty-two pulses of curve T have been numbered respectively from one to twenty-two to assist in the explanation hereinafter.

Timing chain 126, having been established in its first condition, or what may be considered a reset condition, by the pulse of curve N, responds to the pulses of curve T to execute a complete cycle of operation in response to each series of twenty-two successive pulses of curve T, as is the case in any ring counter. Feedback loop 133 insures that when the timing chain reaches the twenty-second condition, namely when the twenty-second stage is actuated, it will automatically return to its first condition to initiate another sequence of twenty-two steps. As the timing chain proceeds through its various steps, it produces pulses at its twenty-two taps in sequence. For example, in response to the very first pulse of curve T which is numbered 1 in that wave form, timing chain 126 produces a pulse at its first tap. Moreover, every twenty-second pulse thereafter likewise is effectively reproduced at the first tap of timing chain 126. Thus, the pulses of curve U are produced for application to samplers #1A–#32A to effectively read out the conditions of binaries #1A–#32A in response to each such U pulse.

Considering the effect of only the first pulse of curve U, the stored conditions of the A binaries are effectively sampled or read out by means of samplers #1A–#32A to store or register this information in the storage apparatus comprising storage units or binaries #1B–#32B (FIGURE 7). Binaries #1B–#32B will be found in their individual reset conditions prior to the application of the first pulse of curve U, in a manner yet to be explained, and thus the offset condition of the single selected one of binaries #1A–#32A indicating the desired operating state will be transferred to the corresponding one of binaries #1B–#32B. In other words, if binary #31A, for example, is in its offset condition at the occurrence of the first pulse of curve U, binary #31B will be triggered to its offset condition, leaving all the other binaries #1B–#30B and #32B in their respective reset conditions.

Returning to FIGURE 6, the second through eleventh pulses of curve T are applied to diminishing sequence generator 135 by virtue of the fact that taps 2–11 of timing chain 126 are connected to that generator. Referring now to FIGURE 16 which illustrates in detail the composition of the diminishing sequence generator, pulses 2–11 of curve T are combined in mixer 136 to form the first group of ten pulses in curve V for application to eleven stage binary timing chain 137. Unit 137 is actuated to its eleventh condition by means of the pulse of curve N from multivibrator 125, and thus in response to the first pulse of the first group of V pulses the timing chain is triggered from its eleventh to its first operating condition. The succeeding nine pulses of the first group of curve V pulses causes actuation of timing chain 137 in sequence to its second condition, third condition, fourth condition, etc., to its tenth condition. Upon the termination of the first group of pulses of curve V, timing chain 137 is therefore established in its tenth condition, and not its eleventh as is the case immediately preceding the first group of V pulses.

Since the first pulse of the first group of V pulses is required to trigger timing chain 137 to its first condition, no output pulse is supplied to mixer 140 at that time, noting that output tap 11 is not connected to mixer 140. Therefore, only the nine pulses, after the first pulse of curve V, are developed at the output of mixer 140 and are delayed slightly in unit 141, approximately one-fifth of a line-trace interval, before application to normally-closed gate 142. Bi-stable multivibrator 143 being established in its reset condition in a manner to be explained, responds to a pulse from the 1st tap of timing chain 137 (which is developed in response to the second pulse of curve V) to produce a gating signal for opening gate 142 to develop the first group of pulses of curve W at its output. Delay line 141 is obviously provided in order to permit the second pulse of the first group of V pulses to effectively gate in itself along with the succeeding pulses of that group. Thus, in response to the first group of ten V pulses it has been found that only the last nine are actually developed at the output of gate 142. The twelfth pulse of curve T, as well as every twenty-second pulse thereafter, is applied to multivibrator 143 for resetting purposes and thus prior to each group of V pulses, multivibrator 143 will be established in its reference or reset condition.

Recalling that upon the termination of the first group of V pulses timing chain 137 is established in its tenth condition, the first two pulses of the second group of V pulses are required to trigger the timing chain from its tenth to its eleventh condition and then to its first condition. Thus, a pulse is not developed at tap 1 of timing chain 137 until the application of the third pulse of the second group of V pulses. Consequently, multivibrator 143 is not triggered from its reset condition until that time and gate 142 is not opened until the occurrence of the third pulse of the second group of V pulses. Timing chain 137 subsequently operates in response to the remaining pulses of the second group of V pulses, ending up in its ninth condition. However, due to the fact that gate 142 is not opened until the third pulse of the second group of V pulses, only the last eight pulses of the second group is developed at the output of gate 142. Diminishing sequence generator 135 operates in the same manner in response to the remaining groups of V pulses to produce a diminishing number of pulses in response to each group, as shown by curve W.

Two hundred and twenty T pulses are required in the operation of the code generator of the illustrated embodiment, as will be apparent, although only about two-thirds of that number are shown in FIGURE 20; thus, normally-closed gate 130 (FIGURE 6) is returned to its closed position by multivibrator 128 after two hundred twenty of such T pulses have been applied to timing chain 126. This is achieved by applying the twenty-second pulse of curve T and every twenty-second pulse thereafter to 10:1 counter 149 in order to produce a single output pulse in response to ten input pulses for returning multivibrator 128 to its other condition. Counter 149 also receives vertical-blanking pulses from generator 50 to insure that it is properly reset before the occurrence of the T pulses.

Since only about two-thirds of the number of T pulses required during each field trace are illustrated in FIGURE 20, only seven groups of W pulses are shown. It will be appreciated that subsequent to the last group of three pulses in curve W there will be a group of two pulses and then a single pulse.

Returning to FIGURES 6 and 7, it will be remembered that the final destination state selected during field-retrace interval A, into which the transmitter and receivers must be established during field-retrace interval B, is recorded or registered in one of storage units or binaries #1B–#32B. Referring briefly to the wave forms of FIGURE 2, this final destination operating state is that to which the transmitter and receivers must be placed during the occurrence of the line-drive pulse immediately succeeding the tenth slot. The number designating the collective operating condition of counting mechanism 34 during the line trace after slot 10 is identical to the number of the destination operating state into which control mechanism 34 is placed. Once an encoding system is established in an operating state during the ten-slot interval, the system will remain in that state for the entire duration of the succeeding field-trace interval, whereas the collective operating condition of the control mechanism 34 in the system changes every line-trace interval throughout the field in periodically recurring fashion.

The first of the nine pulses in the first group of W pulses, after differentiation in condenser 144 and resistor 145, is applied to each one of the B binaries to condition them to their respective reset conditions. However, only one of these binaries will be found in its offset condition at that time, and that will be assumed to be, as an illustrative example, binary #27B indicating that each encoding system must be established in operating state 27 during filed trace B. More specifically, offset binary #27B indicates that it is desired to place the control mechanism 34 in the transmitter and receivers in their twenty-seventh collective operating condition during the line-retrace interval immediately subsequent to the tenth slot during field-retrace interval B. The ten slots clearly illustrated in FIGURE 2 have also been marked off in wave form A in FIGURE 20.

In response to the first pulse of the first group of W pulses, all of binaries #1B–#32B are conditioned to their respective reset conditions but since only binary #27B is not already there, the pulse is really only effective to trigger that binary. A pulse is thus developed at the output of binary #27B, delayed for approximately one-fourth of a line-trace interval in delay line #27A, translated through normally-open gate circuit #27B and applied to the input of reverse matrix #27. Since this matrix is connected back to certain ones of the B binaries through cable 155 (namely, binaries #10B, #18B and #26B) in accordance with the circle diagrams of FIGURES 3 and 4 and also Table III, a pulse is applied to binaries #10B, #18B, #26B to trigger these binaries to their respective offset conditions. The utility of delay lines #1A–#32A should now be apparent inasmuch as there should be a slight delay between the resetting of the binaries by the first W pulse and the return of pulses from a reverse matrix to offset some of the binaries.

Consequently, upon the termination of the first pulse of the first group of W pulses, binaries #10B, #18B, and #26B are offset, indicating that it is possible for the transmitter and receiver counting mechanisms, like 34, to reach collective operating condition 27 and thus destination operating state 27 in the line trace immediately subsequent to the tenth slot in field-retrace B, if the counting mechanism is established in its tenth, eighteenth or twenty-sixth collective operating condition during the line-trace interval of the tenth slot and thus just before the occurrence of the line sync pulse following the tenth slot.

The second W pulse in the first group is thus effective to reset three different binaries, namely binaries #10B, #18B and #26B, and these binaries in turn effect the translation of pulses through their associated ones of delay lines #1B–#32B and gates #1B–#32B to their respective assigned reverse matrix units #10, #18 and #26. According to the circle diagrams and Table III, matrix #10 is connected to binaries #1B, #9B and #25B, matrix #18 is connected to binaries #1B, #9B and #17B, and reverse matrix #26 is connected to binaries #9B, #17B and #25B. Thus, upon the termination of the second W pulse, binaries #1B, #9B, #17B and #25B will be conditioned in their respective offset conditions, indicating that counting mechanism 34 may be established in either one of collective operating conditions 1, 9, 17 or 25 during the line-trace interval of the ninth slot if it is desired to make a transition or operational change to final destination state 27.

In like manner, the third W pulse of the first group triggers binaries #1B, #9B, #17B and #25B from their offset conditions to their reset conditions to effect the translation of pulses through reverse matrices #1, #9, #17, and #25 back to binaries #8B, and #16B–#32B, indicating that control mechanism 34 may be established in either one of collective operating conditions 8 and 16–32 during the line-trace interval of the eighth slot if it is desired to trigger the control mechanism to the twenty-seventh collective operating condition in response to the line sync pulse occurring just subsequent to the tenth slot, and thus to establish the system in operating state 27. This same general process proceeds in response to the fourth through the ninth pulses of the first group of W pulses so that upon the termination of the ninth or last pulse, certain ones of the B binaries are positioned to their offset conditions to represent the collective operating conditions in which control mechanism 34 may be established during the line-trace interval of the second slot if it is desired to establish the control mechanism in destination state 27 during the line-retrace interval immediately subsequent to the tenth slot.

Having decided the particular collective operating conditions in which the counting mechanism may be placed during the second slot in field-retrace B in order to reach the desired destination state subsequent to the tenth slot, it is now necessary to determine the particular collective operating condition in which control mechanism 34 will be found during the line-trace interval of the first slot. Perhaps it might be expedient at this time to recall that the code signal burst or component occurring in slot 1 is not actually effective to change the collective operating condition of mechanism 34 until the occurrence of the line-sync pulse between slots 1 and 2. Consequently, the condition of mechanism 34 during slot 1 is effectively determined during the preceding field-retrace interval—one full field trace back.

Attention is now directed to FIGURE 17 which illustrates present condition apparatus 165. Counting mechanism 34′ is supplied with code components or pulses and line-drive pulses in exact synchronism with the corresponding mechanism in the transmitter and, of course, corresponding mechanisms in the various receivers. The circuitry associated with mechanism 34′ effectively examines or reads out the conditions of each of the bi-stable multivibrators $B_1'$–$B_5'$ and determines the instantaneous collective operating condition of the mechanism. As shown, only present condition detector #21, as an example, is illustrated in detail for the sake of simplicity and when multivibrators $B_1'$–$B_5'$ are established respectively in their individual conditions 0, 0, 1, 0, 1, (see Table I) which is the line up or pattern when the mechanism is established in its twenty-first collective condition, a positive potential will be developed across each of cathode resistors 178, 180, 181, 184 and 185, rendering diodes 195–199 non-conductive as discussed before. When this occurs resistor 191 is no longer shunted by any of the cathode resistors and the voltage division between resistors 191 and 190 varies such that a pulse of sufficient positive potential is developed across resistor 191 for application to normally cut off two-stage amplifier 201 to render it conductive, thereby to produce a positive pulse for sampler #21B. It should be apparent that if any one of cathode resistors 178, 180, 181, 184 or 185 does not provide a positive potential, which would be the case if mechanism 34′ is not instantaneously established in its twenty-first collective condition, resistor 191 will be shunted and two-stage amplifier 201 will not be rendered conductive.

Thus, a pulse is only supplied to sampler #21B during an interval in which mechanism 34' is established in its twenty-first collective condition. The other present condition detectors #1–#20 and #22–#32 operate in identical fashion to supply pulses to their assigned samplers #1B–#20B and #22B–#32B respectively when mechanism 34' finds itself in their associated conditions.

It is desired to make the actual examination or read out of counting mechanism 34' immediately subsequent to each field-retrace interval since at that time it will be established in its operating state which will remain unchanged for the entire following field-trace interval. It will be recalled that the burst transmitted in the tenth slot plus the immediately following line-synchronizing pulse establish the counting mechanism in the operating state which will prevail for the succeeding field-trace interval. In order to achieve examination of mechanism 34', mono-stable multivibrator 202 operates in response to the trailing edge of the vertical blanking pulse of curve A (FIGURE 20) to produce the pulse of curve X. The multivibrator is so designed that this pulse has a duration of approximately one and one-fourth line-trace intervals for reasons which will become apparent. Pulse X is applied to normally-closed gate 203 which is also supplied with the line-drive pulses of curve R in order to gate in the pulse of curve R occurring in time coincidence with the X pulse. The pulse developed in gate 203 is delayed for approximately one-sixteenth of a line-trace interval in delay line 204 and is supplied to each of sampler #1B–#32B to effectively read out the collective condition of counting mechanism 34' at that instant.

It is appropriate at this time to discuss the reason that pulse X requires a duration of approximately one and one-fourth line-trace intervals. Referring to the curves of FIGURE 2 in addition to those of FIGURE 20, it is apparent that since the pulse of curve X starts at the trailing edge of the field-retrace interval or vertical-blanking pulse and has a duration of over a line-trace interval it will be sufficient to gate in only line-synchronizing pulse 410 during an ODD field and only pulse 411 during an EVEN field. Delay line 204 insures that the read-out operation occurs just into the line traces following pulses 410 and 411. With this arrangement, it is obvious that the actual read out occurs at different times in the ODD and EVEN fields.

Returning now to FIGURE 7, the output of present condition apparatus 165, indicating the instantaneous collective operating condition of counting mechanism 34' in the line-trace interval immediately following line sync 410 for the ODD fields and in the line-trace interval following line sync 411 for the EVEN fields, is conveyed to the C binaries. These binaries are provided to register information with respect to the collective operating condition of the counting mechanism during the line-trace interval occupied by slot 1, and not during the lines following pulses 410 and 411, and thus the output circuits of present condition apparatus 165 (namely the outputs of samplers #1B–#32B) are not connected to the similarly numbered C binaries; instead the connections are effectively shifted six digits.

To explain further, assume that when an examination is made just subsequent to the occurrence of pulse 410, counting mechanism 34' is found to be, for example, in its first collective operating condition. Since it requires thirty-two line-trace intervals to complete one cycle of operation from the first to the thirty-second collective condition and since there are 262½ lines per field, slightly less than one field-trace later (namely 262 lines later which would be just subsequent to pulse 411) the counting mechanism will be established in its sixth collective condition. This obtains inasmuch as when thirty-two is divided into 262 it will be found that counting mechanism 34 executes eight complete operating cycles with a remainder of six. Thus, counting mechanism 34' will be established in its sixth condition. Counting back from the line-trace interval immediately subsequent to pulse 411 in the EVEN field wave form in FIGURE 3 (namely, fifth condition in the line trace following slot 10, fourth condition in slot 10, third condition in slot 9, and so forth), it will be found that during the line-trace interval occupied by the first slot, the counting mechanism will be established in its twenty-seventh collective operating condition. Consequently, if counting mechanism 34' indicates that it is in collective operating condition 1 during the line-trace interval subsequent to pulse 410, it is then known that the counting mechanism will be in collective condition 27 during slot 1 of the following field-retrace interval. Thus, there is effectively a subtraction of six collective conditions from one down to twenty-seven.

On the other hand, if samplers #1B–#32B are sampled during an even field just subsequent to pulse 411, it will be found that 262 lines later (namely, during the line-trace interval preceding pulse 410) counting mechanism 34' will likewise be established in its sixth collective operating condition. Counting back from the line-trace interval preceding pulse 410 in the ODD field wave form in FIGURE 2 to the first slot, it will again be discovered that during slot 1 the system is established in its twenty-seventh operating condition. Thus, once again a subtraction of six must be made from the indicated collective operating condition just subsequent to pulses 411 if it is desired to represent the instantaneous condition of the control mechanism during slot 1 in the following field-retrace interval.

For the above reasons, the interconnections from samplers #1B–#32B to the C binaries in FIGURE 7 are shifted six digits. In other words, sampler #1B is connected to binary #27C, sampler #2B is connected to binary #28C, sampler #3B is connected to binary #29C, and so forth, as stated hereinbefore. Of course, such an interconnection pattern between the B samplers and the C binaries has not been specifically shown in FIGURE 7 for the obvious reason of minimizing the complexity of the drawing. Thus, only one of binaries #1C–#32C will be established in its offset condition to indicate the collective operating condition of the counting mechanism during the line-trace interval corresponding to slot 1. The utility of interconnecting the C binaries into an open ring will be described later. The single offset binary is read out by means of samplers #1C–#32C (FIGURE 8) in response to the thirteenth pulse of curve T for storage in the associated one of binaries #1D–#32D. Consequently, the slot 1 condition of the system is registered in one of the D binaries.

Meanwhile, in response to the triggering of one of the C binaries to its offset condition, the assigned one of forward matrix units #1–#32 translates a potential through cable 161 to certain ones of normally-open gate circuits #1C–#32C. The C binaries are connected to the matrix units in a different manner than that according to which the B binaries are connected to reverse matrices #1–#32. It will be recalled that a pulse is not applied to a reverse matrix unit until the associated one of the B binaries is tripped from its offset back to its reset condition. Each forward matrix, on the other hand, receives a potential the instant that the assigned one of the C binaries is offset.

Since forward matrices #1–#32 are connected in accordance with the directions of the arrows in the circle diagrams of FIGURES 3 and 4 and also in accordance with Table II, if binary #11C, for example, is established in its offset condition, a potential will be applied to each of normally-open gates #12C, #20C and #28C to close them. These particular gates thus indicate that when control mechanism 34 is found in collective condition eleven in the line-trace interval occupied by slot 1, it is possible to trigger it to either one of collective operating conditions 12, 20, or 28 during the line-retrace interval intervening slots 1 and 2 so that it will be established in one of those three conditions during the entire line-trace interval of slot 2.

It will be recalled that upon the termination of the last or ninth pulse of the first group of W pulses certain ones of the B binaries will be in their respective offset conditions to indicate that it is possible for the counting mechanism to be established in either one of the collective operating conditions corresponding to the numbers of the offset binaries during slot 2 if it is desired to reach the destination condition as represented by one of the A binaries. Assume, for example, that binaries #3B, #7B, #10B, #12B, #15B, #20B and #24B are established in their offset conditions at that time. It is now necessary to make a selection as to the collective operating condition in which counting mechanism 34 will be established during the line-retrace interval between slots 1 and 2, in other words by the code burst during slot 1 of field-retrace interval B. The fourteenth pulse of curve T is applied to each one of normally-open gates #1C–#32C by virtue of their connection to the fourteenth tap of timing chain 126. Gates #12C, #20C and #28C are, however, closed at this time and thus the remaining gates only will supply the fourteenth pulse to the associated B binaries for resetting purposes. Since gates #3C, #7C, #10C, #15C and #24C, are still open, the correspondingly numbered B binaries will be triggered to their reset conditions. However, binaries #12B and #20B will remain in their offset conditions since gates #12C and #20C are closed.

It will be demonstrated later (namely, in connection with FIGURE 11) that there will always be at least one of gates #1C–#32C in its closed condition during the occurrence of the fourteenth pulse of curve T. In other words, it is always possible to trigger the control mechanism from the collective condition in which it finds itself in slot 1 to the desired destination state selected by the A binaries during the ten-slot or ten-step state determining interval. It will be shown that the selected final collective operating condition represented by a single offset A binary will never be one to which control mechanism 34 cannot assume in the ten-slot or ten-step interval.

The function of delay lines #1A–#32A and also gates #1B–#32B will now be appreciated. Each time a B binary is tripped from its offset to its reset condition by a W pulse, a pulse is supplied to its associated reverse matrix unit to provide return pulses back to certain other ones of the B binaries. It is not, however, desired to have any return pulses from the reverse matrices when the B binaries are reset by the fourteenth pulse of curve T and thus mono-stable multivibrator 158 responds to that fourteenth pulse through diode 159 to produce a pulse of sufficient duration to close each one of gates #1B–#32B for approximately one-half line duration in order to prevent the further translation of any pulses developed by the B binaries and delayed for a quarter line-trace interval in one of delay lines #1A–#32A.

Thus, upon the termination of the fourteenth pulse of curve T, in the illustrative example two of the B binaries, #12B and #20B, are established in their offset condition representing that counting mechanism 34 may be positioned by means of a code burst in slot 1 from the collective condition at that time, namely condition 11, to either one of condition 12 or 20. It is now necessary to make a selection with respect to conditions 12 and 20 in order to determine the specific condition into which the code burst in slot 1, plus the immediately succeeding line-synchronizing pulse, will actuate counting mechanism 34. This is accomplished during the occurrence of the fifteenth pulse of curve T by means of samplers #1B–#32B which are supplied with that fifteenth pulse to effectively read out the conditions of the B binaries. The offset conditions of binaries #12B and #20B are therefore transferred to binaries #12C and #20C, but since the C binaries are interconnected to form an open ring, only one of them is offset. Assume for the sake of illustration that only binary #12C is thus established in its offset condition in response to pulse 15 of curve T.

Once the B samplers are employed to register in the C binaries the exact collective operating condition to which control mechanism 34 must be placed by the code burst in the first slot along with the succeeding line sync, the offset B binaries are no longer required and may again be reset. The sixteenth pulse of curve T is thus applied to each of binaries #1B–#32B, by virtue of the connection from the sixteenth tap of timing chain 126 to each of the B binaries, in order to clear all those binaries that are in their respective offset conditions and thus to establish each one of the B binaries in its reset condition. In order to prevent the translation of any return pulses back through the reverse matrix units and cable 155 when the B binaries are cleared or reset, the sixteenth pulse of curve T is also applied via diode 157 to multivibrator 158 to close gates #1B–#32B (as is the case when the fourteenth W pulse is applied to unit 158) during the time interval when a pulse would be developed in the output of one of delay lines #1A–#32A responsive to the clearing or resetting operation of an offset binary.

Since a single selected one of the D binaries (FIGURE 8) is in its offset condition representing the collective operating condition of control mechanism 34 during the line-trace interval of the first slot and since a single selected one of the C binaries (FIGURE 7) is established in its offset condition indicating the collective operating condition in which control mechanism 34 must be placed during the line-trace interval of the second slot, it is now necessary to actually select an action of the counting mechanism which will achieve such a transition. In other words, it is essential to determine over which one of the various input circuits of the control mechanism a pulse must or may be applied to effect the desired transition. To this end, the seventeenth pulse of curve T is applied to each one of samplers #1D–#32D from timing chain 126 to effectively read out the C binaries and thus to translate a potential to only one of amplifiers #1–#32 corresponding to the particular offset C binary. Thus, during the occurrence of the seventeenth pulse a potential, such as positive, is developed at the output of one of the amplifiers and a potential, also positive for example, is provided at the output of the offset one of the D binaries to represent the desired transition.

Assume, for example, that binary #1D is offset, indicating that the system is in its first collective operating condition during the first slot, and assume further that amplifier #10 is the only amplifier which develops a positive pulse from the seventeenth pulse of curve T. Turning now to FIGURE 18 which shows a portion of FIGURE 8, since a positive potential is developed at the output of binary #1D and also at the output of amplifier #10, with the potential at amplifier #10 being positive with respect to the output of binary #10, diode 217 is rendered non-conductive as its cathode is connected to the output of the amplifier. Thus, electrons will flow from ground through resistor 236, bus bar 211, diode 225, resistor 216 to binary #1D, producing a positive pulse across resistor 236 indicating that the desired transition may be realized by means of a pulse applied to the $B_4$ Common input of mechanism 34. Additionally, there is an electron flow from ground to the output of binary #1D via the following circuit: resistor 237, diode 224, and resistor 216. A positive pulse thereby developed across resistor 237 indicates that a transition from collective operating condition one to ten may be achieved by means of a pulse supplied to the Left input of bi-stable multivibrator $B_4$ of mechanism 34.

Assuming that amplifier #10 had not received a positive pulse at that time but amplifier #2 did, indicating that the desired transition is from collective operating condition one to two, diode 217 would then be conductive. This obtains since amplifier #10 is designed to have a low output impedance in order to cut off diodes 224 and 225. When diode 217 conducts the anodes of diodes 224 and 225 are established at essentially ground. In this way, potentials are not developed across resistors 236 and 237. More particularly, each one of the amplifiers is so constructed that its output circuit is normally established at a potential very close to zero or ground and thus the cathodes of the associated diodes are essentially grounded, thus insuring that the resistors will be open circuited.

When the outputs of binary #1D and amplifier #2 are both positive at the same instant, diode 215 will be cut off causing electron flow through resistor 235 to indicate that input $B_4$ Right requires an input pulse in order that the desired transition may be accomplished. Of course, it will be observed in FIGURE 8 that there will also be electron flow through diodes 221–223 to indicate that the desired transition from collective conditions one to two may be effected by means of a pulse applied over either the $B_5$ Right input, no burst at all other than the normal free count achieved by the incoming line-drive pulses to bi-stable multivibrator $B_1$, or by means of a gated reset pulse. It will be remembered that the continuously applied line-drive pulses to the Common input of multivibrator $B_1$ always achieve a transition from the instantaneous collective condition to the immediately succeeding condition in the regular sequence of thirty-two conditions. Thus, if pulses are applied to the various input circuits of mechanism 34 and the transition is still only from conditions 1 to 2, those pulses effect either no change at all in the bi-stable multivibrators or have the same effect as that which is achieved by the line-drive pulse to $B_1$ Common.

Returning to FIGURE 18, when the output of amplifier #2 is established at a positive potential, diode 241 is also cut off. However, the output of binary #17D is at essentially ground potential so there is no electron flow through resistor 234.

Figure 9:
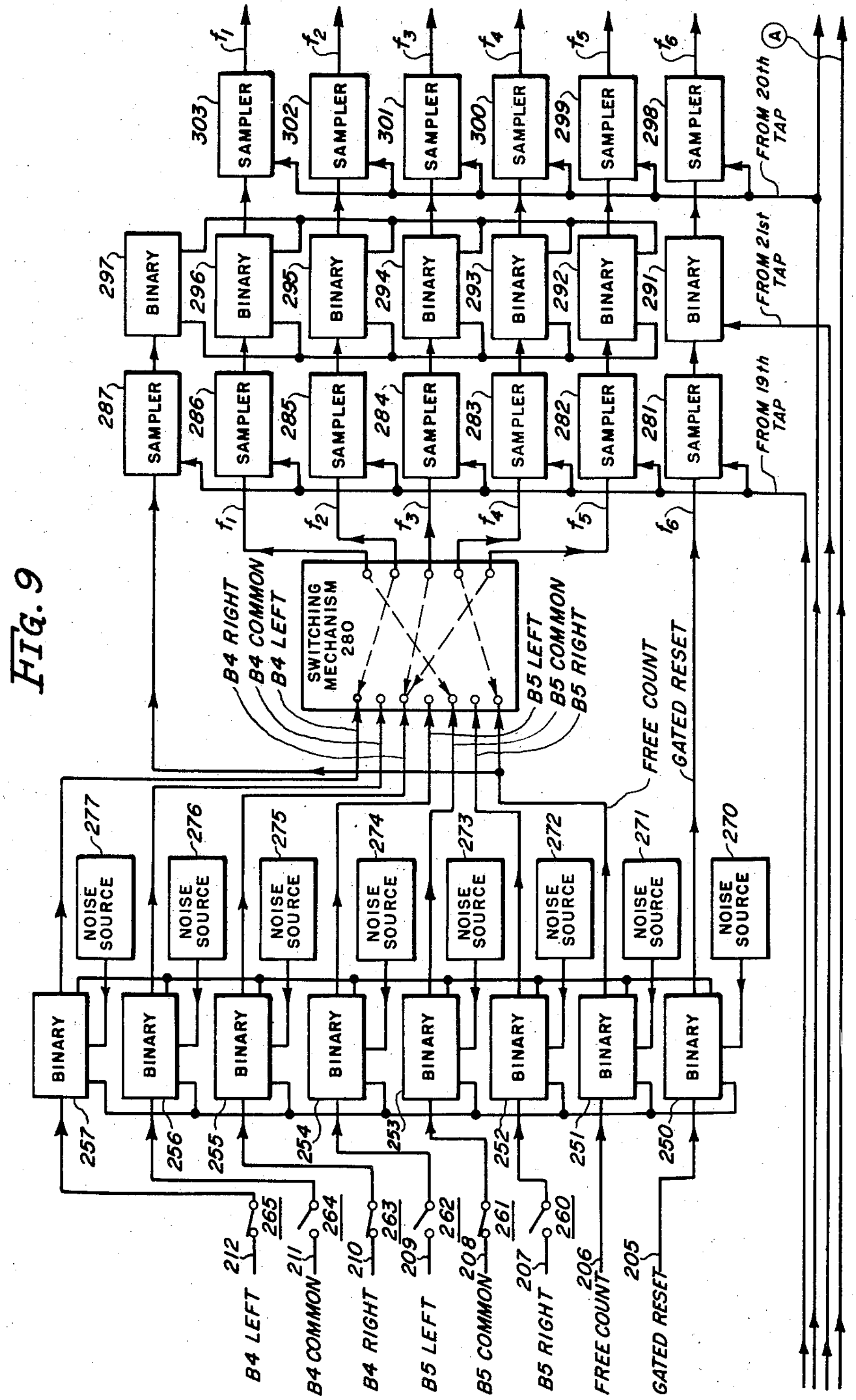

Thus, a positive potential is developed on one or more of buses 205–212 in response to the seventeenth pulse of curve T to indicate the manner in which pulses may be applied to counting mechanism 34 to effect the desired transition from the condition of the system during slot 1 of field-retrace interval B to that in which it must be established in slot 2. As stated hereinbefore, switching mechanism 35 in FIGURE 1 may be adjusted in accordance with any one of a multiplicity of different switching patterns for increased secrecy aspects. The instantaneous setting of that mechanism determines the exact pattern of connections to the input circuits of mechanism 34 with respect to individual frequencies. Since there are only five different frequencies, $f_1$–$f_5$, that are permuted to six input circuits of mechanism 34, plus a seventh circuit which is grounded, it will not be possible to supply pulses to any one of the inputs of the counting mechanism at any given time. Consequently, certain ones of buses 207–212 are opened by means of switches 260–265, respectively, in accordance with the setting of switching mechanism 35 for any given subscription television program. For example, for a particular program, inputs $B_4$ Common, $B_5$ Left and $B_5$ Right may not be employed. Thus, switches 264, 262, and 260 are opened as is shown in FIGURE 9 to illustrate a typical adjustment.

It should be realized, of course, that in order to maintain more complete control over counting mechanism 34 it is preferable that certain restrictions be met. Specifically, if both $B_4$ Left and $B_4$ Right are disconnected, then $B_4$ Common should be used. On the other hand, if both the Left and Right inputs of $B_4$ are utilized for a given program, then it is not necessary to translate pulses over $B_4$ Common and switch 264 may be open as in the illustrated case shown in FIGURE 9. Similarly, if $B_5$ Common is active, $B_5$ Left and Right need not be used. This is also the case in FIGURE 9. Likewise, if both $B_5$ Left and Right are connected to a source of code bursts through switching mechanism 35, then $B_5$ Common is not required and may be disconnected.

Since it is not possible to achieve an action over an input circuit whose associated one of switches 260–265 is open, it is necessary to open certain ones of the output circuits of the reverse matrix units #1–#32 and the forward matrix units #1–#32 for each program. Since the output circuits of the matrices are determined by the circle diagrams of FIGURES 3 and 4, a separate conductor being used for each line, the conductors representing the circle diagram lines indicating the actions not obtainable are effectively opened up. For example, since switch 264 is open, all of the connections from the reverse matrix units and from the forward matrix units corresponding to the lines comprising short dashes in the circle diagram of FIGURE 3 should be opened.

If pulses are developed on two or more of buses 207–212 during the occurrence of the seventeenth pulse of curve T and those energized buses are connected through closed ones of switches 260–265, it is necessary to make a final selection as to the particular action which will be made, namely, the particular one of the input circuits of mechanism 34 which will receive a pulse. This function is accomplished by means of binaries 250–257 which are intercoupled to form an open ring. As in the case of the other open rings employed, if pulses are applied to two or more of the binaries simultaneously only one will be actuated from its reset to its offset condition. Again, noise is injected from sources 270–277 to the binaries to insure that when a selection must be made from two or more simultaneously applied pulses from the bus bars, it will be made in random fashion.

The condition of each of binaries 250–257 is translated to the input terminals of switch mechanism 280 which may be constructed identically as switching mechanism 35. Since the input terminals of mechanism 280 effectively represent the various input circuits of mechanism 34, they have been labeled or designated accordingly. Switching mechanism 280 is adjusted preferably before each subscription telecast in the manner in which switching mechanism 35 must be established in each transmitter coding apparatus and in the decoding apparatus at each receiver. The five output terminals of mechanisms 280 represent the five different frequencies $f_1$–$f_5$ and are so designated. The dashed lines within mechanism 280 illustrate a typical adjustment for a particular program and agrees with the adjustment of switches 260–265.

Specifically, the $f_1$ output terminal of switching mechanism 280 is connected to the $B_5$ Common input terminal indicating that the $f_1$ frequency bursts are to be used to gate in line-drive pulses to $B_5$ Common of mechanism 34; the $f_2$ output of mechanism 280 is connected to the $B_4$ Left input to indicate that all $f_2$ frequency bursts are to be utilized to apply line syncs to the Left input of multivibrator $B_4$ to achieve proper decoding; the $f_3$ output is connected to the $B_4$ Right input which means that bursts of $f_3$ frequency must gate in line synchronizing pulses for application to the Right input of multivibrator $B_4$; the $f_4$ output is connected to the free count input indicating that the $f_4$ bursts are not to be used and counting mechanism 34 is merely to execute its normal free count in response to a line-drive pulse applied to multivibrator $B_1$; and the $f_5$ output is connected to the $B_4$ Right input to indicate that pulses of $f_5$ are to be employed in applying line syncs to the Right input of multivibrator $B_4$. These dashed lines indicating a typical setting are also shown within switching mechanism 35 in FIGURE 1. It will be noted that since the $f_4$ bursts do not actuate any of the bi-stable multivibrators, the $f_4$ input to mechanism 35 is connected to the output which is grounded to represent that bursts of that frequency are effectively "thrown away." Binary 251 is also coupled to sampler 287 so that at times when a free count action is desired no signal burst whatsoever is transmitted, as will be explained.

Once a selected one of binaries 250–257 is actuated in response to the seventeenth pulse of curve T to indicate the desired action from slot 1 to slot 2 of field-retrace interval B, the D binaries are no longer required and may be reset to their respective reference conditions. This is achieved by means of the eighteenth pulse of curve T which is applied to each one of those binaries from the eighteenth tap of timing chain 126.

The registered information in binaries 250–257 is read out during the occurrence of the nineteenth pulse of curve T by means of sampler 281–287 which are actuated by that pulse from timing chain 126 to register the information in binaries 291–297. Since it is possible that two or more of the output terminals of switching mechanism 280 may be connected to the same input terminal, as is the case in the illustrative example where the $f_3$ and $f_5$ outputs are both connected to the $B_4$ Right input, it is necessary to make a selection with respect to the precise frequency which is to be used to achieve the required action. Moreover, when a free count action is required in the present illustration both samplers 283 and 287 will be energized. A selection must then be made as to whether an $f_4$ burst will be sent to achieve such free count action. For these reasons, binaries 292–297 are interconnected to form an open ring so that only one frequency, or in the case of binary 297 no frequency, is selected for a desired action, even though two or more different frequencies will achieve the same result.

Binaries 291–296 are read out in response to the twentieth pulse of curve T by samplers 298–303 since those samplers are connected to the twentieth tap of timing chain 126. Inasmuch as each one of those samples is effectively assigned to one of the frequencies $f_1$–$f_6$ as labeled accordingly at their output circuits, information is recorded in storage matrix 305 (FIGURE 10) representing a particular frequency that must be developed and transmitted during slot 1 of the field-retrace interval following field-retrace interval A, namely during field-retrace interval B. This information is stored in matrix 305 in the manner disclosed in detail in the copending Eilers et al. application, Serial No. 463,702, as stated previously. Binaries 292–296 being connected to form an open ring require no reset circuit, but binary 291 being unassociated with any other binary, does require a reset pulse. This is achieved by the twenty-first pulse of curve D since that binary is connected to the twenty-first tap of timing chain 126.

It will be remembered that the twenty-second pulse of curve T is employed to actuate 10:1 counter 149 in FIGURE 6 and thus all twenty-two output pulses for one complete cycle of timing chain 126 have been utilized. Moreover, in response to those pulses the code generator has undergone a series of complex operations to determine the frequency of the code burst that may be transmitted during the first slot of field-retrace interval B to change counting mechanism 34 from the condition in which it will find itself during slot 1 to the condition in which it may be established in slot 2 in order to reach the final destination condition during the line-trace interval subsequent to slot 10, the number of that particular destination operating condition being the same as the number of the desired operating state calculated by means of the circuitry coupled to binaries #1A–#32A.

It will be recalled that binaries #1C–#32C have effectively stored or registered information representing the collective operating condition in which control mechanism 34 must be positioned to during the line-retrace interval between slots 1 and 2. The C binaries have not been reset by any of the pulses of curve T, as in the case of the D binaries, for example, and thus one of the C binaries will be in its offset condition to represent the collective operating condition of the counting mechanism during slot 2. Consequently, these binaries may be employed again during the second series or group of twenty-two pulses of curve T in determining the transition that must be made between the second and third slots.

Meanwhile, the second U pulse operates the A samplers to read out the final destination state as stored by binaries #1A–#32A and transfers this information to the B binaries. Once again, a particular one of the B binaries is offset (namely, the same one as was offset by the very first U pulse) to represent the final destination operating state, namely, the collective operating condition in which counting mechanism 34 must be established during the line-retrace interval following the tenth slot. The B binaries and their associated reverse matrix units operate in response to the second series of W pulses in exactly the same manner as described hereinbefore in connection with the first group of W pulses. However, since there are only eight W pulses in that second group, rather than nine as in the case of the first group, upon the termination of the last pulse of the second group of W pulses, certain ones of the B binaries will be established in their offset conditions to indicate those particular collective operating conditions in which mechanism 34 may be established during the line-trace interval of the third slot if it is desired to make a transition to the destination operating state represented by the single offset A binary.

Since the C binaries indicate the slot 2 collective operating condition and since the B binaries now represent the operating conditions which are acceptable for slot 3 in field-retrace B, the twenty-second pulse following pulse 14 in curve T is effective to reset those offset B binaries corresponding to collective operating conditions of mechanism 34 which cannot be reached between slots 2 and 3. The remaining offset B binaries thus represent the operating conditions in which mechanism 34 may be positioned by a code burst in the second slot along with the following line sync. The circuitry in FIGURES 8 and 9 respond to this information during the second series of twenty-two T pulses in exactly the same manner as discussed hereinbefore and register in storage matrix 305 the frequency of the code burst that must be translated during slot 2 of field-retrace interval B.

This same general process ensues responsive to the remaining pulses generated by timing chain 126 during field-trace interval A and since the remaining groups of W pulses diminish by one from one group to the next, the code generator registers information in matrix 305 with respect to the necessary frequencies of the bursts in all of the remaining slots 3–10.

In accordance with the copending Eilers et al. application, Serial No. 463,702, the storage process requires a series of write-in pulses which occur simultaneously with the application of pulses to matrix 305 through samplers 298–303. Consequently, slow-timing write-in pulse generator 306 is connected to the twentieth tap of timing chain 126 to receive pulse 20 of curve T and every twenty-second pulse thereafter, as is the case with samplers 298–302. During each cycle of operation of generator 306, which may comprise a ring counter as stated hereinbefore, one of its ten output circuits receives a pulse in a predetermined sequence with respect to its other output circuits. Generator 306 also receives vertical blanking pulses to insure that it is always established in its starting or reference condition preceding the first pulse from the twentieth tap during each field. The pulses developed by generator 306 have been entitled "slow-timing write-in" pulses since it requires one-hundred and ten line-trace intervals to complete the writing or storing operation.

Since the various code bursts of different frequencies must be developed during slots 1–10 of the field-retrace interval following field-trace interval A, the stored information must be read out rather rapidly. To this end, the vertical-blanking pulses like that shown in curve A of FIGURE 20 are supplied to mono-stable multivibrator 308 which produces a pulse (curve Y) for application to mono-stable multivibrator 309 which operates in response to the trailing edge of the Y pulse to develop the pulse shown in curve Z. The circuit parameters of multivibrator 308 are so chosen that the trailing edge of the Y pulse occurs immediately subsequent to the second series of equalizing pulses superimposed on the vertical-blanking pulse, but before the first line-synchronizing pulse following the equalizing pulses. The circuit parameters of multivibrator 309 are so selected that the duration of the Z pulse overlaps or embraces in point of time ten line-synchronizing pulses occurring on the vertical "back porch."

The pulse of curve Z, which serves as a gating signal, is applied to normally-closed gate circuit 310. Meanwhile, line-drive pulses (curve R) from synchronizing-signal generator 50 are supplied through a delay line 311 to form the pulses shown in curve AA. These latter pulses are supplied to normally-closed gate 310, but only the delayed line-drive pulses occurring within the interval of the pulse of curve Z are gated in to develop the pulses shown in curve BB at the output terminals. These pulses are supplied to fast-timing read-out pulse generator 314 which operates in a similar manner as generator 306 to produce fast-timing read-out pulses for application to the storage matrix. Generator 314 is also reset by vertical blanking pulses as in the case of generator 306. Samplers 321–326 are also actuated by the read out pulses of curve BB in order to read out the stored information of the storage matrix and supply this information to generators 331–336.

Thus, these generators effectively produce, during slots 1–10 of the field-retrace interval following field trace A (namely, field-retrace B), a combination of code signal bursts each of which has a predetermined one of the six identifying frequencies $f_1$–$f_6$, as is shown in FIGURE 2. The combination exhibits a code pattern in accordance with the particular occurrence and distribution of the code bursts therewithin. These code bursts are then applied to unit 337 which includes coding apparatus identical to that shown in FIGURE 1, which codes the video as well as audio information.

It will be remembered that the audio information, from which was calculated the operating state desired for least D.C., occurred during the field-trace interval preceding the field-trace in which the information was stored in storage matrix 305. Consequently, since the storage matrix is not read out until the immediately subsequent field-retrace interval, there is a lapse or delay of two complete fields from the origination of the audio itself until the transmission of the code signal bursts which condition the transmitter and receivers to encode that audio in a manner to produce the least ping distortion. Thus, in order to code the exact interval of audio information according to the operating state selected, it is necessary to include a two-field delay between audio source 53 and the audio coding apparatus in unit 337. This is achieved by delay line 339.

Inasmuch as the code bursts transmitted during slots 1–10 of each field-retrace interval are employed to code and also to decode the audio and video signals, the code bursts constitute and may be called an encoding signal. On the other hand, since the code bursts in any one combination are a coded representation of a transition from a given operating state of control mechanism 34 to a selected operating state because of the inclusion of switching mechanism 35, the code bursts may also be considered a coded signal.

It has been stated hereinbefore that when an operating state is effectively selected by binaries #1A–#32A and the circuitry coupled thereto during one field-retrace interval, that operating state will be one to which control mechanism 34 has definite access during the ten slot interval of the immediately succeeding field-retrace interval. It will be appreciated that it is not always possible to go from each of the thirty-two operating states to any one of the other operating states during a state-determining or field-retrace interval. For that reason, it is expedient to provide circuitry which will prevent the A binaries from selecting an operating state which cannot be reached. To that end, the conditions of the A binaries are effectively transferred to samplers #1E–#32E and #1F–#32F in FIGURE 11. As described previously, the final or destination operating state is registered in the A binaries during the interval of the L pulse. Consequently, the E and F samplers may be actuated to read out the stored information in the A binaries subsequent to the L pulse (FIGURE 20). The pulse of curve L is thus delayed in delay line 342 for approximately one-half of a line trace and applied through electronic switch 341 to each one of the E samplers or to each one of the F samplers.

Switch 341 is operated at a thirty-cycle rate and is triggered between its two operating conditions during each field-retrace interval. This thirty-cycle operation is achieved by means of coincidence circuit 344 which responds to the vertical-blanking pulse of curve A (FIGURE 20) and the line-drive pulses of curve R. The input circuit for the vertical-blanking pulse is provided with a differentiating circuit so that a pulse is developed at the output of coincidence circuit 344 only when the leading edge of the vertical-blanking pulse occurs in time coincidence with a line-drive pulse. From a close study of FIGURE 2, it will be apparent that this only occurs during the ODD field and thus the coincidence circuit only produces pulses during the odd fields. Bi-stable multivibrator 345, which is supplied with vertical-blanking pulses to insure that it is always in synchronism, is supplied with the pulses from coincidence circuit 344 to produce a square wave signal having a frequency of thirty cycles per second to operate switch 341, the switch being operated to cause the translation of the delayed L pulse to the E samplers during the ODD fields and to the F samplers during the EVEN fields.

This arrangement is necessary since counting mechanism 34 undergoes uninterrupted actuation in response to line-drive pulses during an entire field-trace interval from the line-trace interval subsequent to the tenth slot of one field-retrace interval to the first slot of the succeeding field-retrace interval. From an examination of the wave forms in FIGURE 2, it will be noted that inasmuch as there are two-hundred sixty-two and one-half lines per field the ten slots do not occur at the exact corresponding times from one field-retrace interval to the next. Specifically, for the illustrated case there are two hundred sixty-three line-trace intervals from the tenth slot of the ODD to the first slot of the EVEN field. On the other hand, there are only two hundred sixty-two line-trace intervals from the tenth slot of the EVEN to the first slot of the ODD field.

Thus, by way of a résumé, in a computation of the operating states impossible to reach, it is necessary to take into account or consideration the particular field in which the computation is made. If it is made during an EVEN field the number of the selected operating state represented by binaries #1A–#32A should be advanced one digit. For example, if during field-retrace B the A binaries indicate that the system should be placed in operating state thirty during field-retrace interval C, the F samplers will receive the delayed L pulse to automatically change this state to thirty-one. Field retrace B is in an even field since field-retrace interval A is in an ODD field as is illustrated in FIGURE 20. This may be verified by checking or comparing the relative timing of the field-blanking pulse of curve A and the line-drive pulses of curve R in FIGURE 20 with the corresponding pulses in the ODD field of FIGURE 2.

Thus, in response to a pulse of curve L a selected one of the E binaries (namely the one numbered correspondingly to the offset A binary or the one immediately following) is established in its offset condition. The twenty-first pulse of curve T developed at the twenty-first tap of timing chain 126 during a field-trace interval is applied to each of the E binaries to trigger them to their respective reset conditions but only the binary which has been previously offset will be effected and thus will apply a pulse through its assigned one of delay lines #1B–#32B (wherein it is delayed for about ¼ line trace) and gates #1D–#32D to its associated forward matrix #1A–#32A which in turn causes the return of pulses through cable 348 to offset certain other binaries. In other words, this circuitry functions in exactly the same manner as the B binaries and reverse matrix units in FIGURE 7 except that the matrix units in FIGURE 11 are connected back to the E binaries in accordance with the forward actions of counting mechanism 34 as illustrated by the directions of the arrows in the circle diagrams as well as Table II.

Each succeeding pulse developed at the twenty-first tap of timing chain 126 effects reset of the offset E binaries in the same manner as the W pulses effect reset of the offset B binaries and thus upon the termination of the last pulse developed at the twenty-first tap (there, of course, will be ten in all) the offset E binaries will represent those operating states or collective operating conditions in which counting mechanism 34 may be established during the field-retrace interval following that in which binaries #1A–#32A are actuated. In other words, if during field-retrace interval A, for example, the A binaries represent a desired operating state to which counting mechanism 34 must be positioned during field-retrace interval B, the E binaries and associated circuitry compute during field-trace interval A the operating states which may be reached by the control mechanism during field-retrace interval C.

The information stored by binaries #1E–#32E is read out by samplers #1G–#32G at the commencement of the following vertical-blanking pulse. This is realized by differentiator 349 which responds to the vertical-blanking pulses to produce sharply defined sampling pulses occurring at the leading edge of each vertical-blanking pulse like that shown in curve A of FIGURE 20. Unlike the other samplers in this system which effectively produce output pulses only when their assigned binaries are in their offset conditions, the G samplers produce output pulses when their associated binaries are in their respective reset conditions. In this way, the G samplers translate pulses to the threshold detectors to indicate the particular E binaries which are not offset, thus indicating the particular operating states which cannot be reached.

Referring now to FIGURE 13, it will be seen that the output of a G sampler is applied through a condenser like 107 to the junction between diodes 81 and 82 of its associated threshold detector. The output potential of the sampler will be negative so that each time a pulse is applied to the junction, one of diodes 75, 78 immediately conducts. The threshold detector thus fires in the same manner as if a D.C. component having an amplitude above the threshold has been applied to it. Thus, the subsequent application of a saw tooth pulse of the type shown in curve D to the threshold detector has absolutely no effect and it does not make any difference whether this is the most desired operating state with respect to least ping or not, inasmuch as it will not be possible to reach that operating state. The purpose of including delay line 54 in FIGURE 5 should now be apparent since it is desired to fire or trigger all of the threshold detectors assigned to the inaccessible operating states before a selection is made on the basis of least ping, namely, before the beginning of a saw tooth D pulse.

Since the E binaries (returning to FIGURE 11) are no longer required subsequent to the operation of the G samplers, they may be tripped to their respective reset conditions. This is achieved by delaying the differentiated output pulse from differentiator 349 in delay line 350 for approximately one line trace and applying it to each of the E binaries for clearing or resetting purposes. As in the clearing operation of the B binaries, it is essential to prevent the return of pulses from the forward matrix units #1A–#32A and for that reason monostable multivibrator 352 responds to the clearing pulse from delay line 350 to produce a pulse of approximately one-half line trace in duration to cause the closing of each of gates #1D–#32D. In this way, the D gates will be closed when pulses are developed in the outputs of delay lines #1B–#32B incident to clearing the E binaries to their reset or reference operating conditions.

It has been stated hereinbefore that certain connections are opened in the outputs of the reverse matrix units #1–#32 and also in the output circuits of the forward matrix units #1–#32 for each adjustment of switching mechanism 35. Of course, some of the connections from forward matrix units #1A–#32A to the E binaries through cable 348 will also have to be opened for any given program in accordance with the particular switch pattern of mechanism 35 and switches 260–265.

To summarize the invention to which the present application is directed, a method is provided for producing control effects calculated to change the operating state of a system from its instantaneous state to a selected one of several operating states during each one of a series of spaced state-determining or field-retract intervals, where, starting from at least some of the operating states, it is impossible to make a transition to all of the other operating states during a state-determining interval. More specifically, the control effects, viewed from one aspect, take the form of encoding signals or combinations of code bursts developed during field-retrace intervals which are utilized to change the operating state of a secrecy communication system by a sequence of actions in a predetermined number of steps. Viewed differently, the information stored in matrix 305 may be considered a control effect.

The method comprises the initial step of determining as a starting operating state that state in which the system is established during a first state-determining or field-retrace interval. Present condition apparatus 165 and the circuitry coupled thereto determines the operating state in which the subscription television system is established by a control effect or code burst combination transmitted during, for example, field-retrace interval A. During the occurrence of the L pulse falling in field-retrace interval A, the A binaries and their actuating circuitry select one destination operating state in which the secrecy communication system is to be established during a subsequent, second state-determining interval, namely during field-retrace interval B. Most of the circuitry in FIGURES 6–10 practice the step of developing a control effect or encoding signal representing a transition from the starting state to the one destination state. When the stored information in matrix 305 is considered as the control effect, such a control effect is developed between the first and second state-determining intervals, namely between field-retrace intervals A and B.

The circuitry in FIGURE 11 determines between the first and second state-determining intervals all of the operating states impossible to reach from the one destination operating state during a subsequent, third state-determining interval, namely during field-retrace interval C. Once again the A binaries and their associated circuitry selects, during the occurrence of the L pulse falling in field-retrace interval B, from those operating states which are accessible a second destination state. Likewise, the circuitry in FIGURES 6–10 develops a control effect representing a transition from the one destination state to the second destination state.

A very brief summary of the operation of the disclosed code generator embodiment may be helpful and to this end the generator has been illustrated in FIGURE 21 in simplified, combination structural and functional fashion. A review perhaps may best be facilitated by means of a list of principal functions performed by the generator, which are considered in connection with the blocks in FIGURE 21. The following constitutes such a list. It should be appreciated that the steps enumerated are not necessarily presented in their order of occurrence but have been arranged to provide the most meaningful and understandable résumé.

(1) Coding undelayed audio according to thirty-two differently phase square waves.

(2) Integrating the coded audio signals to determine their respective D.C. components.

(3) Determining the past history D.C. component and registering such information in the threshold detectors.

(4) Determining the operating states impossible to reach, during ten-slot interval, from that state in which control mechanism 34 will find itself responsive to the line sync pulse immediately preceding slot 1 (namely, during the line trace of slot 1) and registering such information in the threshold detectors.

(5) Measuring or comparing the D.C. components of the coded audio signals with respect to the past history D.C. component and selecting a destination state in which control mechanism 34 is to be established responsive to the line sync pulse immediately following slot 10 to result in negligible ping distortion.

(6) Storing the destination state in A binaries.

(7) Determining in the present condition apparatus the starting collective condition in which control mechanism 34 will find itself in response to the line sync pulse immediately preceding slot 1 and successively registering such information in the C binaries and then in the D binaries.

(8) Registering of the destination state in the B binaries and repeated actuation thereof through the reverse matrices to determine and store those collective conditions in which mechanism 34 may be established responsive to the line sync pulse immediately preceding slot 2.

(9) Comparing the available transitions from the starting condition with the conditions stored in B binaries to effectively select therefrom only those conditions which are reachable by transitions from the starting condition and storing such information in B binaries.

(10) Selecting in the C binaries from the information stored in the B binaries only one of the reachable conditions.

(11) Selection of an action to effect the required transition from the starting collective condition to the selected reachable condition which must be established responsive to the line sync pulse immediately following slot 1, namely during the line trace of slot 2.

(12) Selection of a burst frequency for slot 1 which will achieve the desired action and storage of such information.

(13) Generally repeating the above process of steps 8–12 to determine burst frequencies for slots 2–10.

(14) Generating signal bursts, having frequencies corresponding to those selected, destined for use in coding at the transmitter and decoding at the receivers.

Viewed differently, the generator produces a coded signal (namely, the code bursts occupying slots 1–10 during a field-retrace interval) for a secrecy communication system, such as for a subscription television system, to change the system from a given operating state (namely, the operating state in which control mechanism 34 is established during the line-trace interval following the tenth slot of a predetermined field-retrace interval, such as field-retrace interval A) to a selected one of several, specifically thirty-two, possible operating states as determined by the code pattern of the coded signal. Binaries #1A–#32A and the circuitry coupled to the inputs thereof provide a control effect (namely, the particular one of the A binaries which is established in its offset condition) representing a selected one of the thirty-two operating states. All the circuitry coupled to the outputs of the A binaries utilizes the control effect to develop a coded signal having a code pattern effectively selected from a group of different code patterns all of which represent a transition from the given operating state to the selected operating state. It should be appreciated that a multiplicity of different combinations of code bursts will effect a transition from the same given state to the selected operating state and thus the group of different code patterns from which the pattern is selected for the coded signal is very large, resulting in a high degree of security against unauthorized appropriation. It should also be appreciated that because of the effect of past history, the same code pattern will result in transitions to different operating states during different field-retrace intervals.

Certain features described in the present application are disclosed and claimed in the following copending applications filed concurrently herewith: Serial No. 829,102, filed in the name of Carl G. Eilers; Serial No. 829,106, filed in the name of Richard C. Herrmann et al.; Serial No. 829,108, filed in the name of Melvin C. Hendrickson et al.; and Serial No. 829,105, filed in the name of Melvin C. Hendrickson, all of which are assigned to the present assignee.

While a particular embodiment of the invention has been shown and described, modifications may be made, and it is intended in the appended claims to cover all such modifications as may fall within the true spirit and scope of the invention.

We claim:

1. A method for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval, said method comprising the steps of: electronically determining as a starting operating state that state in which said system is established during a first state-determining interval; electronically selecting one destination operating state in which said system is to be established during a subsequent, second state-determining interval; developing an electrical control effect representing a transition from said starting state to said one destination state; electronically determining all of the operating states impossible to reach from said one destination operating state during a subseqent, third state-determining interval; electronically selecting from those operating states which are accessible a second destination state; and developing an electrical control effect representing a transition from said one destination state to said second destination state.

2. A method for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval, said method comprising the steps of: electronically determining as a starting operating state that state in which said system is established during a first state-determining interval; electronically selecting one destination operating state in which said system is to be established during a subsequent, second state-determining interval; developing prior to said second state-determining interval and electrical control effect representing a transition from said starting state to said one destination state; electronically determining all of the operating states impossible to reach from said one destination operating state during a subsequent, third state-determining interval; electronically selecting from those operating states which are accessible a second destination state; and developing prior to said third state-determining interval an electrical control effect representing a transition from said one destination state to said second destination state.

3. A method for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval, said method comprising the steps of: electronically determining as a starting operating state that state in which said system is established during a first state-determining interval; electronically selecting one destination operating state in which said system is to be established during a subsequent, second state-determining interval; developing prior to said second state-determining interval an electrical control effect representing a transition from said starting state to said one destination state; electronically determining prior to said second state-determining interval all of the operating states impossible to reach from said one destination operating state during a subsequent, third state-determining interval; electronically selecting from those operating states which are accessible a second destination state; and developing prior to said third state-determining interval an electrical codtrol effect representing a transition from said one destination state to said second destination state.

4. A method for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval, said method comprising the steps of: electronically determining as a starting operating state that state in which said system is established during a first state-determining interval; electronically selecting one destination operating state in which said system is to be established during a subsequent, second state-determining interval; developing between said first and second state-determining intervals an electrical control effect representing a transition from said starting state to said one destination state; electronically determining between said first and second state-determining intervals all of the operating states impossible to reach from said one destination operating state during a subsequent, third state-determining interval; electronically selecting from those operating states which are accessible a second destination state; and developing between said second and third state-determining intervals an electrical control effect representing a transition from said one destination state to said second destination state.

5. A computer for producing control effects calculated to change the operating state of a system from its instantaneous state to a selected one of several operating states during each one of a series of spaced state-determining intervals, where, starting from at least some of the operating states, it is impossible to make a transition to all of the other operating states during a state-determining interval, said computer comprising: means for determining as a starting operating state that state in which said system is established during a first state-determining interval; means for selecting one destination operating state in which said system is to be established during a subsequent, second state-determining interval; means for developing a control effect representing a transition from said starting state to said one destination state; and means for determining all of the operating states impossible to reach from said one destination operating state during a subsequent, third state-determining interval, said selecting means selecting from those operating states which are accessible a second destination state and said developing means developing a control effect representing a transition from said one destination state to said second destination state.

6. A method for producing encoding signals calculated to change the operating state of a secrecy communication system from its instantaneous state to a selected one of several operating states during each one of a series of spaced state-determining intervals as determined by the code patterns of said encoding signals, where, starting from at least some of the operating states, it is impossible to make a transition to all of the other operating states during a state-determining interval, said method comprising the steps of: electronically determining as a starting operating state that state in which said system is established during a first state-determining interval; electronically selecting one destination operating state in which said system is to be established during a subsequent, second state-determining interval; developing an encoding signal having a code pattern representing a transition from said starting state to said one destination state; electronically determining all of the operating states impossible to reach from said one destination operating state during a subsequent, third state-determining interval; electronically selecting from those operating states which are accessible a second destination state; and developing an encoding signal having a code pattern representing a transition from said one destination state to said second destination state.

7. A method for producing control effects calculated to change the operating state of a system in a predetermining number of steps from its instantaneous state to a selected one of several operating states during each one of a series of spaced state-determining intervals, where, starting from at least some of the operating states, it is impossible to make a transition to all of the other operating states in said predetermined number of steps during a state-determining interval, said method comprising the steps of: electronically determining as a starting operating state that state in which said system is established during a first state-determining interval; electronically selecting one destination operating state in which said system is to be established during a subsequent, second state-determining interval; developing an electrical control effect representing a transition from said starting state to said one destination state; electronically determining all of the operating states impossible to reach in said predetermined number of steps from said one destination operating state during a subsequent, third state-determining interval; electronically selecting from those operating states which are accessible a second destination state; and developing an electrical control effect representing a transition from said one destination state to said second destination state.

8. For use in a secrecy communication system of the type wherein successive time segments of an uncoded intelligence signal are coded in accordance with different ones of several operating states, a method for producing coding signals calculated to change the operating state of the system by a sequence of actions in a predetermined number of steps from its instantaneous operating state to a selected one of several operating states, where, starting from at least some of the operating states, it is impossible to make a transition to all of the other operating states in said predetermined number of steps, said method comprising the steps of: electronically determining as a starting operating state that state according to which a first time segment of said uncoded intelligence signal is coded; electronically selecting one destination operating state according to which a subsequent, second time segment of said uncoded intelligence signal is to be coded; developing a coding signal representing a transition from said starting state to said one destination state; electronically determining all of the operating states impossible to reach in said predetermined number of steps from said one destination state; electronically selecting from those operating states which are accessible a second destination state according to which a subsequent, third time segment of said uncoded intelligence signal is to be coded; and developing a coding signal representing a transition from said one destination state to said second destination state.

9. A method for producing control effects calculated to change the operating state of a subscription television system from its instantaneous state to a selected one of several operating states during each one of a series of spaced field-retrace intervals, where, starting from at least some of the operating states, it is impossible to make a transition to all of the other operating states during a field-retrace interval, said method comprising the steps of: determining as a starting operating state that state in which said system is established during a first field-retrace interval; electronically selecting one destination operating state in which said system is to be established during a subsequent, second field-retrace interval; developing an electrical control effect representing a transition from said starting state to said one destination state; electronically determining all of the operating states impossible to reach from said one destination operating state during a subsequent, third field-retrace interval; electronically selecting from those operating states which are accessible a second destination state; and developing an electrical control effect representing a transition from said one destination state to said second destination state.

References Cited in the file of this patent

UNITED STATES PATENTS

| | | |
|---|---|---|
| 2,431,692 | Hersey | Dec. 2, 1947 |
| 2,758,297 | Cones | Aug. 7, 1956 |
| 2,856,467 | Molnar | Oct. 21, 1958 |